(12) United States Patent
Yoshida

(10) Patent No.: US 8,363,277 B2
(45) Date of Patent: Jan. 29, 2013

(54) PRINTING STRUCTURE OF MEDIUM SURFACE ON WHICH DOT PATTERN IS FORMED BY PRINTING, PRINTING METHOD, AND ITS READING METHOD

(76) Inventor: Kenji Yoshida, Tokyo (JP)

( * ) Notice: Subject to any disclaimer, the term of this patent is extended or adjusted under 35 U.S.C. 154(b) by 0 days.

(21) Appl. No.: 13/448,701

(22) Filed: Apr. 17, 2012

(65) Prior Publication Data
US 2012/0200879 A1    Aug. 9, 2012

Related U.S. Application Data

(62) Division of application No. 13/219,489, filed on Aug. 26, 2011, now Pat. No. 8,243,332, which is a division of application No. 12/977,832, filed on Dec. 23, 2010, now Pat. No. 8,023,148, which is a division of application No. 11/665,383, filed as application No. PCT/JP2004/015286 on Oct. 15, 2004, now Pat. No. 7,876,460.

(51) Int. Cl.
*G06F 15/00* (2006.01)
*G06K 1/00* (2006.01)
*H04N 1/60* (2006.01)
*G06F 3/12* (2006.01)

(52) U.S. Cl. ......................................... 358/1.9; 358/1.1
(58) Field of Classification Search ....................... None
See application file for complete search history.

(56) References Cited

U.S. PATENT DOCUMENTS 7,999,973 B2 *  8/2011  Nakata et al. ................. 358/3.28
8,055,180 B2 * 11/2011  Murakami ..................... 399/366

* cited by examiner

*Primary Examiner* — Douglas Tran
(74) *Attorney, Agent, or Firm* — Duane Morris LLP

(57) ABSTRACT

With the aim of realizing an easy and inexpensive method of realizing a "stealth" dot pattern, whose presence on a medium surface is not visually recognizable, merely through minor improvements in the existing printing technology, the present invention provides dots which form a dot pattern by printing these dots using an ink of any color reactive in the infrared or ultraviolet wavelength range on a medium surface on which a dot pattern is to be formed, for use with a dot pattern reading system that irradiates infrared or ultraviolet light on a medium surface having a dot pattern provided thereon, recognizes the dot pattern by reading the reflections of the light with an optical reading means, converts the dot pattern into the corresponding data, and outputs the text, voice, images and so forth contained in the data.

3 Claims, 73 Drawing Sheets

FIG.63

| COMMENT NAME | NUMBER OF BITS | PARAMETER | 1) PARAMETER FOR DOT PRINTING ON OBJECT PRINTING SURFACE |
|---|---|---|---|
| iMRK | 1 | 1 | DESCRIBES DOT PRINTING OF VARIOUS OBJECTS, SUCH AS CONFIDENTIAL OR OTHER SECURITY MARK, LOGO MARK AND CHARACTERS. (※FIRST DOCUMENT IS OUTPUTTED BY ONE OF THE FOLLOWING METHODS ①USE OBJECT ALREADY REGISTERED IN OUTPUT APPARATUS, ②USE OBJECT NEWLY DEFINED ON COMPUTER, AND ③INPUT AND REGISTER OBJECT IN OUTPUT APPARATUS AND USE IT IMMEDIATELY. OBJECT IS INPUTTED AND REGISTERED BY EITHER: ①ON OUTPUT APPARATUS WITH MONITOR, TRACE OUTER BOUNDARY OF OBJECT WITH TOUCH PEN OR TABLET, OR ②PRINT DOCUMENT HAVING X AND Y COODINATES DOT-OUTPUTTED ON THE ENTIRE SURFACE BY USE OF OUTPUT APPARATUS, AND TRACE OUTER BOUNDARY OF OBJECT WITH E-SCANNER.) |
| jMRK | 2 | 0 | DOT PRINTING IS NOT PERFORMED. |
| | | 1 | DOT PRINTING IS PERFORMED ON OBJECT ONLY. |
| | | 2 | DOT PRINTING IS PERFORMED ON NORMAL PAPER SURFACE ONLY. |
| | | 3 | DOT PRINTING IS PERFORMED ON BOTH OBJECT AND NORMAL PAPER SURFACE. |
| iCNG | 2 | 0 | COPYING IS PERMITTED. (※COPYING IS EITHER UNCONDITIONALLY PERMITTED OR RESTRICTED. WHEN PERMITTED, THERE IS NO SECURITY PROTECTION, AND NO RESTRICTIONS ARE IMPOSED ON COPYING FREQUENCY OR NUMBER OF COPIES. WHEN RESTRICTED, MTMS IS USED TO SPECIFY MAXIMUM COPYING FREQUENCY AND/OR MCPY TO SPECIFY MAXIMUM NUMBER OF COPIES.) |
| | | 1 | NO COPYING IS PERMITTED. |
| | | 2 | COPYING IS PERMITED ON THIS MACHINE ONLY. (※COPYING IS PERMITTED ON OUTPUT APPRATUS SPECIFIED IN NFST, UNDER THE CONDITIONS DESCRIBED IN NFST) |
| | | 3 | COPYING IS POSSIBLE ON PERMITTED OUTPUT APPARATUS ONLY (※COPYING IS POSSIBLE ON PERMITTED OUTPUT APPRATUS, UNDER THE CONDITION SPECIFIED IN iCNG=0.) AS iCNG=0, CAN COPY WITH PERMITTED OUTPUT APPARATUS.) |
| iSTC | 1 | 0 | SECURITY PARAMETER IS NOT DOT PRINTED. (※IF iSTC=0, SPECIFY OUTPUT APPARATUS SERIAL No. NFST, DOCUMENT SERIAL NO. NPRT, TOTAL NUMBER OF OBJECTS MOBJ, OBJECT NUMBER NOBJ, AND ACTIVE CODE NACT ONLY. IF iCNG≠1, PARAMETERS NEEDED FOR OTHER SECURITY PROTECTION ARE REGISTERD, CONTROLLED AND MANAGED IN OUTPUT APPARATUS OR NETWORK SERVER.) |
| | | 1 | SECURITY PARAMETER IS DOT PRINTED. |
| NFST | 8 | | SERIAL NO. OF OUTPUT APPARATUS ON WHICH FIRST DOCUMENT WAS OUTPUT (※OUTPUT APPARATUS THAT WAS USED WHEN DOCUMENT WAS PRINTED ON PRINTER FOR THE FIRST TIME, OR WHEN DOCUMENT WITH NO DOTS WAS COPIED FOR THE FIRST TIME.) |

FIG.64

| COMMENT NAME | NUMBER OF BITS | PARAMETER | 1) PARAMETER FOR DOT PRINTING ON OBJECT PRINTING SURFACE |
|---|---|---|---|
| NLST | 8 | 0 | OUTPUT APPARATUS SERIAL No. IS NOT ASSIGNED TO ANY COPYING OPERATION. |
| | | n | OUTPUT APPARATUS SERIAL No. FOR COPY DOCUMENT (※OUTPUT APPARATUS THAT OUTPUTTED THIS PRINTED MATERIAL) |
| NPRT | 20 | | DOCUMENT SERIAL No. (※SERIAL No. OF PRINTED MATERRIAL OUTPUTTED VIA OUTPUT APPARATUS NFST) |
| MTMS | 4 | 0 | THERE IS NO LIMIT ON COPYING FREQUENCY. |
| | | n | COPYING IS PERMITTED UNTIL MAXIMUM COPYING FREQUENCY n IS REACHED. |
| NTMS | 4 | 0 | COPY FREQUENCY SERIAL No. IS NOT ASSIGNED TO ANY COPYING OPERATION. |
| | | n | COPY FREQUENCY SERIAL No. FOR THIS PRINTED MATERIAL (※IF TWO OR MORE OUTPUT APPARATUSES ARE USED, IT IS ASSUMED THAT THEY ARE NETWORKED WITH EACH OTHER, AND COPY FREQUENCY IS INCREMENTED BY REFLECTING COPYING OPERATIONS ON ALL OUTPUT APPARATSES. IF NTMS=MTMS OR NCPY=MCPY, FURTHER PRINTING IS NOT PERMITTED.) |
| MCPY | 12 | 0 | NUMBER OF COPIES IS NOT LIMITED |
| | | n | COPYING IS PERMITTED UNTIL MAXUMUM NUMBER OF COPIES n IS REACHED. |
| NCPY | 12 | 0 | NUMBER OF COPIES SERIAL No. IS NOT ASSIGNED TO ANY COPYING OPERATION. |
| | | n | NUMBER OF COPIES SERIAL No. FOR THIS PRINTED MATERIAL (※NCPY=1 FOR THIS PRINTED MATERIAL, IF IT IS THE FIRST DOTTED PRINTOUT OF DOCUMENT FROM OUTPUT APPARATUS NFST, OR IF IT IS THE FIRST COPY OF DOCUMENT WITHOUT DOTS. TWO OR MORE OUTPUT APPARATUSES CAN BE USED ONLY IF THEY ARE NETWORKED WITH EACH OTHER, AND COPY FREQUENCY IS INCREMENTED BY REFLECTING COPYING OPERATIONS ON ALL OUTPUT APPARATSES. IF NTMS=MTMS OR NCPY=MCPY, FURTHER PRINTING IS NOT PERMITTED.) |
| MOBJ | 6 | | TOTAL NUMBER OF OBJECTS TO BE PRINTED ON PAPER |
| NOBJ | 6 | | NUMBER OF EACH OBJECT TO BE PRINTED |
| NACT | 6 | | ACTIVE CODE FOR EACH OBJECT (※ACTIVE CODE IS USED WHEN OBJECT DOT-PRINTED AS PART OF CONTENT IS SELECTED.) |

FIG.65

| COMMENT NAME | BIT NUMBER | PARAMETER | 1) PARAMETER FOR DOT PRINTING ON NORMAL PRINTING SURFACE |
|---|---|---|---|
| iMRK | 1 | 0 | DESCRIBES DOT PRINTING ON NORMAL PAPER SURFACE (※USE THIS PARAMETER TO PRINT DOT PATTERN ON PAPER SURFACE TOGETHER WITH IMAGE, TEXT AND MARGIN BUT NOT WITH OBJECT DEFINED IN iMRK=1.) |
| jMRK | 2 | 0 | DOT PRINTING IS NOT PERFORMED. |
| | | 1 | DOT PRINTING IS PERFORMED FOR OBJECT ONLY. |
| | | 2 | DOT PRINTING IS PERFORMED FOR NORMAL PAPER SURFACE ONLY. |
| | | 3 | DOT PRINTING IS PERFORMED FOR BOTH OBJECT AND NORMAL PAPER SURFACE. |
| iCNG | 2 | 0 | COPYING IS PERMITTED. (※COPYING IS EITHER UNCONDITIONALLY PERMITTED OR RESTRICTED. WHEN PERMITTED, THERE IS NO SECURITY PROTECTION, AND NO RESTRICTIONS ARE IMPOSED ON COPYING FREQUENCY OR NUMBER OF COPIES. WHEN RESTRICTED, MTMS IS USED TO SPECIFY MAXIMUM COPYING FREQUENCY AND/OR MCPY TO SPECIFY MAXIMUM NUMBER OF COPIES. |
| | | 1 | NO COPYING IS PERMITTED. |
| | | 2 | COPYING IS PERMITED ON THIS MACHINE ONLY. (※COPYING IS PERMITTED ON OUTPUT APPRATUS SPECIFIED IN NFST, UNDER THE CONDITION SPECIFIED IN iCNG=0.) |
| | | 3 | COPYING IS POSSIBLE ON PERMITTED OUTPUT APPARATUS ONLY (※COPYING IS POSSIBLE ON PERMITTED OUTPUT APPRATUS, UNDER THE CONDITION SPECIFIED IN iCNG=0.) |
| iSTC | 1 | 0 | SECURITY PARAMETER IS NOT DOT PRINTED. (※IF iSTC=0, SPECIFY OUTPUT APPARATUS SERIAL No. NFST, DOCUMENT SERIAL NO. NPRT, TOTAL NUMBER OF OBJECTS MOBJ, OBJECT NUMBER NOBJ, AND ACTIVE CODE NACT ONLY. IF iCNG≠1, PARAMETERS NEEDED FOR OTHER SECURITY PROTECTION ARE AND REGISTERD, CONTROLLED MANAGED IN OUTPUT APPARATUS OR NETWORK SERVER. |
| | | 1 | SECURITY PARAMETER IS DOT PRINTED. |
| NFST | 8 | | SERIAL NO. OF OUTPUT APPARATUS ON WHICH FIRST DOCUMENT WAS OUTPUT (※OUTPUT APPARATUS THAT WAS USED WHEN DOCUMENT WAS PRINTED ON PRINTER FOR THE FIRST TIME, OR WHEN DOCUMENT WITH NO DOTS WAS COPIED FOR THE FIRST TIME.) |
| NLST | 8 | 0 | OUTPUT APPARATUS SERIAL No. IS NOT ASSIGNED TO ANY COPYING OPERATION. |
| | | n | OUTPUT APPARATUS SERIAL No. FOR COPY DOCUMENT (※OUTPUT APPARATUS THAT OUTPUTTED THIS PRINTED MATERIAL) |
| NPRT | 20 | | DOCUMENT SERIAL No. (※SERIAL No. OF PRINTED MATERRIAL OUTPUTTED VIA OUTPUT APPARATUS NFST.) |
| MTMS | 4 | 0 | THERE IS NO LIMIT ON COPYING FREQUENCY. |
| | | n | COPYING IS PERMITTED UNTIL MAXIMUM COPYING FREQUENCY n IS REACHED. |

FIG.66

| COMMENT NAME | BIT NUMBER | PARAMETER | 1) PARAMETER FOR DOT PRINTING ON NORMAL PRINTING SURFACE |
|---|---|---|---|
| NTMS | 4 | 0 | COPY FREQUENCY SERIAL No. IS NOT ASSIGNED TO ANY COPYING OPERATION. |
| | | n | COPY FREQUENCY SERIAL No. FOR THIS PRINTED MATERIAL (※TWO OR MORE OUTPUT APPARATUSES CAN BE USED ONLY IF THEY ARE NETWORKED WITH EACH OTHER, AND COPY FREQUENCY IS INCREMENTED BY REFLECTING COPYING OPERATIONS ON ALL OUTPUT APPARATSES. IF NTMS=MTMS OR NCPY=MCPY, FURTHER PRINTING IS NOT PERMITTED.) |
| MCPY | 12 | 0 | THERE IS NO LIMIT ON NUMBER OF COPIES. |
| | | n | COPYING IS PERMITTED UNTIL MAXUMUM NUMBER OF COPIES n IS REACHED. |
| NCPY | 12 | 0 | NUMBER OF COPIES SERIAL No. IS NOT ASSIGNED TO ANY COPYING OPERATION. |
| | | n | NUMBER OF COPIES SERIAL No. FOR THIS PRINTED MATERIAL (※NCPY=1 FOR THIS PRINTED MATERIAL, IF IT IS THE FIRST DOTTED PRINTOUT OF DOCUMENT FROM OUTPUT APPARATUS NFST, OR IF IT IS THE FIRST COPY OF DOCUMENT WITHOUT DOTS. TWO OR MORE OUTPUT APPARATUSES CAN BE USED ONLY IF THEY ARE NETWORKED WITH EACH OTHER, AND COPY FREQUENCY IS INCREMENTED BY REFLECTING COPYING OPERATIONS ON ALL OUTPUT APPARATSES. IF NTMS=MTMS OR NCPY=MCPY, FURTHER PRINTING IS NOT PERMITTED.) TOTAL NUMBER OF OBJECTS TO BE PRINTED ON PAPER |
| KSCT | 4 | 0 | NO DOT PATTERN IS PRINTED ON PAPER SURFACE. |
| | | 1 | ONE DOT PATTERN IS PRINTED ON PAPER SURFACE. |
| | | (※THE FOLLOWING APPLIES TO WHEN DOT PATTERN IS PRINTED ON PARTITIONED PRINTING SURFACE.) | |
| | | 2 | TWO DOT PATTERNS ARE PRINTED ON SURFACE VERTICALLY PARTITIONED INTO TWO. |
| | | 3 | TWO DOT PATTERNS ARE PRINTED ON SUFACE HORIZONTALLY PARTITIONED INTO TWO. |
| | | 4 | FOUR DOT PATTERNS ARE PRINTED ON SURFACE PARTITIONED INTO TWO BOTH VERTICALLY AND HORIZONTALLY. |
| | | 5 | SIX DOT PATTERNS ARE PRINTED ON SUFACE VERTICALLY INTO TWO. PARTITIONED INTO THREE AND HORIZONTALLY PARTITIONED |
| | | 6 | SIX DOT PATTERNS ARE PRINTED ON SURFACE VERTICALLY PARTITIONED INTO TWO AND HORIZONTALLY PARTITIONED INTO THREE. |
| | | 7 | NINE DOT PATTERNS ARE PRINTED ON SURFACE PARTITIONED INTO THREE BOTH VERTICALLY AND HORIZONTALLY. |
| | | 8 | TWELVE DOT PATTERNS ARE PRINTED ON SURFACE VERTICALLY PARTITIONED INTO FOUR AND HORIZONTALLY PARTITIONED INTO THREE. |
| | | 9 | TWELVE DOT PATTERNS ARE PRINTED ON SURFACE VERTICALLY PARTITIONED INTO THREE AND HORIZONTALLY PARTITIONED INTO FOUR. |
| | | 10 | SIXTEEN DOT PATTERNS ARE PRINTED ON SURFACE PARTITIONED INTO FOUR BOTH VERTICALLY AND HORIZONTALLY. |
| JSCT(n) | 16 | 0 | DOT PRINTING IS NOT PERFORMED AT PARTITION NUMBER ⓝ. |
| | | 1 | DOT PRINTING IS PERFORMED AT PARTITION NUMBER ⓝ. |
| | (※THE FOLLOWING APPLIES TO PRINTING REGIONS OTHER THAN OBJECTS.) | | |
| IARA(n) | 16 | 0 | DOT PRINTING IS PERFORMED IN ENTIRE AREA OF PARTITION NUMBER ⓝ. |
| | | 1 | DOT PRINTING IS PERFORMED FOR IMAGES IN PARTITION NUMBER ⓝ. |
| MSCT | 4 | | TOTAL NUMBER OF PARTITIONS SUBJECTED TO DOT PRINTING |
| NSCT | 4 | | PARTITION NUMBER TO BE PRINTED IN EACH PARTITION |
| NACT | 6 | | ACTIVE CODE FOR EACH PARTITION (※ACTIVE CODE IS USED WHEN PARTITION DOT-PRINTED AS PART OF CONTENT IS SELECTED.) |

| 3 | 4 | 5 |
| 2 | 1 | 6 |

2 × 3

(b)

| 3 | 4 | 5 |
| 2 | 1 | 6 |
| 9 | 8 | 7 |

3 × 3

(c)

| 5 | 6 | 7 |
| 4 | 1 | 8 |
| 3 | 2 | 9 |
| 12 | 11 | 10 |

3 × 4

(d)

| 36 | 17 | 18 | 19 | 20 | 21 |
| 35 | 16 | 5  | 6  | 7  | 22 |
| 34 | 15 | 4  | 1  | 8  | 23 |
| 33 | 14 | 3  | 2  | 9  | 24 |
| 32 | 13 | 12 | 11 | 10 | 25 |
| 31 | 30 | 29 | 28 | 27 | 26 |

| | | | |
|---|---|---|---|
| $K_1$ 001 | $R_1$ 000 | $I'_1$ 001 | |
| $K_2$ 010 | $R_2$ 010 | $I'_2$ 100 | |
| $K_3$ 110 | $R_3$ 110 | $I'_3$ 100 | |
| $K_4$ 011 | $R_4$ 100 | $I'_4$ 111 | |
| $K_5$ 000 | $R_5$ 101 | $I'_5$ 101 | |
| $K_6$ 110 | $R_6$ 111 | $I'_6$ 101 | |
| $K_7$ 001 | $R_7$ 001 | $I'_7$ 010 | |
| $K_8$ 100 | $R_8$ 011 | $I'_8$ 111 | |
| $K_9$ 101 | $R_9$ 111 | $I'_9$ 100 | |
| $K_{10}$ 011 | $R_{10}$ 011 | $I'_{10}$ 110 | |
| $K_{11}$ 010 | $R_{11}$ 000 | $I'_{11}$ 010 | |
| $K_{12}$ 100 | $R_{12}$ 010 | $I'_{12}$ 110 | |
| $K_{13}$ 111 | $R_{13}$ 100 | $I'_{13}$ 011 | |
| $K_{14}$ 001 | $R_{14}$ 110 | $I'_{14}$ 111 | |
| $K_{15}$ 110 | $R_{15}$ 101 | $I'_{15}$ 011 | |
| $K_{16}$ 101 | $R_{16}$ 001 | $I'_{16}$ 110 | |

FIG. 87

| | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| INFORMATION BIT | 1 | 0 | 0 | 1 | 1 | 1 | 1 | 0 | 1 | 0 | 1 | 1 | 1 | 0 |

| | $K_1$ | $K_2$ | $K_3$ | $K_4$ | $K_5$ | $K_6$ | $K_7$ | $K_8$ | $K_9$ | $K_{10}$ | $K_{11}$ | $K_{12}$ | $K_{13}$ | $K_{14}$ |
|---|---|---|---|---|---|---|---|---|---|---|---|---|---|---|
| SECURITY TABLE | 0 | 0 | 1 | 0 | 1 | 1 | 0 | 1 | 1 | 0 | 0 | 0 | 1 | 1 |

| | $T_1$ | $T_2$ | $T_3$ | $T_4$ | $T_5$ | $T_6$ | $T_7$ | $T_8$ | $T_9$ | $T_{10}$ | $T_{11}$ | $T_{12}$ | $T_{13}$ | $T_{14}$ |
|---|---|---|---|---|---|---|---|---|---|---|---|---|---|---|
| TRUE VALUE | 1 | 0 | 1 | 1 | 0 | 0 | 1 | 1 | 0 | 0 | 1 | 1 | 0 | 1 |

PRINTING STRUCTURE OF MEDIUM SURFACE ON WHICH DOT PATTERN IS FORMED BY PRINTING, PRINTING METHOD, AND ITS READING METHOD

CROSS-REFERENCE TO RELATED APPLICATIONS

This application is a divisional patent application of pending application U.S. Ser. No. 13/219,489 filed on Aug. 26, 2011, which is a divisional patent application of U.S. Ser. No. 12/977,832 filed on Dec. 23, 2010, now U.S. Pat. No. 8,023,148, which is a division of U.S. National Phase patent application Ser. No. 11/665,383 under 35 U.S.C. §371 of International Patent Application PCT/JP2004/015286, now U.S. Pat. No. 7,876,460, the entirety of which are herein incorporated by reference.

FIELD OF THE INVENTION

The present invention relates to an art effective in applying to a dot pattern reading system that reads a dot pattern printed on a medium surface and outputs the data corresponding to the dot pattern.

BACKGROUND THE ART

There are known arts for reading a dot pattern printed on the surface of a medium, such as paper, and outputting the data corresponding to such dot pattern.

Several researchers, including the present inventor, have focused on the dot pattern layout theory and proposed different techniques for effective layout of dot patterns.

Along with these efforts, technology for printing dot patterns has become increasingly sophisticated, and this has made it possible today to arrange a dot pattern with much higher densities on a paper surface.

Patent literatures that propose dot pattern reading systems reflecting these advancements include Japanese Patent Domestic Laid-open Publication No. 2003-528387 applied by Anoto AB (Patent literature 1).
The present invention incorporates two prior arts relating to dot patterns:
PCT/JP03/03162 and PCT/JP03/16763, both by the present inventor (hereinafter referred to as "GRID-1" and "GRID-2," respectively, for the sake of simplicity).
[Patent Literature 1] Japanese Patent Domestic Laid-open Publication No. 2003-528387

DISCLOSURE OF THE INVENTION

Objects of the Invention

A typical system adopting the dot patterns described in Patent Literature 1 above takes an image of a dot pattern by use of an optical reading means and then recognizes the dot pattern from within the image. This implies that the dot pattern could possibly be visually recognized by a careful look at the medium surface.

If visually recognizable, a dot pattern faces the problem of threatened confidentiality due to the ease of analysis of the information contained therein.

Also associated with a dot pattern visibly printed on a medium surface is the problem of compromised aesthetic quality of the medium surface.

Possible solutions for these problems are to print dot patterns using special types of transparent inks that react with infrared or ultraviolet light. These, however, are not realistic solutions due to requirements for prohibitively high printing costs and increased complexity of reading units. These methods that use special optical filters are particularly unsuitable for cellular phone terminals with the photograph and imaging function, which have become increasingly widely used in recent years.

The present invention has been made with the foregoing background in mind. A technical object of the present invention is to provide an easy and inexpensive method of realizing a "stealth" dot pattern, whose presence on a medium surface is not visually recognizable, merely through minor improvements in the existing printing technology.

According to claim 1 of the invention, there is provided a medium surface on which a dot pattern is formed, for use with a dot pattern reading system that irradiates infrared or ultraviolet light on a medium surface having a dot pattern provided thereon, recognizes the dot pattern by reading the reflections of the light by use of an optical reading means, converts the dot pattern into the corresponding data, and outputs the text, voice, images and so forth contained in the data, wherein dots forming said dot pattern are a print structure provided by the printing process on said medium surface by use of an ink of any desired color reactive in the infrared or ultraviolet wavelength range.

The above-mentioned ink reactive in the infrared or ultraviolet wavelength range ("reactive ink") can be any ink having the feature of reacting to light in infrared or ultraviolet wavelength range, a typical example being a carbon ink. If an ink not reactive in the infrared or ultraviolet wavelength range ("non-reactive ink") is used, light in these wavelength ranges irradiated on a printed surface (or a medium surface) will be reflected from the inked surface, together with visible light. With an ink reactive in the infrared or ultraviolet wavelength range, on the other hand, the inked surface will absorb (or react with) light in the infrared or ultraviolet wavelength range, hence no reflection occurs.

While a typical ink reactive in the infrared or ultraviolet wavelength range (reactive ink) is carbon-based, those inks that do not contain carbon can also be used in the present invention. An example of inks with no carbon in their molecular structure but with the feature of absorbing (or reacting with) infrared light is a stealth ink, representative of which is available on the market under the product name "Dry Rich Ink" (Trade Mark).

According to claim 2 of the invention, there is provided a medium surface on which a dot pattern is formed, for use with a dot pattern reading system that irradiates infrared or ultraviolet light on a medium surface having a dot pattern provided thereon, recognizes the dot pattern by reading the reflections of the light by use of an optical reading means, converts the dot pattern into the corresponding data, and outputs the text, voice, images and so forth contained in the data, wherein dots forming said dot pattern are a print structure provided by the printing process on said medium surface by use of an ink that is similar in color to said medium surface and that is reactive in the infrared or ultraviolet wavelength range.

By printing dots in a similar color to that of the medium surface (e.g., paper surface), it becomes possible to make the presence of the dots invisible to naked eyes and also to ensure that, when reading the dot pattern, the dot section print-formed on the medium surface by use of an ink reactive in the infrared or ultraviolet wavelength range is recognized without fail from the reflections of the light.

According to claim 3 of the invention, there is provided a print structure for a medium surface on which a dot pattern is formed, for use with a dot pattern reading system that irradiates infrared light on a medium surface having a dot pattern provided thereon, recognizes the dot pattern by reading the reflections of the light by use of an optical reading means, converts the dot pattern into the corresponding data, and outputs the text, voice, images and so forth contained in the data, wherein dots forming said dot pattern are a print structure provided by the printing process on said medium surface by use of an ink that is reactive in the infrared wavelength range, and a normal print layer is formed above these dots by use of an opaque ink of a similar color to that of said medium surface or any other desired color.

According to the above-described method, the lower-layer dot pattern becomes invisible to naked eyes because a dot pattern is print-formed by use of an ink reactive in the infrared or ultraviolet wavelength range and, above this, a normal print layer is formed in an opaque ink of a similar color to that of the medium surface or any other desired color. However, light in infrared wavelengths is longer than said normal print layer and hence can reach the dot pattern underneath, allowing the dot pattern to be recognized optically from infrared light reflections.

According to claim 4 of the invention, there is provided a method of printing a dot pattern for use with a dot pattern reading system that reads a dot pattern formed on a medium surface by use of an optical reading means, converts the dot pattern into the corresponding data, and outputs the text, voice, images and so forth contained in the data, said method comprising: superpose-printing dots in a concentric fashion by use of an ink that is reactive (or absorbs) the infrared or ultraviolet wavelength range and that is of a single color or multiple colors identical or approximate to the color(s) of the image located at the dot positions; adjusting the color having the highest halftone value among all the colors of said dots (the "highest-halftone color") to have the same diameter as the diameter of each dot read by the optical reading means; and determining the diameter of each dot in a target color by first dividing the amount of halftone dots in that color by the amount of halftone dots in the highest-grade color, then obtaining a square root value of the resultant value, and finally multiplying the square root value by the diameter of said highest-grade color.

According to this method, it becomes difficult to recognize dots visually because these dots are superpose-printed in a concentric fashion to form an area in an approximate color to its periphery and thus are hardly distinguishable.

According to claim 5 of the invention, there is provided a method of printing a medium surface containing a dot pattern, said method comprising: calculating the C, M and Y values of an original image respectively; generating a drawing print data by excluding at least part of the achromatic regions where said C, M and Y values are respectively common; calculating the K (black) component of said excluded part of the achromatic regions; and print-forming a dot pattern generated in advance based on the input information on said medium surface by use of the K ink (black) that is optically distinguishable from the remaining part of the achromatic regions in the visible light range.

According to this method, an image read by an optical reading unit is made to be recognizable through the color separation process, so that a dot pattern can be read with a digital camera function provided on a general digital camera or cellular phone terminal, without having to rely on a complex component, such as an infrared radiation mechanism or optical filter. Furthermore, by generating a drawing print data by excluding at least part of the achromatic regions where said C, M and Y values are respectively common (an area that is close in color to the K ink (black)), it becomes possible to prevent errors when reading dot patterns in the K ink (black).

According to claim 6 of the invention, there is provided a method of reading a printed surface containing a dot pattern, for use with a system that reads a dot pattern formed on a medium surface by use of an optical reading means, converts the dot pattern into the corresponding data, and outputs the text, voice, images and so forth contained in the data, said method comprising: when reading the RGB data obtained from an original image, searching the pixels of the read original image to find a pixel having the minimum sum of the R, G and B values, and, using these R, G and B values as correction reference values, deducting said correction reference values from the other RGB values of each of the other pixels; obtaining an average of the maximum and minimum values of the RGB data of each of the other pixels after deduction; determining a specific region α by calculating from the average; judging whether or not all the RGB values are contained in said region α; if not contained, determining that the gray scale is white (100%); and, if contained, when converting said average into a gradation value, setting said region α to have a smaller width if the gray scale value determined based on said average is higher and setting said region α to have a larger width if the gray scale value determined based on said average is lower, thereby allowing a dot pattern in the K ink (black) to be optically identified in the visible light range in a region where such dot pattern coexists with a normal printed portion.

It is a generally known fact that there are certain characteristics in the behavior of CMOS and other optical reading devices. For example, a read image may generally become bluish. These characteristics are often caused by lopsided color compositions, in which one color component is predominant and has a large influence within an image region, making the rest of the colors tinted in that color. Another possible cause for these characteristics is manufacturing variations among units. When attempting to recognize a dot pattern from such a characteristic image, a reading error may often result. This is particularly true when the color separation process similar to the ones described in claims 5 and 6 is involved, because the K ink (black) tends to be less illegible under the influence of the blue component. The method described in claim 6 is a technique to perform correction before reading.

This method searches a read image to find a pixel having the minimum sum of RGB values. A pixel having the minimum sum of RGB values can safely be determined to be a dot. If it is found during the search that the RGB values are uneven (for example, the B value is significantly higher than the R and G values), this suggests that the image has been modified. To correct this state, this method uses the R, G, and B values for the pixel having the minimum sum of RGB values as correction reference values, respectively, and deducts each of the correction reference values from the corresponding value for other pixels. By this, the image modified by CMOS is restored to the state before modification. This method then searches for the minimum sum of RGB values. This is equivalent to searching for dots. This method further proceeds to discover the darkest region formed by these dots.

By deducting each of the R, G and B components of the minimum RGB region from the corresponding component of the other pixels, the inherent color image, which is optimum for recognition of a dot pattern by the color separation method, can be restored.

Thus, this method facilitates the identification of a dot pattern in the K ink (black) in the visible light range, by obtaining an average of the maximum and minimum values for the RGB data of the corrected image, and then setting said region α to have a smaller width if the gray scale of the average value is higher and setting said region α to have a larger width if the gray scale of the average value is lower.

In cases where a deduction of said RGB components from those of a pixel results in a negative value, this method uses a fixed value of "0" for all such pixels. For the purpose of extracting the minimum RGB region, correction reference values may be calculated from several sampled pixels.

According to claim 7 of the invention, there is provided a method of printing a medium surface containing a dot pattern, for use with a dot pattern reading system that reads a dot pattern formed on a medium surface by use of an optical reading means capable of reading in the visible light range, converts the dot pattern into the corresponding data, and outputs the text, voice, images and so forth contained in the data, said method comprising: generating a drawing print data by excluding at least part of the achromatic regions where said C, M and Y values are respectively common: calculating said K (black) component of said excluded part of the achromatic regions; and defining information in a dot pattern generated based on the pre-input information by displacing the individual dots forming the original halftone dots according to a pre-determined logic through use of the K ink (black) that is optically distinguishable from the remaining part of the achromatic regions in the visible light range.

According to this method, since halftone dots printed by the AM printing method are shared for use as dot-pattern dots, it becomes difficult to visually distinguish between halftone dots in a print and dots in a dot pattern.

When the color components are C, M and Y, an achromatic region, or a region occupied by the K (black) component, can be obtained by taking out the common part to these color components. While, for this reason, this method extracts the K (black) component to form a dot pattern that shares dots with halftone dots, a dot pattern may also share dots with halftone dots of a color other than said K (black) component, that is, any one of the colors C, M and Y.

According to claim 8 of the invention, there is provided a method of printing a medium surface containing a dot pattern, for use with a dot pattern reading system that irradiates infrared or ultraviolet light on a medium surface containing a dot pattern that is reactive in the infrared or ultraviolet wavelength range, recognizes the dot pattern by reading the reflections of the light by use of an optical reading means, converts the dot pattern into the corresponding data, and outputs the text, voice, images and so forth contained in the data, said method comprising: forming a dot pattern that shares dots with halftone dots in one of the colors C, M, Y and K in an original image; and superpose-printing a dot pattern within said halftone dots by use of an ink of said one selected color that is reactive in the infrared or ultraviolet range.

This method prints a dot pattern by utilizing the halftone dot printed by the AM printing method as described in claim 7, but it differs from the claim 7 method in that it superpose-prints a dot pattern within halftone dots by use of an ink that is reactive in the infrared or ultraviolet wavelength range. Because of this, dots can be placed in any halftone dot regardless of its size, thereby eliminating the need of the process of controlling CMY for color separation as described in claim 7. Since dots are not dependent on the size of the halftone dot, dots of the same size can consistently be used and consequently errors when reading dots can be minimized.

Since dots are superpose-printed within halftone dots and the halftone dots are not duplicated into a printed image, the printed surface will not become darkened.

While a dot pattern that shares dots with halftone dots within the same document may be of any one color among said C, M, Y and K, a dot pattern may also be superpose-printed by use of an ink that is reactive in the infrared or ultraviolet wavelength range and that is of the same color as each of the halftone dots of different colors existing within the same document. For example, if the amount of the C component is larger than the rest of the components in a particular region within a document, then a dot pattern may share dots with halftone dots of the C component in that region. Similarly, the dot pattern may share dots with halftone dots of the M component in a region where the M component is predominant.

To cite an example, in an image containing a black crow and a person wearing yellow clothes, the dot pattern may share dots with halftone dots of the K (black) component at the region of the black crow, and share dots with halftone dots of the Y component at the region of the yellow clothes.

According to claim 9 of the invention, there is provided a method of printing a medium surface, for use with a reading system that irradiates infrared light on dot patterns, text, symbols, graphics and so forth formed on a medium surface and recognizes said dot patterns, text, symbols, graphics by reading the reflections of the light by use of an optical reading means, said method comprising: setting up a region in an image to be recognized by the system as a dot pattern, text, symbol, graphic, etc., as a mask region; printing the regions other than said mask region by use of an ink not reactive in the infrared or ultraviolet wavelength range (hereinafter referred to as a "non-reactive ink"); and printing said mask region by use of an ink reactive in the infrared or ultraviolet wavelength range (hereinafter referred to as a "reactive ink"), thereby enabling said mask region to be recognized when a medium surface is read by said optical reading means.

According to this method, since in an image the mask region is the only region printed in an ink reactive in the infrared or ultraviolet wavelength range, it becomes possible to recognize such mask region by use of an optical reading means capable of irradiating infrared light. It is difficult to visually recognize such mask region because a print in a reactive ink is hardly distinguishable from a non-reactive ink with human eyes.

According to claim 10 of the invention, there is provided a method of printing a medium surface containing a dot pattern, for use with a dot pattern reading system that reads a dot pattern formed on a medium surface by use of an optical reading means, converts the dot pattern into the corresponding data, and outputs the text, voice, images and so forth contained in the data, said method comprising: respectively for the C, M, Y and K color components in an the original image, forming FM screening dots in such a manner that identically-shaped color dots are disposed randomly; among said FM screening dots for said color components, printing those FM screening dots located at the positions at which dots based on a dot pattern will be disposed, in reactive inks (which react in the infrared or ultraviolet wavelength range) of colors that are respectively identical or approximate to the color components in the original image; and printing the rest of said FM screening dots in non-reactive inks.

According to this method, a dot pattern in an ink of an identical or approximate color is print-formed within such FM screening dots by using the FM screening printing method for disposing identically-shaped dots randomly. Visual recognition of the dot pattern is difficult since the dot pattern is identical or approximate in color to the FM screening dots. The dot pattern is print-formed by use of an ink reactive in the infrared or ultraviolet wavelength range, so that it can be recognized by an optical recognition means capable of irradiating infrared light.

According to claim 11 of the invention, there is provided a method of printing a medium surface containing a dot pattern, for use with a dot pattern reading system that reads a dot pattern formed on a medium surface by use of an optical reading means, converts the dot pattern into the corresponding data, and outputs the text, voice, images and so forth contained in the data, said method comprising: during the process of generating FM screening dots in which identically-shaped color dots are randomly disposed, dividing the print area by the number of dots to obtain an area per dot, and generating a drawing print data according to the FM screening dots by excluding at least part of the achromatic regions where the C, M and Y pixels contained in such area per dot are respectively common: calculating the K (black) component of said excluded part of the achromatic regions; and disposing a dot pattern generated based on the pre-input information on the drawing print data by using the pixels of said K (black) component.

According to this method, the FM screening printing method can also generate pixels of the K components by collecting regions having the common halftone values from the C, M and Y components, thereby allowing these pixels to be used as dots in a dot pattern.

According to claim 12 of the invention, there is provided a method of inputting and replaying voice data associated with a dot pattern on a medium surface by use of a cellular phone terminal provided with the photograph and imaging function and the voice input function, comprising the steps of: inputting a voice message through a microphone provided on the cellular phone terminal; photographing a medium surface having a dot pattern printed thereon through a camera provided on the cellular phone terminal; generating association information by associating the dot code number acquired from said photographed image of the dot pattern with said voice data; storing said dot code number, said voice data and said association information in a storage means; and, when the dot pattern on said medium surface is photographed using said camera of the cellular phone terminal, searching the association information in said storage means, based on the dot code number acquired from the photographed image of said dot pattern, reading from said storage means and replaying the voice data associated by the association information.

According to this method, by taking an image of a dot pattern using the photograph and imaging function (digital camera function) of the cellular phone terminal and associating the dot pattern with the voice data input using the voice input function (voice recorder function), it becomes possible to replay at a later time the voice data associated when the dot pattern of the medium surface was photographed. As a medium surface dot pattern for this purpose, any dot pattern that is analyzable by using the color separation process described in claims 5, 6, 7 and 11 can be used.

According to claim 13 of the invention, there is provided the method of inputting and replaying voice data associated with a dot pattern on a medium surface of claim 12, wherein said storage means is a memory of said cellular phone terminal or a flash memory removably mounted on said cellular phone terminal.

According to this method, a memory installed on a cellular phone terminal or a flash memory removably mounted thereon can be used as a storage means, and thus it is possible to build a system based on software only, without having to add any hardware. If a removable flash memory is used, by inserting such flash memory into another cellular phone terminal, the other cellular phone terminal can replay the same voice data by reading said dot pattern.

According to claim 14 of the invention, there is provided a method of inputting and replaying voice data associated with a dot pattern on a medium surface, by use of a cell-phone terminal provided with the photograph and imaging function and the voice input function, comprising the steps of: inputting a voice message through the microphone provided on a first cell-phone terminal; photographing a medium surface having a dot pattern printed thereon through the camera provided on said first cell-phone terminal; generating association information by associating the dot code number acquired from the photographed image of said dot pattern with said voice data; storing said dot code number, said voice data and said association information in the storage means of said first cellular phone terminal; transferring said dot code number, said voice data and said association information from the storage means of said first cellular phone terminal to the storage means of a second cellular phone terminal; and, when the dot pattern on said medium surface is photographed using the camera of said second cellular phone terminal, searching the association information in storage means of said second cellular phone terminal, based on the dot code number acquired from the photographed image of said dot pattern, reading from said storage means and replaying the voice data associated by the association information.

According to this method, by transferring a dot code number, voice data and association information between cellular phone terminals, it becomes possible for multiple cellular phone terminals to replay the same voice data when said dot pattern has been imaged by their photograph and imaging function.

According to claim 15 of the invention, there is provided a method of inputting and replaying voice data by using a photo sticker photographing unit that prints a photo sticker having a dot pattern printed thereon, said method comprising the steps of: photographing a subject using the camera of a photo sticker photographing unit; said photo sticker photographing unit receiving a dot code number issued by a dot code number management server connected via a network; printing out in the form of a photo sticker a dot pattern containing said photographed image and said dot code number resulting from conversion according to a pre-determined logic, from the printing unit of the photo sticker photographing unit; adding an ID to the voice data which has been input at the reception of the voice input from the user through the microphone of said photographing unit, and registering such voice data in the voice management server via the network; registering in said dot code management server the association information that associates the ID of said voice data with said dot code number; reading the dot pattern printed on said photo sticker by using a photographing means; said photographing means transferring the imaged data of the dot pattern, and the information processing terminal converting the imaged data into a dot code corresponding to said dot pattern; accessing said dot code number management server from the information processing terminal, based on the dot code acquired from the photographed image of the dot pattern read in the previous step; and searching said association information in said dot code number management server to retrieve the ID of the voice data associated with said dot code number, and downloading such voice data from a voice management server, based on such ID, to said information processing terminal for replay.

According to this method, on a photo sticker unit called "Pricla" (registered trademark), one can print out a dot pattern on a photo sticker, associate such dot pattern with the voice message input through the microphone, and register the information in the voice management server via a personal computer or a cellular phone terminal. By this, when reading the dot pattern on a photo sticker by using a camera-equipped cellular phone terminal or an optical reading unit, it becomes possible to replay the voice message input by the photographing person at the time when he or she photographed said photo sticker, on a personal computer, etc., connected to the cellular phone terminal with a camera or the optical reading unit.

According to claim 16 of the invention, there is provided a method of inputting and replaying voice data through a photo sticker having a dot pattern printed thereon, said method comprising the steps of: downloading a dot pattern image data containing a dot pattern from a server to an information processing terminal; said information processing terminal storing the voice data input via a voice input means in association with said dot pattern; said information processing terminal synthesizing a photo image photographed by use of a photographing means with said dot pattern image; a printing means, capable of communication with said information processing terminal, printing on sticker paper a synthesis of said photo image and said dot pattern image received from said information processing terminal; and said information processing terminal, or another information processing terminal which has received the voice data associated with said dot pattern from said information processing terminal, replaying said voice data associated with said dot pattern immediately after receiving the photographed image from the photographing means which has photographed the dot pattern printed on said sticker paper.

Examples of an information processing terminal that can be used for this purpose include a personal computer, PDA and cellular phone terminal. For example, this method can proceed as follows. A user downloads a dot pattern image data from a server to a personal computer; inputs voice data through a microphone connected to such personal computer; associates this voice data with said dot pattern image and stores the results in the memory of the personal computer; on the personal computer, synthesizes with said dot pattern image a photo image photographed by means of a digital camera or other photographing means; and prints out the synthesized photo image by using a printing means, such as a printer connected to the personal computer. The user can transfer said voice data to another information processing terminal, e.g., another personal computer or cellular phone terminal, via a card or communication means. When another user photographs said synthesized photo image using the camera function of the another cellular phone terminal or a digital camera connected to the another personal computer, such another user can read the dot pattern from said synthesized photo image and replay said voice data associated with the dot pattern by means of such another cellular phone terminal or personal computer. For example, using this capability, one can place dot patterns in frame images for photo stickers for sale via download. In addition to this, one can offer an application program for management of these frame images and registration of voice data, available for download to cellular phone terminals with the photograph and imaging function.

While the photo sticker above refers to a sheet on which to print photo data, this method can also be applied to picture books, photo albums, etc., on which text and other information are printed in addition to photo data.

According to claim 17 of the invention, there is provided a printing unit that reads via an optical reading means a medium having print parameters provided thereon as a dot pattern and controls the printing process through such print parameters, comprising: an optical reading means for reading a medium surface; a dot pattern reading means for reading out a dot pattern from an image of the medium surface read by the optical reading means; a conversion means for converting the read dot pattern into print parameters; and a print control means for controlling the printing process based on the resultant print parameters.

The printing unit above may be a printer or color copier. When performing the printing process on such unit, it becomes possible to manage the number of times a particular original document can be copied, the print history and so forth by reading a dot pattern printed on such original document, converting such dot pattern into the corresponding print parameters, and performing the printing process based on such parameters.

According to claim 18 of the invention, there is provided a printing unit that optically reads an original document, generates a print data corresponding to the read image, and prints the generated print data onto a medium surface, comprising: a means for designating a specific region within an image which has been optically read from said original document; a means for assigning a specific dot pattern to the designated specific region; and a print control means for printing a dot pattern at said specific region when printing the print data onto said medium surface.

According to the above-described unit, a region within a document at which a dot pattern should be formed can be designated with greater ease on a copier, printing unit or other means. One can thus print out a printed material having various information and codes embedded as desired.

For example, it becomes possible to read out a picture book, etc., and print a dot pattern by designating a desired region in a desired picture contained in that picture book.

According to claim 19 of the invention, there is provided a printing unit of claim 18, wherein a dot pattern assigned to a specific region is a content of voices, still images, moving images or other signals, a code associated therewith, or confidential information in such document.

By using this printing unit, one can register a content of voices, still images, moving images or other signals as a dot pattern, or convert a code specifying the address of such content into a dot pattern. Furthermore, this printing unit makes it possible to safely manage confidential information by encrypting dot patterns or registering copy protection codes or the like as dot patterns.

Advantageous Effects of the Invention

Every dot pattern, according to the present invention, is not visually recognizable, and the risk of being analyzed due to the ease of visual recognition can be prevented and thus provides an effect of enhanced security. This feature of the present invention also provides an effect that the aesthetic quality of a medium surface can be maintained.

DESCRIPTION OF THE PREFERRED EMBODIMENTS

Hereinafter, referring to accompanying drawings, embodiments of the present invention will be described.

Each drawing shows an example mode for carrying out the invention, and the elements assigned the same codes in the drawings represent the same items, respectively.

The principle of the dot patterns used in the present invention will first be described. This description of the present invention will be made based on two different examples of dot pattern layout algorithms, both invented by the present inventor. These algorithms are referred to as "GRID-1" and "GRID-2" for the sake of simplicity.

GRID-1 and GRID-2 were applied for patent by the present inventor under the international application numbers PCT/JP03/03162 and PCT/JP03/16763, respectively.

(Description of Dot Pattern: GRID-1)

FIG. 71 is an explanatory diagram showing an example dot pattern according to the present invention. FIG. 72 is an enlarged view showing an example of the information dot of a dot pattern and bit display of the data defined therein. FIG. 73 is an explanatory drawing showing computer dots, with key dots disposed in the center.

The information input and output method using a dot pattern of the present invention comprises means for generating a dot pattern 1, recognizing the dot pattern 1, and outputting information and a program from the dot pattern 1. More specifically, after an image data of a dot pattern 1 is captured by a camera as a means of imaging (or an optical reading unit connected to a personal computer, a digital camera, the camera function of a camera-equipped cellular phone terminal), this method digitizes the image data by means of an analysis program, which is installed in a reading unit, personal computer, or camera-equipped cellular phone terminal, by first extracting grid dots, then extracting key dots 2 based on the absence of dots at positions where grid dots should inherently exist, and finally extracting computer dots 3, thus, an information region is extracted. This method then converts the information region into codes containing digitized information, and causes the voice data, other information and programs that are associated with these codes to be output. The computer dots 3 may be coordinates, instead of codes, or they may even be the results of digitizing voice data and other information.

The dot pattern 1 of the present invention is generated by use of a dot code generation algorithm, which places key dots 2, computer dots 3 and grid dots 4 according to pre-determined rules. In GRID-1, as shown in FIG. 71, a block of dot pattern 1, which represents information, is formed in a layout in which 5.times.5 grid dots 4 are disposed around a key dot 2, and computer dots 3 are placed around a hypothetical point which is surrounded by four grid dots 4. In this block, arbitrary numerical information is defined. The example illustrated in FIG. 71 shows four blocks of dot pattern 1 (each enclosed by a thick line box) arranged in parallel. It goes without saying, however, that the dot pattern 1 is not limited to a 4-block layout configuration.

A set of computer and program can be registered in either a corresponding single block or corresponding multiple blocks.

When capturing an image data of a dot pattern 1 using a camera, the grid dots 4 in the dot pattern can correct lens distortion, cross shot, expansion or contraction of a page space, curvature of a medium surface, and displacement during printing. More specifically, a correction function (Xn,Yn)=f(X'n,Y'n) for converting distorted four grid dots 4 into an original square is obtained, and the information dot is corrected by the same function to thereby obtain vectors of correct information dots 3.

When grid dots 4 are disposed in a dot pattern 1, an image data of a dot pattern 1 captured by a camera corrects distortion inherent in the camera. Therefore, accurate recognition is ensured even when an image data of a dot pattern 1 is captured by a popular type camera with a lens with a high distortion rate. When a dot pattern 1 is read by a camera from an oblique view, the dot pattern 1 can also be recognized accurately.

The key dot 2, as shown in FIG. 71, is a dot which is disposed by unidirectionally shifting one grid dot 4 which is located approximately at a center position of the grid dots 4 arranged in a rectangular shape. The key dot 2 may also be disposed by unidirectionally shifting grid dots at four corners that form a block (see FIG. 82). The key dot 2 is a representative point of one block's worth of dot pattern 1 which represents the information dot 3. For example, the key dot 2 may be one resulting from shifting the grid dot 4 at the center of a block of the dot pattern 1 upwards. When the information dot 3 represents X,Y coordinate values, the center position of that block becomes a representative point. This numerical value (the number of dots) is not limited to this, and can be varied according to the size of a block of the dot pattern.

While each key dot 2 is disposed at the center of a block, it may also be disposed relative to a grid point that forms a corner of a block.

The information dot 3 is a dot which is used to have various information recognized. This information dot 3 is, with the key dot 2 set as a representative point, disposed at a circumference thereof, and with a center surrounded by the four grid dots 4 set as a hypothetical point, disposed at an end point of a vector represented by using this hypothetical point as a start point. This information dot 3 is surrounded by the grid dots 4. Each dot disposed at a position shifted from the hypothetical point of these grid dots 4 has a direction and length represented by a vector. For example, as shown in FIG. 72, the information dot is disposed in 8 directions at clockwise rotation intervals of 45 degrees and represents 3 bits. Therefore, one block's worth of this dot pattern 1 can represent 3 bits.times.16 pieces=48 bits.

While the information dot 3 is disposed in 8 directions and represents 3 bits in the example shown in the figure, it goes without saying that the information dot 3 is not limited to such disposition but can be disposed in 16 directions to represent 4 bits and in various other ways.

An interval between an information dot 3 and a hypothetical point surrounded by four grid dots 4 is desirably approximately 15-30% of an interval between two adjacent hypothetical points. This is because, if a distance between the information dot 3 and the hypothetical point is greater than this interval, dots are prone to be viewed as a large lump, making the dot pattern 1 as a whole ugly. Conversely, if a distance between the information dot 3 and the hypothetical point is smaller than this interval, it becomes difficult to make out as to which one of the adjacent hypothetical points the vector directions of this information dot 3 has been derived from.

For example, the information dot 3, as shown in FIG. 73, is disposed at regions from I1 to I16 in a clockwise order around the key dot 2, providing 3 bits. times. 16 pieces=48 bits available for representation.

A block is further divided into sub-blocks, which individually can hold information contents that are mutually independent and not affected by the others. FIG. 73 shows this configuration, where sub-blocks each consisting of four information dots, [I1,I2,I3,I4], [I5,I6,I7,I8], [I9,I10,I11,I12] and [I13,I14,I15,I16], are formed so that mutually independent data (3 bits.times.4=12 bits) are deployed in the respective computer dots. By providing sub-blocks in this manner, it becomes possible to conduct error checks more easily, on a per-sub-block basis.

The vector directions (in rotational direction) of the computer dot 3 are desirably provided at equal intervals of 30 to 90 degrees.

FIG. 74 shows another example of the information dot of a dot pattern and bit display of the data defined therein. It becomes possible to represent 4 bits by using two kinds of vectors, long and short, and providing the computer dot 3 in 8 vector directions from a hypothetical point enclosed by grid dots 4. The interval for long vectors is desirably 25% to 30%, and that for short vectors 15% to 20%, of the interval between two adjacent hypothetical points. The center-to-center interval of the information dots 3 with long and short vectors is desirably greater than the diameter of each dot.

Taking an appearance into consideration, it is desirable that the information dot 3 surrounded by the four grid dots 4 is represented by one dot. However, where priority is given to an increased amount of information, rather than to an appearance, a goodly amount of information can be held if the information dot 3 is represented by a plurality of dots by assigning 1 bit to each 1 vector. For example, if 8 concentric vector directions are used, an information amount of $2^8$ can be represented by an information dot 3 surrounded by four grid dots 4, which amounts to $2^{128}$ in total for all the 16 information dots in one block.

FIG. 75 shows an example of the information dot and bit display of the data defined therein; (a) shows an example with 2 dots disposed, (b) shows one with 4 dots disposed, and (c) shows one with 5 dots disposed.

FIG. 76 shows example variations of a dot pattern; (a) shows a schematic diagram of 6 information dot allocation type, (b) 9 information dot allocation type, (c) 12 information dot allocation type, and (d) 36 information dot allocation type.

The dot pattern 1 shown in FIG. 71 and FIG. 73 is an example of disposing 16 (4×4) computer dots 3 in one block. However, this information dot 3 can be modified variously, without being limited to having 16 dots disposed in 1 block. For example, in accordance with the amount of information required and the level of resolution of the camera used, variation (a) has 6 information dots 3 (2×3) disposed in 1 block, variation (b) has 9 information dots 3 (3×3), variation (c) has 12 information dots 3 (3 times 4), and variation (d) has 36 information dots 3 (6×6).

FIG. 77(*a*), (*b*) are explanatory drawings showing a state in which information dots I1 through I16 are arranged in a line, in order to explain a method of checking for errors in the information dot.

This method gives redundancy to one of the 3 bits assigned to one said information dot 3, assuming that the high-order bit of the data obtained from information dot In and the low-order bit of the data obtained from information dot In+1 are identical. This method checks a medium surface of a printed material, etc., on which information dots 3 are displayed, and if the high-order bit of the data obtained from information dot In and the low-order of the data obtained from information dot In+1 are not identical, it judges that the information dots 3 are not displayed at correct positions.

FIG. 77(*b*) is an explanatory drawing showing a state in which information dots I1 through I16 are arranged in a line, in order to explain a method of checking for errors in the information dot on a per-sub-block basis.

The error check method shown in FIG. 77(*b*) gives redundancy to one of the bits, as with FIG. 77(*a*), but carries out an error check on each sub-set of data (3 bits×4=12 bits) independently held in the sub-blocks each consisting of four information dots 3: [I1, I2, I3, I4], [I5, I6, I7, I8], [I9, I10, I11, I12] and [I13, I14, I15, I16]. By this, this method can without fail detect errors in which an input of the information dot 3 in a dot pattern 1 is displaced to positions at which the adjacent information dot 3 holding another set of data is disposed due to a displacement during printing onto the medium surface of a printed material, etc., an expansion or contraction in the medium surface or a displacement at the time of pixilation.

FIG. 78 is an explanatory drawing of a method of checking for errors in the information dot by assigning "0" to the low-order bit.

The information dot 3 can be used for an error check by assigning "0" or "1" to its low-order bit. In a state in which the information dot 3 is displayed on a medium surface, this method can detect that the information dot 3 is not displayed at the correct position, that is, at the position of another information dot 3 which holds another set of data and which is adjacent to this information dot 3 relative to the hypothetical point. For example, assuming that the key dot 2 is defined in an upward direction and that data defined in the information dot 3 of that direction is "0", this method disposes the information dot 3 in any one of the 8 directions and assigns "0" to the low-order bit for use in an error check. That is, the information dot 3 whose low-order bit is assigned "0" is always disposed in vertical or horizontal directions relative to the hypothetical point. By this, if this information dot 3 is located in an oblique direction, this method can determine that it is not displayed at the correct position.

FIG. 79 is an explanatory drawing of a method of checking for errors in the information dot by assigning "1" to its low-order bit.

In this context, when the key dot 2 is defined in an upward direction and the data defined in the information dot 3 in that direction is "0", it is also possible to detect errors in the information dot 3 by disposing the information dot 3 in any one of the 8 directions and assigning "1" to the low-order bit. That is, the information dot 3 whose low-order bit is assigned "1" is always disposed in an oblique direction relative to the hypothetical point. Based on this fact, if this information dot 3 is located in a vertical or horizontal direction, this method can determine that it is not displayed at a correct position.

FIG. 80 is an explanatory drawing of a method of checking errors in the information dot by assigning "0" and "1" alternately to the low-order bit.

Furthermore, it is also possible to detect errors in the information dot 3 by disposing one set of information dots 3 evenly and assigning "0" and "1" alternately to each of the low-order bits for use in an error check. This type of error check eliminates regularity in a dot pattern by generating information dots in vertical, horizontal, and 45-degree oblique directions alternately. That is, an information dot 3 whose low-order bit is assigned "0" and "1" to alternately is always located in a vertical, horizontal or a 45-degree oblique direction with respect to the hypothetical point. Based on this fact, this method determines that the information dot 3 is not displayed at the correct position if it is located in any direction other than vertical, horizontal and 45-degree oblique directions. In this manner, this method can without fail detect errors that occur when the information dot 3 is input at a rotationally displaced position with respect to the hypothetical point.

In addition, when the information dot 3 is generated in 8 directions (at intervals of 45 degrees) and in two different lengths, long and short (see FIG. 74), this method can assign "0" or "1" to one low-order bit among the 4 bits and, if the information dot 3 is displaced to any of the 3 points in proximity (i.e., concentric circle±2 points at 45-degree rotational positions+either of long and short lengths), can determine the state as an error, thereby achieving a 100% success rate in error checks.

FIG. 81 is an explanatory drawing showing a state in which the information dots I1 through I16 are arranged in a line, in order to explain about security of the information dot. Data in the dot pattern 1 can be made visually illegible by performing an arithmetic operation represented by a function f (Kn) on the information dot 3 In, then representing In=Kn+Rn by the dot pattern 1, and, after the dot pattern In is input, obtaining Kn=In−Rn. Alternatively, data in the dot pattern 1 can be made visually illegible by disposing information dots 3 so that regularity among dot patters 1 in different blocks can be eliminated. This can be achieved by disposing a plurality of information dots 3 in a line with the key dot 2 as a representative point, arranging this line across a plurality of lines, and holding as data in the information dot 3 a difference in data contained in adjacent 2 lines. By this, security can be enhanced because it becomes impossible to visually read the dot pattern 1 printed onto a medium surface. Also, since the information dot 3 is disposed randomly when the dot pattern 1 is printed on a medium surface, textual patterns are absent from the dot pattern and thus the dot patter is inconspicuous on the medium surface.

FIG. 82 is an explanatory drawing showing another example of dot pattern layout in which the key dot is disposed at a different position.

The key dot 2 is not necessarily required to be placed at the center of a rectangularly-shaped block of grid dots 4. For example, the key dot 2 may be disposed at a corner of a block of grid dots 4. In this case, it is desirable that the information dots 3 are disposed in parallel when viewed from the key dot 2.

(Description of Dot Pattern: GRID-2)

The principle of the dot patterns used in GRID-2 will next be described with reference to the drawings.

Suppose we have a set of grid lines (y1 to y7, x1 to x5) arranged at specific regular intervals in the x-y directions, as shown in FIG. 83. Each of the intersections of these grid lines is referred to as a "grid point." In this embodiment, a block enclosed by four grid points (i.e., 1 grid) is assumed to be the minimum block, and four blocks (4 grids) in the x-y directions, i.e., 4.times.4=16 blocks, are assumed to be one information block. It goes without saying that 16 blocks per information block is used by way of example only and that an information block may include any other desired number of blocks.

Four points forming a rectangular region of an information block are referred to as "corner dots" (x1y1, x1y5, x5y1, x5y5) (in the figure, these are dots enclosed in circles). These four corner dots are identical in position to grid points.

An information block can be identified by finding four corner dots that are identical in position to grid points. Four corner dots help identify an information block but do not indicate its orientation. The orientation of an information block is important, because a scan of the same information block rotated by 90 degrees and by 180 degrees may result in completely different sets of information.

For this reason, a vector dot (key dot) is disposed inside the rectangular region of each information block or at a grid point of an adjacent rectangular region. In this figure, the dot enclosed in a triangle (x0y3) is a key dot (vector dot). The key dot is disposed at the first grid point in the upper portion of the vertical line passing through the middle point of the grid line which forms the upper side of this information block. Similarly, the key dot of an information block below this information block is disposed at the first grid point (x4y3) on the vertical line passing through the middle point of the grid line which forms the lower side of this information block.

In this embodiment, the distance between two adjacent grid points is assumed to be 0.25 mm. Therefore, one side of an information block is 0.25 mm.times. 4 grids=1 mm in length and 1 mm 1 mm=1 mm.sup.2 in area. One information block can store 14 bits of information. If 2 bits of these 14 bits are used to store control data, this amount reduces to 12 bits of information. The distance of 0.25 mm between two adjacent grid points is used by way of example only, and can be varied as desired within the range of 0.25 mm and 0.5 mm or more.

In GRID-2, computer dots are disposed at positions displaced in either the x or y direction from every two grid points. The diameter of a computer dot is desirably 0.03 mm to 0.05 mm or larger, and the amount of displacement from a grid point is desirably around 15 to 25% of the distance between two adjacent grid points. This amount of displacement is also used by way of example and does not necessarily have to be in this range. However, a displacement greater than 25% is prone to make a dot pattern appear as a textual pattern when viewed visually.

According to this embodiment, vertical displacements (in the y direction) and horizontal displacements (in the x direction) occur alternately and, therefore, the uneven distribution of dot positions is prevented. Since dots do not appear as moiré or other textual patterns, the aesthetic quality of a printed surface can be maintained.

By adopting this principle for dot pattern layout, it can be ensured that one of every two computer dots is disposed always on a grid line in the y direction (see FIG. 84). This means that, when reading a dot pattern, it suffices to find grid lines alternately disposed on a straight line in the y or x direction. This further means that an information processing unit can recognize dot patterns more efficiently by executing the calculation algorithm in a simpler and faster manner.

If a dot pattern is deformed due to a curvature of a paper surface or other causes, grid lines may not exactly be straight. However, these curvatures of grid lines are approximate to straight lines and thus this embodiment can identify such grid lines relatively easily. In this context, it is justifiable to say that this algorithm is highly resistant to deformations of paper surfaces and displacements as well as distortions in optical reading systems.

FIG. 85 illustrates the meaning of the computer dot. In this figure, "+" represents a grid point, and "circle-solid" represents a dot (computer dot). It is assumed that "0" is assigned to an information dot disposed in the negative y direction relative to a grid point; "1" to an information dot disposed in the positive y direction relative to the same grid point; "0" to an information dot disposed in the negative x direction relative to the grid point; and "1" to an information dot disposed in the positive x direction relative to the grid point.

Next, with reference to FIG. 86, specific embodiments of computer dot layout and reading algorithm will be described.

In the figure, the computer dot indicated by a circled number 1 (hereinafter referred to as the "computer dot (1)") means "1" because it is displaced in the positive x direction from the grid point (x2y1). The computer dot (2) (indicated by a circled number 2 in the figure) means "1" because it is displaced in the positive y direction from grid points (x3y1). The computer dot (3) (indicated by a circled number 3 in the figure) means "0" because it is displaced in the negative x direction from grid point (x4y1). The computer dot (5) means "0".

Information dots (1) to (17) in the dot pattern shown in FIG. 86 represent the following values:

(1)=1
(2)=1
(3)=0
(4)=0
(5)=0
(6)=1
(7)=0
(8)=1
(9)=0
(10)=1
(11)=1
(12)=0
(13)=0

(14)=0

(15)=0

(16)=1

(17)=1

While this embodiment calculates the values of the information bits listed above by use of an information acquisition algorithm based on the finite differential method (to be described later), these information dots may be output as are as their information bits. Alternatively, the values in a security table (to be described later) may be used to perform arithmetic processing on these information bits to obtain true values.

A method of acquiring information based on the finite differential method, which is a characteristic feature of GRID-2, will be described below with reference to FIG. 86.

In the description of this embodiment, numbers within round brackets ( ) indicate the same numbers enclosed within circles (circled numbers) in the figure, and those enclosed by square brackets [ ] indicate the same numbers enclosed within boxes.

In this embodiment, the value of each of the 14 bits within the information block represents a difference from its adjacent computer dot. For example, the 1st bit is obtained from a difference from computer dot (5), which is located at the +1 grid in the x direction with respect to information dot (1). This can be expressed as [1]=(5)−(1). Since computer dot (5) means "1" and computer dot (1) "0", the 1st bit [1] can be calculated by the expression, 1-0, and thus it means "1". Similarly, the 2nd bit [2] is expressed by [2]=(6)−(2), and the 3rd bit by [3]=(7)−(3). The 1st to 3rd bits are obtained as follows.

The difference expressions below must take absolute values.

[1]=(5)−(1)=0−1=1

[2]=(6)−(2)=1−1=0

[3]=(7)−(3)=0−0=0

The 4th bit [4] is obtained from a difference between the computer dots (8), which is located immediately below the vector dot, and the computer dots (5). Accordingly, the 4th to 6th bits [4]-[6] each takes a difference between the information dot located at the +1 grid in the positive x direction and the information dot at the +1 grid in the positive y direction.

The 4th to 6th bits [4]-[6] can be obtained using the following expressions:

[4]=(8)−(5)=1−0=1

[5]=(9)−(6)=0−1=1

[6]=(10)−(7)=1−0=1

The 7th to 9th bits [7]-[9] each takes a difference between the information dot located at the +1 grid in the positive x direction and the information dot at the +1 grid in the negative y direction.

The 7th to 9th bits [7]-[9] can be obtained using the following expressions:

[7]=(12)−(8)=0−1=1

[8]=(13)−(9)=0−0=0

[9]=(14)−(10)=0−1=1

The 19th to 12th bits [10]-[12] each takes a difference from the information dot located at the +1 grid in the positive x direction, as follows:

[10]=(15)−(12)=0−0=0

[11]=(16)−(13)=1−0=1

[12]=(17)−(14)=1−0=1

Finally, the 13th to 14th bits [13]-[14] each takes a difference from the information dot located with respect to the information dot (8) at the +1 grid and at the −1 grid, respectively, in the positive x, as follows:

[13]=(8)−(4)=1−0=1

[14]=(11)−(8)=1−1=0

While the true values of the 1st to 14th bits [1] to [14] may be used as are as read data, these values may also be obtained by providing a security table for such 14 bits. In this case, a key parameter corresponding to each bit is defined in the table, and the true values are obtained by using these key parameters in addition, multiplication or other arithmetic operations on the read data.

The true value T can be obtained by the expression: $T_n = [n] + K_n$ (where n is a number between 1 and 14, $T_n$ is a true value, [n] is a read value, and $K_n$ is a key parameter). A security table containing these key parameters can be stored in the ROM of the optical reading unit.

For example, the following key parameters may be set in a security table:

$K_1=0$ $K_2=0$ $K_3=1$ $K_4=0$ $K_5=1$ $K_6=1$ $K_7=0$ $K_8=1$ $K_9=1$ $K_{10}=0$ $K_{11}=0$ $K_{12}=0$ $K_{13}=1$ $K_{14}=1$

Then, true values T1 to T14 can be obtained, as follows:

$T1=[1]+K1=1+0=1$ $T2=[2]+K2=0+0=0$ $T3=[3]+K3=0+1=1$ $T4=[4]+K4=1+0=1$ $T5=[5]+K5=1+1=0$ $T6=[6]+K6=1+1=0$ $T7=[7]+K7=1+0=1$ $T8=[8]+K8=0+1=1$ $T9=[9]+K9=1+1=0$ $T10=[10]+K10=0+0=0$ $T11=[11]+K11=1+0=1$ $T12=[12]+K12=1+0=1$ $T13=[13]+K13=1+1=0$ $T14=[14]+K14=0+1=1$

FIG. 87 shows the information bits described above and the correspondence between the security table and true values.

The description above has been made in relation to cases where information bits are acquired from computer dots and true values are obtained by referencing a security table. A converse process is also possible, in which a dot pattern is generated from true values. In this case, the value of the nth bit [n] is obtained by the expression:

$$[n] = Tn - Kn.$$

By way of example, assuming that T1=1, T2=0 and T3=1, the 1st to 3rd bits [1] to [3] can be derived from true values by the following expressions:

$$[1] = 1 - 0 = 1$$

$$[2] = 0 - 0 = 0$$

$$[3] = 1 - 1 = 0$$

The 1st to 3rd bits [1]-[3] are represented by the following difference expressions:

$$[1] = (5) - (1)$$

$$[2] = (6) - (2)$$

$$[3] = (7) - (3)$$

When the initial values, (1)=1, (2)=1, and (3)=0, are given, the dots (5) to (7) can be obtained, as follows:

$$(5) = (1) + [1] = 1 + 1 = 0$$

$$(6) = (2) + [2] = 1 + 0 = 1$$

$$(7) = (3) + [3] = 0 + 0 = 0$$

While the rest of the description is omitted, the values of the dots (8) to (14) can be obtained in a similar manner and the dots can be disposed according to the resultant values.

The initial values of the dots (1) to (3) are random numbers (0 or 1).

The dots (5) to (7) to be disposed along the next grid line in the y direction can be obtained by adding the values of the information bits [1] to [3] to the assigned initial dots (1) to (3). Similarly, the values of the dots (8) to (10) can be obtained by adding the values of the information bits [4] to [6] to the values of the dots (5) to (7). Also, the values of the dots (12) to (14) can be obtained by adding the values of the information bits [7] to [9] to these values. The values of the dots (15) to (17) can be obtained by adding the values of the information bits [10] to [12] to these values.

The values of the dots (4) and (11) can be obtained by subtracting from the information bit [13] and adding to the information bit [14], respectively, based on the value of the dot (8) obtained above.

In this embodiment, as stated above, the positions of a dot on the grid line yn is determined based on the position of the dot on the grid line y(n−1), and the positions of all the information dots are determined by repeating this process sequentially.

While the following specific embodiments will be described by assuming the use of the dot patterns of GRID-1 and GRID-2 described above, the dot pattern algorithms of GRID-1 and GRID-2 are not the only ones that can be applied to these specific embodiments, but any type of dot pattern can be used as long as it incorporates an art of storing information in a dot pattern.

Specific Embodiment (1)

The description of this specific embodiment below is made in relation to the use of a carbon ink that absorbs light in infrared wavelengths. This type of ink is chosen as a representative example of reactive inks, i.e., those that absorb light within a range to which a CMOS sensor or other optical photographing device reacts and in infrared or ultraviolet wavelengths. However, as long as they have these properties, inks that do not contain carbon can also be used for this specific embodiment. For example, a near-transparent ink ("stealth ink") can be used as an ink with no carbon in their molecular structure but with the property of absorbing infrared light. Dots can be made to be hardly recognizable by using by using a near-transparent ink sold as a "stealth ink"

FIG. 1 illustrates a dot pattern printed on a paper surface. The dots are first printed using a carbon ink of a similar color to the paper, and then a normal printing process using non-carbon inks of four colors (YMCK) is performed thereon.

According this specific embodiment, the dots are hardly recognizable with naked eyes because they are printed by use of an ink of a similar color to the paper (medium surface).

In this specific embodiment, if the paper is pure white or near-white blue in color, one effective way is to print dots using a gray (K: black) or cyan (C) ink whose carbon content is as low as a few percent. By this, the region printed over the dots by a normal printing process can considerably reduce the legibility of these dots. Another effective way to make dots hardly recognizable visually is of course to use the Stealth Ink (brand name), which does not contain carbon but reacts to light in infrared wavelength.

For paper (medium) that contains much beige or warm colors, it is desirable to print dots in a Y ink or Stealth Ink (brand name).

While the ink desirably has a carbon content of around 10%, it is possible to have an infrared optical reading unit recognize an ink with a carbon content of a few percent by improving the performance of the photographing device.

Specific Embodiment (2)

This specific embodiment, shown in FIGS. 2(a) and (b), prevents dots from being visually recognized by superpose-printing an opaque ink over the dots which have been printed on a paper surface (medium surface).

The "opaque ink" refers to an ink that does not allow visible light to pass through. This type of ink allows infrared rays whose wavelengths are long to pass through but not visible light with short wavelengths, thereby enabling to realize a dot pattern which is not visually recognizable and which reacts to infrared rays.

This specific embodiment first prints dots on a paper surface (medium surface) using a carbon ink (FIG. 2(a)), then prints a region over said dots using an non-carbon opaque ink of a similar or approximate color to such paper surface or of any other desired color (FIG. 2(b)), and finally performs a normal printing process using non-carbon inks of four colors (CMYK).

In the state as shown in FIG. 2(b), since the dots are covered by a print of non-carbon opaque ink, the dots printed underneath the print are not visually recognizable. Infrared rays, on the other hand, pass through the layer of said non-carbon opaque ink and are absorbed in the dot area, instead of being reflected from such dot area. Therefore, it can be ensured that the dots are recognized by the infrared optical reading unit.

When using the non-carbon white opaque ink, which is provided as a feature of this specific embodiment, dots can maintain a high stealth even if they are printed using a normal black (K) carbon ink, thanks to the high opacity inherently provided by the non-carbon white opaque ink.

While the foregoing description has explained about an example in which superpose-printing using an opaque ink is performed by limiting to the area of a paper surface in which dots have been printed using a carbon ink, this specific embodiment allows an option of first printing dots using a carbon ink (FIG. 3(a)) and then printing the entire paper surface using a non-carbon opaque ink (FIG. 3(b)).

In this case, a non-carbon opaque ink used for overall printing of the paper surface can be of any desired color.

As described for FIG. 2 above, in the state as shown in FIG. 3(b), since the dots are covered by a print of non-carbon opaque ink, the dots printed underneath the print are not visually recognizable. Infrared rays, on the other hand, pass through the layer of said non-carbon opaque ink and are absorbed in the dot area, instead of being reflected from such dot area. Therefore, it can be ensured that the dots are recognized by the infrared optical reading unit.

The carbon ink to be used for printing dots does not necessarily have to be of black (K) in color. This is because the above-described infrared absorption effect can be achieved regardless of the color of ink, as long as the ink contains a few percent of carbon.

Dots can be more reliably concealed by determining in advance the color of the non-carbon opaque ink to be used for overall printing of the upper layer of the paper surface and then printing the dots underneath using a carbon ink approximate in color to the pre-determined color of the ink for overall printing.

Specific Embodiment (3)

The specific embodiment shown in FIG. 4 prints dots using carbon inks of the same colors as the four background colors within the dot area (the number of colors may be varied), so that the color of dots will blend into the neighboring colors to achieve a higher level of stealth.

FIG. 4(a) shows a normal single-color dot, while FIG. 4(b) shows a dot consisting of four concentric regions of different colors.

This specific embodiment is an art of printing highly stealth dots, on the precondition that halftone dots by the AM printing method is performed.

FIG. 4(b) shows an example of printing a dot using carbon inks of four colors.

The dot is printed in four colors in a concentric manner, in the order of Y (yellow), M (magenta), C (cyan), and K (black) starting from the lowest layer.

Based on an assumption that the diameter of the dot region of a color having the highest halftone value (the highest-halftone color; Y in this figure), $\phi Y$, is set to be identical to the diameter of the dot pattern, $\phi 0$ (i.e., $\phi Y=\phi 0$); the amount of halftone dots of the highest-half-tone color (%) is x0%; and the amount of halftone dots of the target color is x %. Based on these, the size of the dot region of each color can be obtained using the expression below:

$$\phi x=\sqrt{(x/x0)}x\phi 0$$

Therefore, when the amounts of halftone dots of Y, M, C, and K is 70%, 50%, 30%, and 20%, respectively, the diameter for each color is obtained as follows (see FIG. 5(a)):

$$\phi M=\sqrt{(50/70)}x\phi 0\approx 0.85\phi 0$$

$$\phi C=\sqrt{(30/70)}x\phi 0\approx 0.65\phi 0$$

$$\phi K=\sqrt{(50/70)}x\phi 0\approx 0.53\phi 0$$

If the K (black) component is superposed onto each of the C, M, and Y components, the diameter for each of these colors is obtained as follows (see FIG. 5(d)). It is thus possible to reduce the number of colors used in an ink by superposing the K (black) component onto each of the C, M, and Y components.

$$\phi Y=\phi 0$$

$$\phi M=\sqrt{(70/90)}x\phi 0\approx 0.89\phi 0$$

$$\phi C=\sqrt{(50/90)}x\phi 0\approx 0.74\phi 0$$

In this type of printing method, a further reduction in the number of colors, if desired, can be achieved by determining one specific color which is predominant or which is desired to appear the most distinguished (target color) in this particular printing task and using that target color to print dots.

In addition to increasing the stealth of dots, this specific embodiment can prevent dot colors from becoming somber due to the effect of the K component of the non-carbon ink used for normal-printing of halftone dots and the additional K component of the carbon ink.

Specific Embodiment (4)

The specific embodiment illustrated in FIGS. 6 and 7 explains the principle of the art of exclusively extracting dots by the color separation process.

This specific embodiment addresses a dot-pattern recognition technique that is effective when CMY inks only, but not a black (K) ink, are used in normal printing and a black (K) ink is used exclusively for dots that form a dot pattern.

The inks used for normal printing and dot printing may be any ink that can be optically recognizable within the visible light range.

In this specific embodiment, by means of an optical reading unit, a color image of the printed paper surface (medium surface), which has been taken using an imaging means based on a CMOS imaging device, CCD imaging device or other similar device, is input into an RGB frame buffer and is subjected to the color separation process. FIG. 6(a) shows the composition ratios of the RGB color components.

It is a generally known fact that there are certain characteristics in the behavior of CMOS and other optical reading devices. For example, a read image may generally become bluish. These characteristics are often caused by lopsided color compositions, in which one color component is predominant and has a large influence within an image region, making the rest of the colors tinted in that color. Another possible cause for these characteristics is manufacturing variations among units (see FIG. 6(a)). When attempting to recognize a dot pattern from such a characteristic image, a reading error may often result because the dots printed using the Kink (black) tend to become difficult to read under the influence of the blue component. To prevent such problem from occurring, this specific embodiment performs modification before reading an image.

For this, the specific embodiment searches a read image to find a pixel having the minimum sum of RGB values. A pixel having the minimum sum of RGB values can safely be determined to be a dot. If it is found during the search that the RGB values are uneven (for example, the B value is significantly higher than the R and G values), this suggests that the image has been modified. To correct this state, this specific embodiment uses the R, G, and B values for the pixel having the minimum sum of RGB values as correction reference values, respectively, and deducts each of the correction reference values from the corresponding value for other pixels (FIG. 6(b) to (c)). By this, the image corrected by CMOS is restored to the state before correction.

The specific embodiment then obtains an average of the maximum and minimum values for the RGB data of the image corrected as described above (for example, as shown in FIG. 6(d)), sets said region α to have a smaller width if the gray scale of the average value (for example, as shown in FIG. 6(f)) is higher, and sets said region α to have a larger width if the gray scale of the average value is lower (for example, as shown in FIG. 6(e)), thereby facilitating the identification of the dot pattern in a K ink (black) in the visible light range.

In cases where a deduction of said RGB components from those of a pixel results in a negative value, this specific embodiment uses a fixed value of "0" for all such pixels. For the purpose of extracting the minimum RGB region, correction reference values may be calculated from several sampled pixels.

In this specific embodiment, if dark achromatic (gray) regions other than dots are printed using CMY inks, such regions are indistinguishable from the dots resulting from the color separation process and it becomes impossible to exclusively recognize the dots. However, if such regions are light achromatic (gray) in color, there is no problem because these regions are not recognized as dots.

Therefore, according to this specific embodiment, it is possible to recognize dots by the color separation process, subject to the non-use of a dark gray ink for printing.

Since this specific embodiment does not require the use of a special infrared radiation, filtering or other similar function, dots can be recognized from an image taken using a conventional digital camera, the existing digital camera function on a cellular phone terminal, a WEB camera, etc.

In summary, the procedure of using an optical reading unit to recognize dots is as follows:

1) For each pixel, calculate an average x of the halftone values (100% at maximum) of the light with the highest RGB value and the light with the lowest RGB value.

2) Determine if the subject light is in gray scale tones or not, depending on whether the difference in RGB value between the highest-RGB light and the lowest-RGB light is larger or smaller than a fixed value a (grayscale evaluation).

For example, assuming: $\alpha = -1/10x + 10$, where 10 is a correction coefficient. When x is extremely close to 100%, it is determined that the light has a gray scale value of 100 (white) and presents no problems at all. On the other hand, when x has a low gray scale value, a correction by adding 10 is made in order to prevent an error in determination (i.e., an error in which a region with a low gray scale value is determined to be white) from occurring.

3) If α>the maximum halftone value−the minimum halftone value, determine x to be in gray scale tones.

4) If α<the maximum halftone value−the minimum halftone value, determine x to have a gray scale value of 100% (white).

5) Perform image processing on the image based on the gray scale value, binarize the image, and determine it to be dots.

While this procedure uses a correction coefficient of 10, it goes without saying that the expression to obtain a may be defined otherwise according to the characteristics of CMOS.

Specific Embodiment (5)

In this specific embodiment, black halftone dots are shared for use as dot-pattern dots.

FIG. 10 is an enlarged drawing showing an example of performing the AM printing method by using halftone dots as dot-pattern dots and based on the pattern layout logic of GRID-1. The illustration on the left is an original image printed in C, M, and Y inks, and the illustration on the right is a printed surface in which the K component (black component) is partially extracted from the CMY components for sharing of dots between halftone dots and dots in a dot pattern. In this figure, the K component used to represent the dot-pattern dots is printed using a carbon ink. The CMY in the right-hand illustration contains a certain amount of the K component (black component), since only the K component (black component) in dots corresponding to the amount of halftone dots is extracted from the CMY in the original image. FIG. 7 shows the principle of this process. As shown in this figure, the minimum amount of halftone dots required to be recognized as dots is extracted from the common part of the CMY color components in the area surrounding the dot region, and dots are disposed using these halftone dots as the K component.

FIG. 11 is an enlarged drawing showing an example of performing the AM printing method by using halftone dots as dot-pattern dots and based on the pattern layout logic of GRID-1. The illustration on the left is an original image printed in C, M, and Y inks, and the illustration on the right is a printed surface in which the K component (black component) is entirely extracted from the CMY for sharing of dots between halftone dots and dots in a dot pattern. In this figure, it is assumed that the K component for the dots is printed in either a carbon or non-carbon ink and that the dots are recognized by the color separation method described in the specific embodiment (4).

FIG. 12 is an enlarged drawing showing an example of performing the AM printing method by using halftone dots as dot-pattern dots and based on the pattern layout logic of GRID-1. The illustration on the left is an original image printed in C, M, and Y inks, and the illustration on the right is a printed surface in which the ideal part of the K component (black component) for the purpose of printing an image is extracted from the CMY components for sharing of K1 and K2 halftone dots with a dot pattern. In this figure, the K1 dots are printed using a non-carbon ink and the K2 dots in a carbon ink. The K1 halftone dots are shared with dot-pattern dots. The K2 dots are superpose-printed in the K1 regions, using the minimum amount of halftone dots required to be recognized as dots. The only requirement for a K2 dot is to be smaller than the corresponding K1 dot and thus each K2 dot provides a relatively high degree of freedom in serving as a dot for recognition.

FIG. 13 is an enlarged drawing showing an example of performing the AM printing method by using halftone dots as dot-pattern dots and based on the pattern layout logic of GRID-2. The illustration on the left is an original image printed in C, M, and Y inks, and the illustration on the right is a printed surface in which the K component (black component) is partially extracted from the CMY components for sharing of dots between halftone dots and dot-pattern dots. In this figure, the K component used to represent the dot-pattern dots is printed using a carbon ink. The CMY in the right-hand illustration contains a certain amount of the K component (black component), since only the K component (black component) in dots corresponding to the amount of halftone dots is extracted from the CMY in the original image.

FIG. 14 is an enlarged drawing showing an example of performing the AM printing method by using halftone dots as dot-pattern dots and based on the pattern layout logic of GRID-2. The illustration on the left is an original image printed in C, M, and Y inks, and the illustration on the right is a printed surface in which the K component (black component) is entirely extracted from the CMY for sharing of dots between halftone dots and dot-pattern dots. In this figure, it is assumed that the K component used to represent the dot-pattern dots is printed in either a carbon or non-carbon ink and that these dots are recognized by the color separation method described in the specific embodiment (4).

FIG. 15 is an enlarged drawing showing an example of performing the AM printing method by using halftone dots as dot-pattern dots and based on the pattern layout logic of GRID-2. The illustration on the left is an original image printed in C, M, and Y inks, and the illustration on the right is a printed surface in which the ideal part of the K component (black component) for the purpose of printing an image is extracted from the CMY components for sharing of halftone dots at K1 and K2 with a dot pattern. In this figure, the K1 dots are printed using a non-carbon ink and the K2 dots in a carbon ink. The K1 halftone dots are shared with the dot pattern. The K2 dots are superpose-printed in the K1 regions, using the minimum amount of halftone dots required to be recognized as dots. The only requirement for a K2 dot is to be smaller than the corresponding K1 dot and thus each K2 dot provides a relatively high degree of freedom in serving as a dot for recognition.

As described in the foregoing, in this specific embodiment, halftone dots are shared with a dot pattern, and information in each dot is defined by how the dot is displaced from the original position of the corresponding halftone dot.

More specifically, while dots in a dot pattern are in principle disposed at the intersections of grid lines (grid points), this specific embodiment disposes grid dots at every other grid point and prints the rest of the dots as computer dots at displaced positions from grid points.

Definition of these computer dots has already been explained above and therefore it will be omitted from the description below.

According to this specific embodiment, it becomes almost impossible to visually recognize dots in a dot pattern because halftone dots existing on a printed surface are virtually used as dot-pattern dots.

This specific embodiment can be applied to any dot pattern in which information is defined by means of displacements from grid points.

It has been noted by the present inventor and some other researchers that, where dots forming a dot pattern are printed in a K carbon ink for recognition by an infrared optical reading unit and where K halftone dots in a print image are printed using a non-carbon ink, the printed surface is prone to become somber as a result of printing the dots forming a dot pattern in overlap with the halftone dots on a paper surface (medium surface) due to different dot positions between these different types of dots. In this specific embodiment, since K halftone dots are used as the dots forming a dot pattern and four-color printing is performed in the normal printing process only, the printed surface does not become somber as when separately printing the dot pattern using a K ink (black) in overlap with the halftone dots and thus the printed surface can maintain its aesthetic quality.

When the black ink (K) for halftone dots is also used for dot-pattern dots, the possibility of two adjacent dots connecting with each other is higher than when normal halftone dots are used. For normal halftone dots, they are prone to connect with each other if their amount is 50% or more. Therefore, in this specific embodiment, it is necessary to make a correction so that the amount of halftone dots will be 20% to 25% at a maximum. However, if dot shapes are processed at a high accuracy, it is possible to recognize halftone dots successfully even when they account for over 50%.

FIGS. 8 and 9 illustrate dots printed as squares and circles, respectively, according to this specific embodiment.

In order to ensure successful detection of dots when the amount of the black (K) color component is none or minimal, it is desirable to represent dots using an amount of halftone dots of at least a few percent (or higher if the printing accuracy is low).

If infrared radiation is applied to this specific embodiment, dots can be printed using a K carbon ink, after correcting them to a size that is easier to recognize, as shown in FIG. 16.

In FIGS. 16(a) and (b), two adjacent dots are prevented from connecting with each other by reducing the K (black) component (which originally accounts for 50%) by 30% and adding that 30% to each of CMY, as shown (a)' and (b)' in this figure. Although the dots are arranged at equal intervals in this figure, it goes without saying that dots, as described above, may be displaced from each other when halftone dots are used as information dots in a dot pattern. FIG. 17 is an illustration showing a dot pattern based on GRID-1 in an easier to understand manner; in this dot pattern, the information dots represented by black circles are superposed over the halftone dots represented by squares.

Specific Embodiment (6)

This specific embodiment provides a mask region in a printed image in such a manner that the shape of such mask can be recognized.

This specific embodiment divides an image area into two regions of predetermined shapes: one region is for printing using non-carbon CMYK inks and the other for printing using carbon CMYK inks, so that text, pictures and various codes printed in carbon ink can be read by the infrared radiation method.

More specifically, as shown in FIG. 18, this specific embodiment provides within an image a mask region of a shape appropriate to achieve a desired concealment and then prints the image area excluding the mask region using a non-carbon ink as shown in FIG. 19(a). This specific embodiment then prints the mask region using a carbon ink as shown in FIG. 19(b).

This results in an image as shown in FIG. 19(c). During this process, since inks with and without a carbon content differ in chromogenic characteristics to some extent, it is desirable to perform color correction on either the masked or non-mask region to conceal the boundaries of the mask region. By this, one can create a natural image that does not look odd in the eyes of viewers. For this purpose, an ink mixed with Stealth Ink, rather than carbon, can of course be used.

When radiating infrared rays onto the image of FIG. 19(c) and reading the reflections thereof with an infrared optical reading unit, the masked image region as shown in FIG. 18 can be recognized because only the mask region printed using a carbon ink absorbs the infrared rays. While the mask region is in the shape of a capital A in this specific embodiment (6), this region can be any desired character, symbol or graphic. Also, this mask region may be printed using any of the dot patterns described in the other specific embodiments.

Specific Embodiment (7)

This specific embodiment shows the dot-pattern stealth printing method based on FM screen printing technique.

The FM screen printing technique represents an image by way of varied densities of pixels of the same size (see FIG. 20).

This specific embodiment enables recognition of dots irradiated with infrared rays by printing a dot region, that is, the pixels that form dots, using the CMY of a carbon ink of the same color as this region. The rest of the image is printed using a non-carbon ink.

If a dot forming part of a dot pattern does not have any color information as shown in FIG. 20(b), it is necessary to generate a shape that is recognizable as a dot by either exchanging the color with a neighboring pixel or by assigning a neighboring identical color to the pixel.

If there is no color information in neighboring pixels, then the dots must be printed by generating a color similar to the paper by use of a carbon ink.

While the foregoing has been explained using an example of using carbon inks of four colors (CMYK), it is possible, similarly to the specific embodiment (3), to exclude black (K) and represent a dot pattern using carbon inks of three colors. This can be done by first excluding the K component from CMYK for each of the pixels that form a dot and then correcting the color of the dot by adding as much CMY as the excluded amount to increase a halftone level of CMY. This process allows one to represent a dot without using black (K) but with CMY carbon-ink colors only, thereby reducing the number of colors required. In cases where a pixel has no color information, one can generate a shape that is recognizable as a dot using a carbon ink by either exchanging the color with a neighboring pixel or assigning a neighboring identical color to the pixel.

With the FM screen printing technique, it is also possible to share black (K) with dots or represent the area surrounding the dots using three colors, i.e., CMY, only.

More specifically, the number of pixels that form a dot represented in black can be obtained by the procedure: (1) based on the area occupied by a dot, i.e., (printed area)/(number of dots), determine the halftone level of a particular pixel by deducting the part of the halftone levels common to C, M and Y from the respective halftone levels of C, M and Y (100% at a maximum) of each of the pixels contained in a region per dot, (2) add the halftone level of such common part to the region per dot, and (3) divide by 100%. Based on the results of this procedure, a dot can be formed by disposing black (K) pixels spirally, starting from the central point of the planned dot position (see FIG. 22).

It is, therefore, possible to detect a dot by using the color separation technique of the specific embodiment (4), as is the case with the method of the specific embodiment (5), According to this specific embodiment, a printed surface can be prevented from becoming somber because the K (black) component is not printed in overlap by using both carbon ink and non-carbon inks.

Exceptionally, if the K (black) component is completely absent from the region occupied by a dot on a paper surface (medium surface), this specific embodiment requires that the dot is represented using the minimum number of black (K) pixels needed to be recognized as a dot.

Specific Embodiment (8)

The photograph in FIG. 23 has a dot pattern as described in the specific embodiments (1) to (7) printed thereon. The region occupied by a person in this photograph contains a dot pattern which has been printed using a carbon ink or stealth ink. More specifically, the ink used for printing of such dot pattern is a carbon ink, or Stealth Ink, which does not contain carbon but reacts to light in the infrared or ultraviolet wavelength range. There is no dot pattern printed in the background region around the person. Because of this, the white background does not become somber due to the use of a carbon ink.

FIGS. 24 to 26 shows examples of photo stickers printed according to the present invention. FIGS. 23 and 24 are people photographs, taken by a so-called digital camera, a cellular phone terminal with such digital camera function, or a photo sticker machine installed at an amusement or other facility. These photographs have been printed using a printer unit. The photo sticker of FIG. 23 has dots printed only in the region occupied by a person (excluding the face). In the photo of FIG. 24, there is a dot-pattern print region provided below the faces. FIG. 25 shows greeting cards, each of which has one dot pattern printed within each of the object (character) regions.

FIG. 26 is an image created by synthesizing a frame image having a dot pattern printed thereon and a photo data. The frame image can be downloaded in advance to a personal computer or cellular phone terminal. This frame image has a dot pattern pre-printed thereon. When this frame image is downloaded to a personal computer or cellular phone terminal, it is converted into a code by the processing program pre-installed on the personal computer or cellular phone terminal and is stored in a hard disc unit.

Next, a user inputs voice data through said personal computer or cellular phone terminal. On the personal computer or cellular phone terminal, said processing program associates said voice data with said code (more specifically, an ID assigned to the voice data and the code are registered in an association table), and stores the association information in a storage means, such as a memory or hard disc unit. When a photograph is taken by means of a digital camera or camera-equipped cellular phone terminal and the photo data is transferred to said personal computer, such photo data is synthesized with said frame data. This processing may be performed using the processing program within said camera-equipped cellular phone terminal. The synthesized photo data is printed on a printer connected to the personal computer or cellular phone terminal. Next, said voice data and the association information (i.e., the content of said association table) are transferred to another personal computer or cellular phone terminal via email as an attached file. This transfer is not limited to via email but may be performed using a memory card or other storage medium. Then, when the photographed image contained in said synthesized photo data is input into the another personal computer or cellular phone terminal to which said voice data and the association information have been transferred, the processing program pre-installed on such another personal computer or cellular phone terminal reads out the dot pattern from the frame part of such synthesized photo data and converts such dot pattern into a code. Such processing program then retrieves the ID of the voice data from the code by referencing said association information (association table), and outputs and replays the voice data associated with this ID from a speaker or other means.

As described above, in FIG. 26, by downloading a frame data from a specified site (server), synthesizing the frame data with the photo data taken by a user, and printing the synthesized data in advance, it becomes possible for another user to output and replay appropriate voice data when he or she photographs such synthesized photo.

Although it has been explained that voice data and association information are transferred directly between personal computers and cellular phone terminals, these data may also be registered in a specific server and made available for download by another user by accessing such server.

FIGS. 27 and 28 show a cellular phone terminal provided with a digital camera function.

A small memory card called "miniSD Card" (brand name) or one called "Memory Stick Duo" (brand name) can be inserted into this cellular phone terminal. On the front face of the cellular phone terminal, an LCD part, manual operation buttons, numerical buttons, a camera photographing button and other elements are provided. On the back side, an imaging lens of a CCD or CMOS camera is provided.

Inside the cellular phone terminal, a central processing unit, a main memory, a ROM and a flash memory, manual operation buttons, numerical buttons, a camera photographing button and other elements are connected among one another via a bus, configured with the central processing unit as the core element. A card adapter for insertion of said memory card, a microphone and a speaker are also connected to said bus.

The digital camera function has a CMOS or CCD imaging device with a resolution of over one million to two million, and is designed to begin photographing when triggered by the pressing of the camera photographing button.

Photographed images are stored in JPEG format in a flash memory or memory card.

In this specific embodiment, a dot pattern provided on a medium surface as described in the specific embodiments (1) to (7) is read by a program, which is also stored in the flash memory.

Voice data which has been input via the microphone is converted into WAV, MP3 or other similar format, and is stored in the flash memory or memory card.

FIG. 30 is a flow diagram showing the processing procedure according to this specific embodiment when using a cellular phone terminal as described above.

A user speaks a message desired to be recorded to the microphone of the cellular phone terminal. The message thus spoken is registered through the microphone in the flash memory or memory card as voice data.

The user then photographs a photo sticker as described in FIGS. 23, 24 and 26, using the camera function of such cellular phone terminal. In this photo sticker, the code data set by a printing unit has been printed as a dot pattern. This dot pattern printing technique is as described in the specific embodiments (1) to (7) and is thus omitted from the description of this specific embodiment.

The dot pattern photographed in this manner is converted into code data by the central processing unit, based on the program loaded from the flash memory.

The central processing unit then associates the input voice data and such code data with each other and registers the association in a database within the flash memory or memory card.

When said photo sticker is photographed again by this cellular phone terminal and its dot pattern is converted into code data, the central processing unit accesses the database of the flash memory or memory card and, based on such code data, retrieves and replays the related voice data.

Thus, every time such cellular phone terminal photographs such photo sticker for the second time and thereafter, the associated voice data can be replayed.

When the photo sticker is photographed for the second time and thereafter, it is not necessarily needed to register a photographed image data in the flash memory or memory card. In this case, the user can choose to replay the voice data in a state in which the photographed image in the camera has been deployed to the main memory or VRAM (not shown) (on-memory state).

FIG. 31 is a flow diagram showing a process flow wherein said voice data, code data and the database that associates them with each other are registered in the memory card, and such memory card is mounted to another cellular phone terminal, so that the same voice data can be replayed when this another cellular phone terminal photographs said photo sticker.

According to the process flow shown in FIG. 31, the voice data recorded by a first user can be replayed on the cellular phone terminal of a second user simply by handing the memory card to the second user and the second user photographing the same photo sticker, thereby enabling the first user to pass a voice message to the second user via a photo sticker.

FIG. 32 is a flow diagram showing a process flow wherein a first user uses his or her cellular phone terminal to transfer said voice data, code data and the database that associates them with each other to the cellular phone terminal of a second user. This process flow requires both the users to have downloaded a program called "i Appli" (brand name) from a specific server to their respective cellular phone terminals. In this process, while the two "i Appli" programs are communicating with each other, the first user transfers the voice data, code data and database from his or her cellular phone terminal to the cellular phone terminal of the second user.

By this, it becomes possible for the voice data recorded by the first user using his or her cellular phone terminal to be replayed on the cellular phone terminal of the second user when the second user photographs the same photo sticker using his or her cellular phone terminal.

In contrast to the process flow shown in FIG. 32, wherein the voice data, code data and database are transferred through communication between two "i Appli" programs (brand name), FIG. 33 shows a process flow wherein these data are transferred via email from the cellular phone terminal of a first user to the cellular phone terminal of a second user. Similarly to the process flow of FIG. 31, this process flow makes it possible for the voice data pre-recorded by the first user using his or her cellular phone terminal to be replayed on the cellular phone terminal of the second user when the second user photographs the relevant photo sticker using his or her cellular phone terminal.

Specific Embodiment (9)

This specific embodiment is a system which uses the cellular phone terminal described in the specific embodiment (8) and a photo sticker photographing unit.

The system configuration of this specific embodiment is as shown in FIG. 29.

More specifically, the photo sticker photographing unit has a control unit, a camera, a microphone, manual operation buttons and a printing unit, configured with the control unit as the core element. The control unit consists of an information processing unit, such as a general-purpose personal computer, and includes a central processing unit, a main memory, a hard disc unit for storing programs and databases, and so forth, which are not shown in this figure. Such control unit is connected to a dot code management server and a voice management server via a network. The dot code management server is responsible for issuing dot codes as well as for associating these dot codes with voice data managed by the voice management server, and maintains a database which holds these associations. The voice management server is responsible for registering and managing voice data which are input through the microphone of a photo sticker photographing unit. Although these servers are shown as two separate servers in FIG. 29, the functions of these servers may be provided by one server.

The processing procedure based on this system configuration will be described below with reference to FIG. 34.

On a photo sticker photographing unit (brand name: Pricla), a user takes a photo by operating the camera through the manual operation buttons and stores photo data in the memory of the control unit. During this process, the control unit of the photo sticker photographing unit reads a dot pattern printed on a photo sticker sheet onto which the photo data will be printed and converts the dot pattern into a dot code number.

The photo sticker photographing unit then prints out the photographed photo image onto said sticker sheet.

Next, the user records a desired voice message through the microphone. The voice data thus input is first stored in the memory of the control unit. The control unit notifies the dot code which it has read from the sticker sheet and such voice data to the voice management server. Based on this, the dot code management server registers an association between the voice data and the dot code in the database.

The user next photographs the photo sticker printed out by such photo sticker photographing unit, using his or her cellular phone terminal. The central processing unit of the cellular phone terminal reads out the dot pattern from the photographed image of such photo sticker and converts the dot pattern into a dot code number. This process flow is the same as the one described in the specific embodiment (8).

Next, the user records a desired voice message through the microphone. The voice data thus input is first stored in the memory of the control unit. The control unit registers such voice data in the voice management server. At the same time, the control unit notifies the ID assigned to such voice data to said dot code management server. Based on this, the dot code management server registers an association between the voice data and the dot code in the database.

Next, the user activates the communication program stored in the flash memory of the cellular phone terminal. Using the program, the user accesses the dot code management server and retrieves the ID of the voice data corresponding to such dot code number. Based on the ID thus retrieved, the voice management server is accessed and the voice data registered therein is downloaded to said cellular phone terminal and replayed through the speaker.

While this specific embodiment uses a cellular phone terminal as a means of reading a dot pattern, it goes without saying that an optical reading unit connected to a personal computer can also be used for this purpose.

In contrast to the process flow shown in FIG. 34, which relates to cases where a dot pattern has already been printed on a photo sticker sheet, FIG. 35 shows a process flow wherein a photo sticker photographing unit issues a new dot code every time a photo is taken. The rest of this process flow is omitted because it is the same as FIG. 34.

FIG. 36 shows a process flow wherein a dot code is issued by a dot code management server.

FIG. 37 shows a procedure for recording a voice message on a photo sticker photographing unit and replaying it on a personal computer, cellular phone or other similar machine. In this procedure, it is assumed that a dot pattern has already been printed on a photo sticker sheet.

FIG. 38 is similar to FIG. 37 above and shows a procedure for recording a voice message on a photo sticker photographing unit and replaying it on a personal computer, cellular phone or other similar machine. However, the procedure in FIG. 38 differs from that in FIG. 37 in that a dot pattern is generated by the photo sticker photographing unit every time a photo is taken, by way of issuing an unassigned dot code.

FIGS. 39 and 40 show a process flow wherein a photo is printed by a photo sticker photographing unit on a photo sticker sheet on which a dot pattern has been pre-printed; the photo sticker is photographed with a camera-equipped cellular phone terminal, and a voice message is input at the same time; and the voice data is managed by a voice management server. When another user photographs said photo sticker by use of another camera-equipped cellular phone terminal, an inquiry is made to said voice management server and said input voice data is replayed.

FIGS. 41 and 42 show a process flow wherein a dot code is issued every time a photo is taken and the photo is printed on a photo sticker photographing unit; the photo sticker is photographed with a camera-equipped cellular phone terminal, and a voice message is input at the same time; and the voice data is managed by a voice management server. When another user photographs said photo sticker using another camera-equipped cellular phone terminal, an inquiry is made to said voice management server and said input voice data is replayed.

FIGS. 43 and 44 show a process flow wherein, after a user takes a photo on a photo sticker unit, the photo sticker unit receives a dot code issued by a dot code management server, generates a dot pattern, and outputs a photo sticker. The user then photographs such photo sticker and records a voice message by use of a cellular phone terminal. The voice data is recorded in association with said dot code, and such dot code and voice data are registered in a voice management server.

When another user photographs said photo sticker, i.e., a dot pattern by using his or her cellular phone terminal, such dot pattern is converted into a dot code, and, based on the dot code, an inquiry is made to said voice management server as to the existence of any associated voice data. If voice data associated with such dot code is found, such voice data is downloaded from the voice management server to the cellular phone terminal.

FIG. 45 shows a process flow wherein, after a user takes a photo on a photo sticker unit, a photo sticker on which the photo data has been printed is printed by the photo sticker unit print on a photo sticker sheet having a dot pattern pre-printed thereon.

The user then photographs said photo sticker, using the camera equipped in his or her cellular phone terminal. Alternatively, the user photographs said dot pattern by use of a pen camera (a pen-shaped printed surface reading unit) which is USB-connected to the user's personal computer, and this dot pattern is converted into a dot code.

On the information processing terminal, voice data is input in association with said dot code.

The dot code and the voice data associated therewith are transferred to another cellular phone terminal or personal computer. The means used for this transfer can be the e-mail function of the cellular phone terminal or a flash memory card.

When a dot pattern in said photo sticker unit is photographed by the camera equipped in the cellular phone terminal in which the transferred dot code and voice data are stored, the central processing unit (CPU) of the cellular phone converts the dot pattern into a dot code and outputs the voice data which is stored in association with such dot code.

Alternatively, it is also possible to photograph said dot pattern by use of a pen camera (a pen-shaped printed surface reading unit) which is USB-connected to another personal computer and convert the dot pattern into a dot code to output the associated voice data.

FIG. 46 is mostly similar to FIG. 45, but differs in that a reserved and unassigned code is issued by a photo sticker unit, a dot pattern is generated based on the issued code, and a photo sticker is printed with the dot pattern printed thereon.

FIGS. 47 and 48 show a process flow wherein photo data taken with a digital camera or cellular phone terminal is printed on a sheet having a dot pattern preprinted thereon by use of a personal computer to which the digital camera or cellular phone terminal is connected;
the voice data is associated with the dot code of this dot pattern and is registered in a dot code management server and a voice management server, respectively; when the dot pattern on said photo sticker is photographed with another personal computer or cellular phone terminal, the dot pattern is converted into a dot code; an inquiry is made based on the dot code to a dot code management server; and the voice data associated with the dot code is downloaded from a voice management server for replay.

FIGS. 49 and 50 show a variation process flow of FIGS. 47 and 48, wherein a dot code issuance program pre-installed in a personal computer issues a dot code when a user prints the photo data which he or she has taken with a digital camera or cellular phone terminal and registers the dot code thus issued in a dot code management server.

When voice data is input by use of a personal computer or cellular phone terminal for association with said dot code, such voice data is registered in a voice management server.

When a dot pattern on said photo sticker is photographed with another personal computer or cellular phone terminal, the dot pattern is converted into the dot code. An inquiry is made to the dot code management server, and the voice data associated with the dot code is downloaded from the voice management server for replay.

FIGS. 51 and 52 show a variation process flow of FIGS. 49 and 50.

More specifically, a personal computer has the communication function; when a user prints the photo data taken with a digital camera or cellular phone terminal, a request to issue a dot code is made to a dot code management server; on the issuance of the dot code by the dot code management server in response to this request, a dot pattern is generated from such dot code; and a photo sticker having the dot pattern added thereto is printed by a printing unit.

When voice data is input by use of a personal computer or cellular phone terminal for association with said dot code, such voice data is registered in a voice management server.

When a dot pattern on said photo sticker is photographed with another personal computer or cellular phone terminal, the dot pattern is converted into the dot code. An inquiry is made to the dot code management server, and the voice data associated with the dot code is downloaded from the voice management server for replay.

FIGS. 53 and 54 show a variation process flow of FIGS. 47 and 48.

More specifically, a user takes a photo with a digital camera or cellular phone terminal and has the photo data printed by a printing unit at a convenience store or photo shop; photo sticker sheets respectively having a dot pattern printed thereon have been set on such printing unit; and said dot pattern can be read from each of the printed photo stickers.

The user reads the dot pattern from said photo sticker by use of a USB camera or scanner pen connected to a personal computer, or a cellular phone, and registers a dot code, obtained by conversion from the dot pattern and associated with voice data, in a dot code management server and a voice management server. When a dot pattern on said photo sticker is photographed with another personal computer or cellular phone terminal, the dot pattern is converted into the dot code. An inquiry is made to the dot code management server, and the voice data associated with the dot code is downloaded from the voice management server for replay.

FIG. 67 shows a variation process flow of FIGS. 49 and 50.

More specifically, a dot code issuance program is pre-installed in a printing unit at a convenience store or photo shop to issue a dot code when a user prints the photo data which he or she has taken with a digital camera or cellular phone terminal and to register the dot code thus issued in a dot code management server.

When voice data is input by use of a personal computer or cellular phone terminal for association with said dot code, such voice data is registered in a voice management server.

When a dot pattern on said photo sticker is photographed with another personal computer or cellular phone terminal, the dot pattern is converted into the dot code. An inquiry is made to the dot code management server, and the voice data associated with the dot code 43 44 is downloaded from the voice management server for replay.

FIGS. 57 and 58 show a variation process flow of FIGS. 51 and 52.

More specifically, a printing unit used in this process, such as a print maker, has the communication function; when a user prints the photo data taken with a digital camera or cellular phone terminal, a request to issue a dot code is made to a dot code management server; on the issuance of the dot code by the dot code management server in response to this request, a dot pattern is generated from such dot code; and a photo sticker having the dot pattern added thereto is printed by a printing unit.

When voice data is input by use of a personal computer or cellular phone terminal to be associated with said dot code, such voice data is registered in a voice management server.

When a dot pattern on said photo sticker is photographed with another personal computer or cellular phone terminal, the dot pattern is converted into the dot code. An inquiry is made to the dot code management server, and the voice data associated with the dot code is downloaded from the voice management server for replay.

The process shown in FIG. 59 is a variation of the process of FIG. 46.

More specifically, a photo sticker unit on which a dot pattern is placed in the photo data is printed by running a dot pattern generation program installed in a personal computer.

The user then photographs said photo sticker, using the camera equipped in his or her cellular phone terminal. Alternatively, the user photographs said dot pattern by use of a pen camera (a pen-shaped printed surface reading unit) which is USB-connected to the user's personal computer, and this dot pattern is converted into a dot code.

On the personal computer or cellular phone terminal, voice data is input in association with said dot code.

The dot code and the voice data associated therewith are transferred to another cellular phone terminal or personal computer. The means used for this transfer can be the e-mail function of the cellular phone terminal or a flash memory card.

When a dot pattern in said photo sticker unit is photographed by the camera equipped in the cellular phone terminal in which the transferred dot code and voice data are stored, the central processing unit (CPU) of the cellular phone converts the dot pattern into a dot code and outputs the voice data which is stored in association with such dot code.

Alternatively, it is also possible to photograph said dot pattern by use of a pen camera (a pen-shaped printed surface reading unit) which is USB-connected to another personal computer and convert the dot pattern into a dot code to output the associated voice data.

FIG. 60 shows a variation process flow of FIG. 59, wherein a photo sticker unit is used in stead of a personal computer having a dot pattern generation program installed thereon. The rest of this process flow is omitted because it is the same as FIG. 59.

FIG. 61 shows a variation process flow of FIG. 59, and it differs only in that photo data taken by use of a digital camera or cellular phone terminal is printed by a printing unit at a convenience store or photo shop.

FIG. 62 is mostly similar to FIG. 61, but differs in that a dot code is issued every time photo data is printed by a printing unit at a convenience store or photo shop.

Specific Embodiment (10)

FIGS. 63 to 66 show a list of parameters for the application of a dot pattern according to the present invention to a printing unit (e.g., a printer), an input unit (e.g., an image scanner), or a reproducing unit (e.g., a copier and a facsimile).

The unit used in this specific embodiment, where the configuration is not shown, is a copier and includes a scanner part for reading an original document; a control part having a memory provided thereon; an input part for inputting the number of copies and other information; a print part for printing onto a sheet; and a discharge part for discharging the printed sheet.

The control part is responsible for disposing a dot pattern which has been read out from the memory in a specific region which has been input from the input part onto a read document, as well as for issuing a print instruction to the print part.

The input part may be, for example, a touch panel, and is designed to enable one to display a read document and to determine a position within the document for a dot pattern to be disposed by specifying any particular coordinates by use of a touch pen or the like. While preferred dot patterns for use in this specific embodiment are those described in the sections of GRID-1 and GRID-2 above, dot patterns based on other algorithms can of course be used for this purpose.

In addition, these dot patterns are preferably printed as so-called "stealth" dot patterns as described in the specific embodiments (1) to (7).

The memory of the copier of the present invention has a parameter table as shown in FIGS. 63 to 66 generated therein, in which parameters for print control can be registered on a per-object basis. These parameters are used for printing data by designating a specific region within a document.

FIG. 67 to FIG. 70 show specific embodiments of these parameters.

FIG. 67 contains a title [1], a graphic depicting a car [2], and graphs [3] and [4]. In the title [1] region, iMRK=1, which means that this is a security mark, jMRK=1, which means that dot printing has been performed on the object only, iCNG=1, which means that any copying is prohibited, iSTC=0, which means that there is no security parameters, and so on, have been registered as part of a dot pattern. The rest of this dot patter consists of: the serial number of the output unit on which the first print was made (NFST); whether or not a serial number should be added to a copy (NLST); the serial number of a document (NPRT); the number of objects to be printed on a paper surface (MOBJ); the active code assigned to each object (NACT), and so forth.

These print control parameters are superpose-printed as a dot pattern for each object in a document and are discharged as part of a printed material. Because of this, when an attempt is made to copy this printed material on a copier, it becomes possible for the control part of such copier to analyze the dot pattern for each object and control the copying task accordingly by, for example, prohibiting any copying at all or restricting the number of copies that can be made.

For example, if the parameter iCNG=1 is detected from a dot pattern read by the control part, it means that any copying is prohibited for this document and thus the control part does not issue a print instruction to the print part. Instead, the control part instructs the touch panel, etc., to display a message, "Any copying of this document is not permitted" or the like.

If the parameter NCPY=3 is detected from a dot pattern read by the control part, the control part instructs the print part to make up to 3 copies and no more.

In FIG. 68, it is indicated that the region containing the term "CONFIDENTIAL" is a security mark (iMRK=1), while the other objects, i.e., house and tree, are not subjected to any print control because the parameter iMRK=0 is set. In this case, information dots associated with voice or other data can be placed as a dot pattern at the tree and/or house regions.

FIGS. 69 and 70 show two documents containing the same object but with different parameters. The dot pattern printed in FIG. 69 represents the parameter "iARA=0" and means that dots exist on the entire surface of the document, although it is not defined in the parameter tables in FIGS. 63 to 66. The dot pattern printed in FIG. 70 represents the parameter "iARA=1," which means that dots are placed in the house region only.

Thus, according to this specific embodiment, it is possible to dispose print control parameters for controlling copying in one or more desired regions in an original document by use of a printing unit.

Furthermore, when an original document which is a printed material containing such print control parameters is scanned, this specific embodiment enables the control part to prohibit any copying at all, restrict the number of copies or the scope of copying, or perform other controls as appropriate.

As described in the foregoing, the present invention provides an easy and inexpensive method of realizing a "stealth" dot pattern, whose presence on a medium surface is not visually recognizable, merely through minor improvements in the existing printing technology. The present invention can also realize an easy means of restricting copying of copy-prohibited confidential documents or copyrighted printed materials by using a copy printing unit to read such dot patters and perform print control according thereto.

Although this embodiment has been described using examples wherein a dot pattern is disposed on the surface of a photo sticker or paper medium, this embodiment can be used with any other types of medium, such as copy paper, trading cards, greeting cards, various stickers, bromide sheets, and photo albums.

Notable examples of printing means for this embodiment are photo sticker photographing units, color copiers, and scanner-equipped printers, but any other printing units, including simplified printers, can also be used.

INDUSTRIAL APPLICABILITY

Possible industrial applications of stealth dot patterns of the present invention include: speaking picture books and photo collection books; printed materials that require security protection on the printed surface (e.g., bank notes and public records); voice input systems and photo sticker printing functions incorporated in photo sticker units; functions for reading photo stickers and other surfaces incorporated in cellular phone terminals; print management on copy printing units (copying units); and many more.

BRIEF DESCRIPTION OF THE DRAWINGS

FIG. 63 is an explanatory drawing #1 showing a list of dot pattern parameters used by a printing unit according to the specific embodiment (10).

FIG. 64 is an explanatory drawing #2 showing a list of dot pattern parameters used by a printing unit according to the specific embodiment (10).

FIG. 65 is an explanatory drawing #3 showing a list of dot pattern parameters used by a printing unit according to the specific embodiment (10).

FIG. 66 is an explanatory drawing #4 showing a list of dot pattern parameters used by a printing unit according to the specific embodiment (10).

FIG. 76 is a diagram #5 showing the principle of the dot pattern (GRID-1).

FIG. 81 is a diagram #10 showing the principle of the dot pattern (GRID-1).

FIG. 87 is a diagram #5 showing the principle of the dot pattern (GRID-2).

DESCRIPTION OF THE NUMERALS

Figure 1:
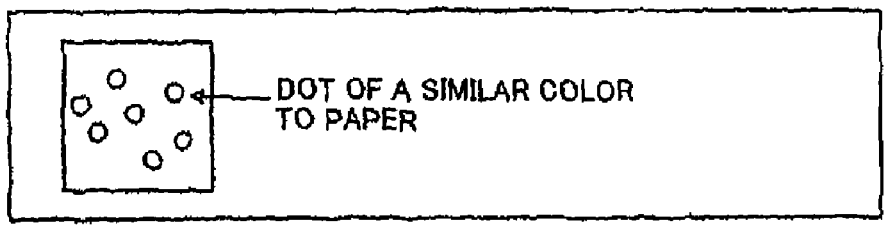
FIG. 1 is a diagram showing a state of dots printed according to the specific embodiment (1).
Figure 2:
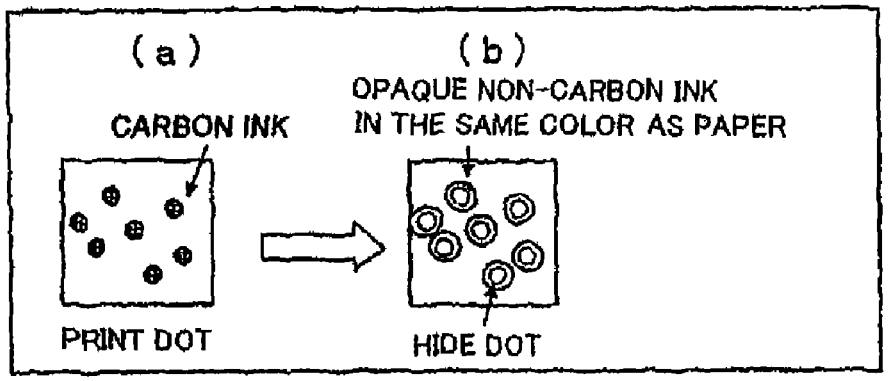
FIG. 2 is a diagram #1 showing a state of dots printed according to the specific embodiment (2).
Figure 3:
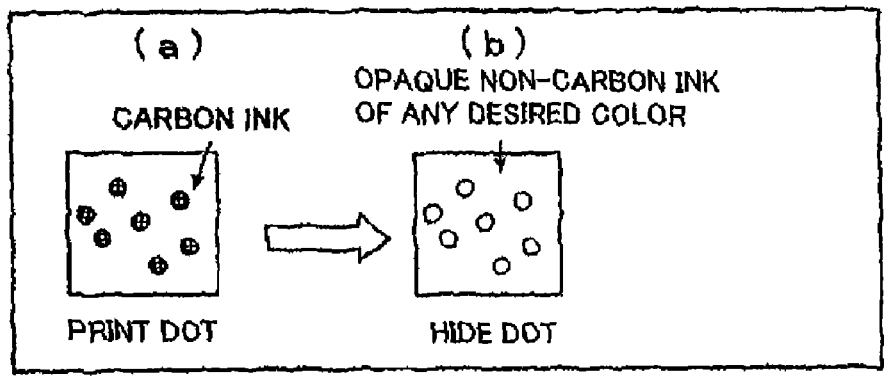
FIG. 3 is a diagram #2 showing a state of dots printed according to the specific embodiment (2).
Figure 4:
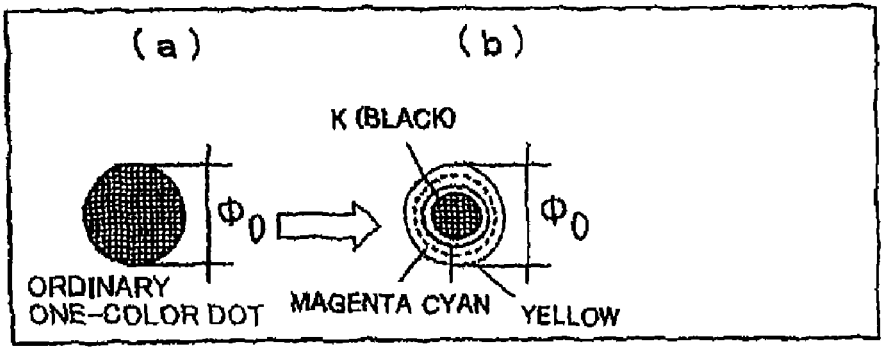
FIG. 4 is a diagram #1 showing a state of dots printed according to the specific embodiment (3).
Figure 5:
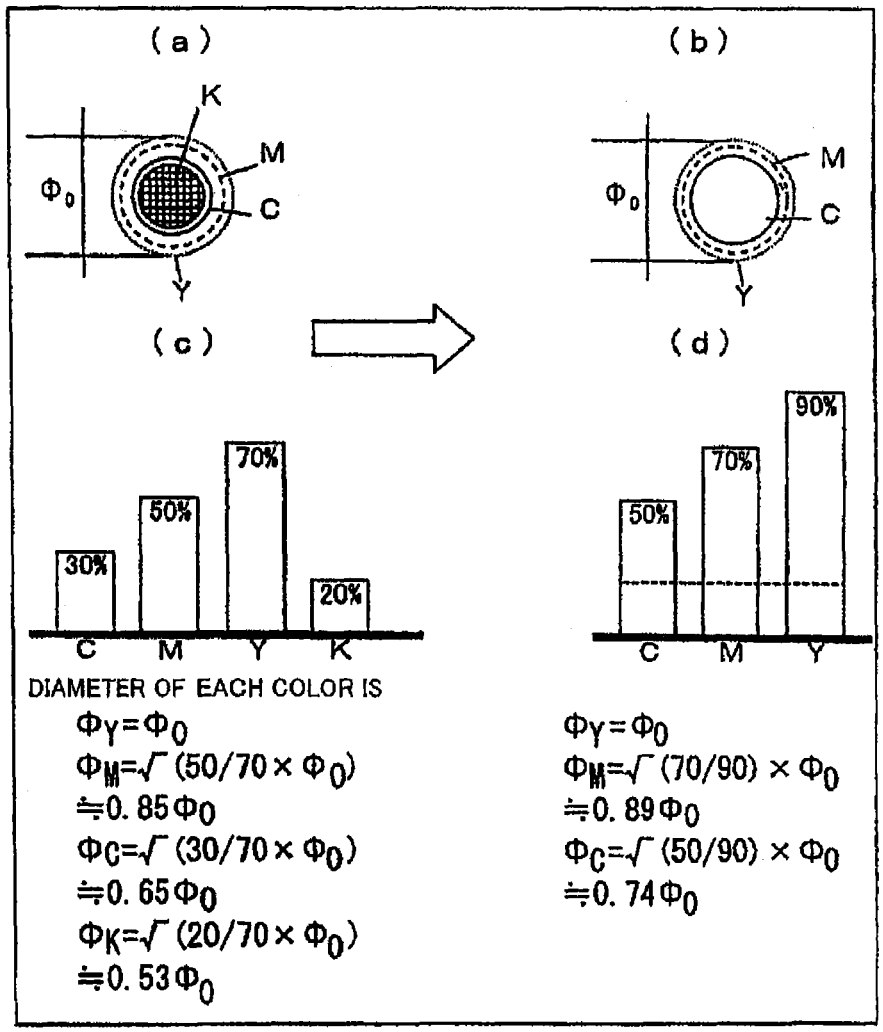
FIG. 5 is a diagram #2 showing a state of dots printed according to the specific embodiment (3).
Figure 6:
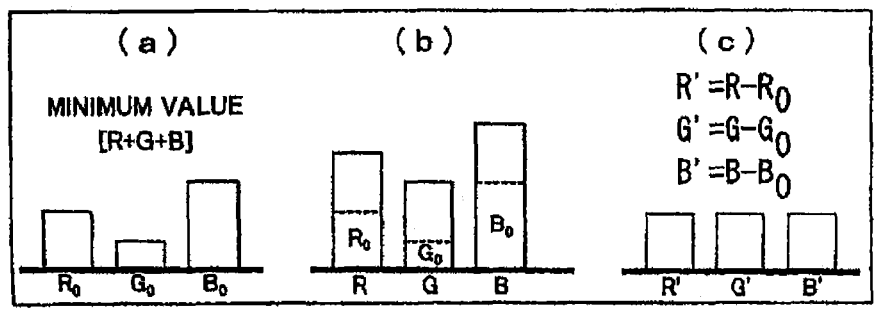
FIG. 6 is a diagram showing a state of dots printed according to the specific embodiment (4).
Figure 7:
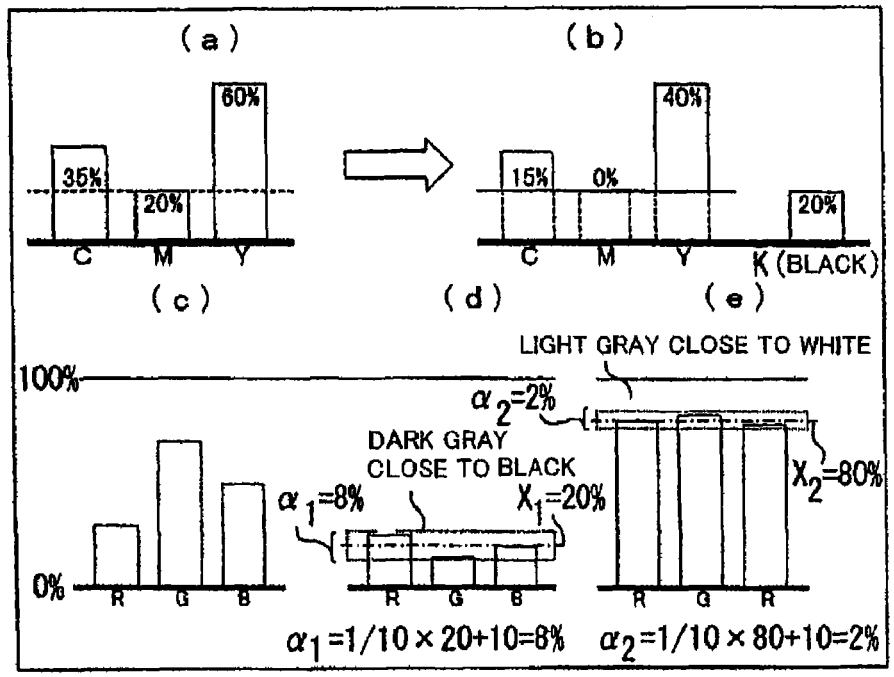
FIG. 7 is a diagram for explaining the principle of the specific embodiment (5).
Figure 8:
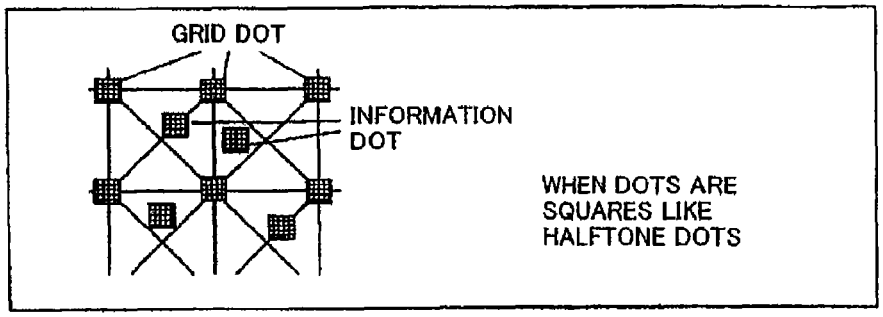
FIG. 8 is a diagram #1 showing a state of dots disposed according to the specific embodiment (5).
Figure 9:
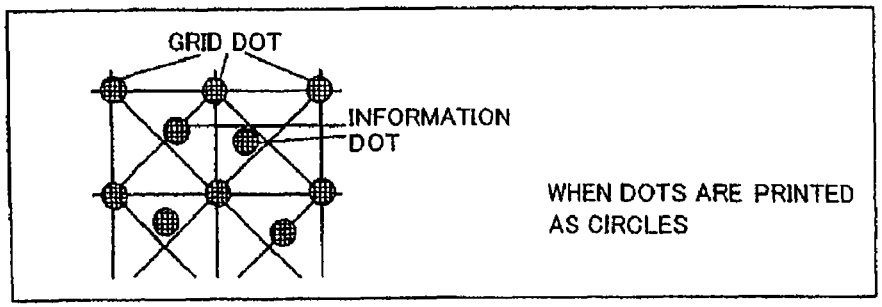
FIG. 9 is a diagram #1 showing a state of dots disposed according to the specific embodiment (5).
Figure 10:
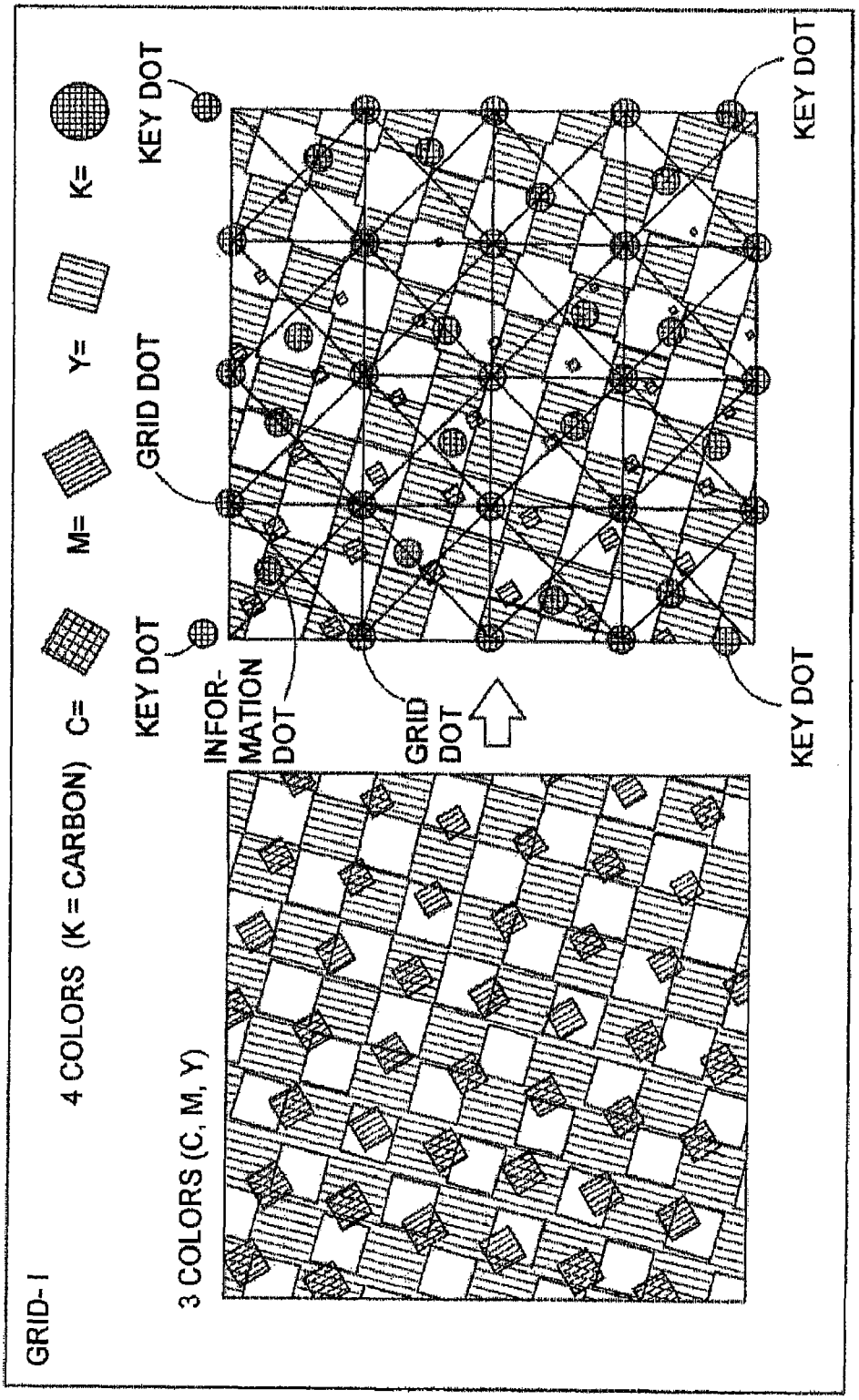
FIG. 10 is a diagram #1 showing an example of GRID-1 dot pattern layout according to the specific embodiment (5).
Figure 11:
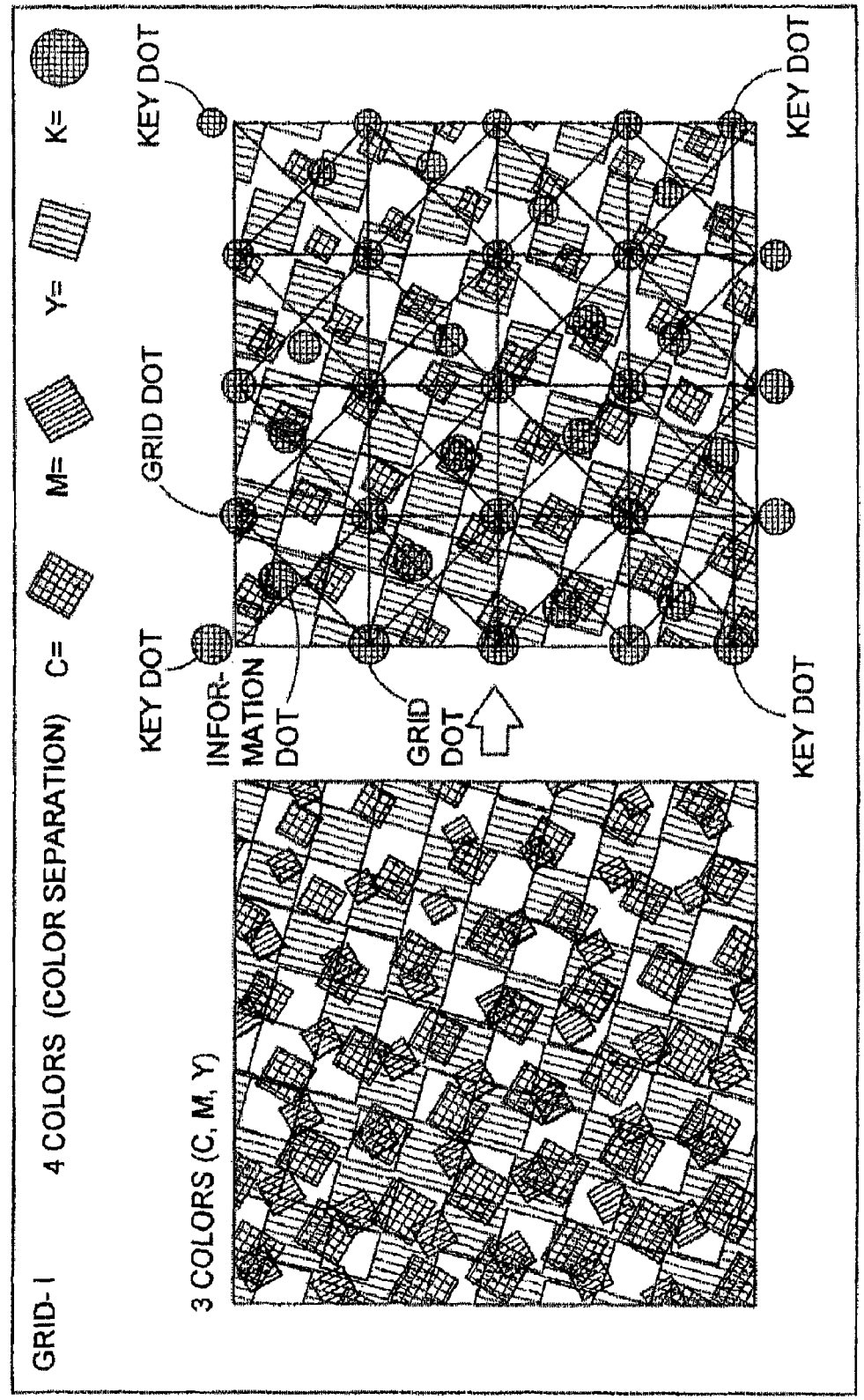
FIG. 11 is a diagram #2 showing an example of GRID-1 dot pattern layout according to the specific embodiment (5).
Figure 12:
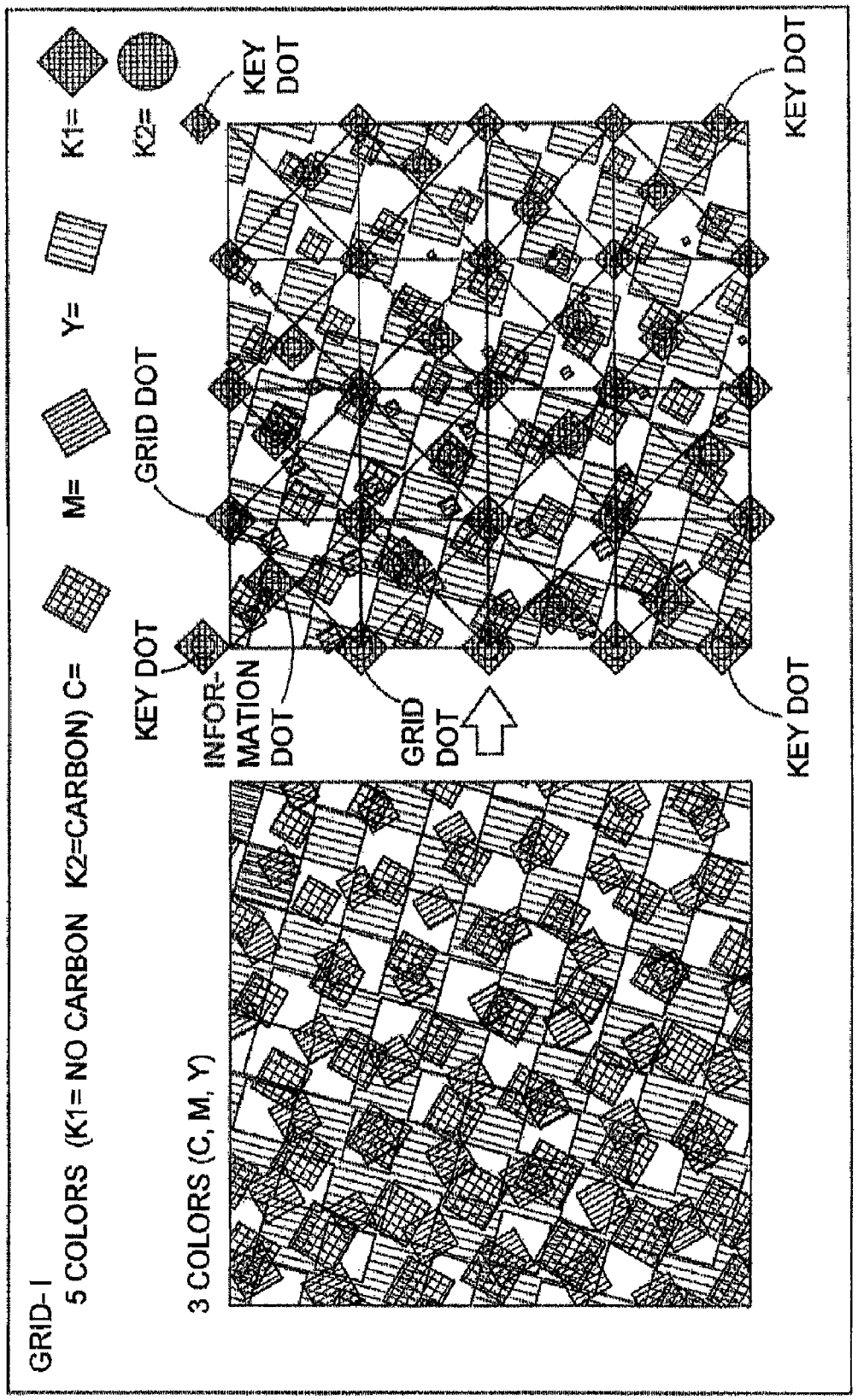
FIG. 12 is a diagram #3 showing an example of GRID-1 dot pattern layout according to the specific embodiment (5).
Figure 13:
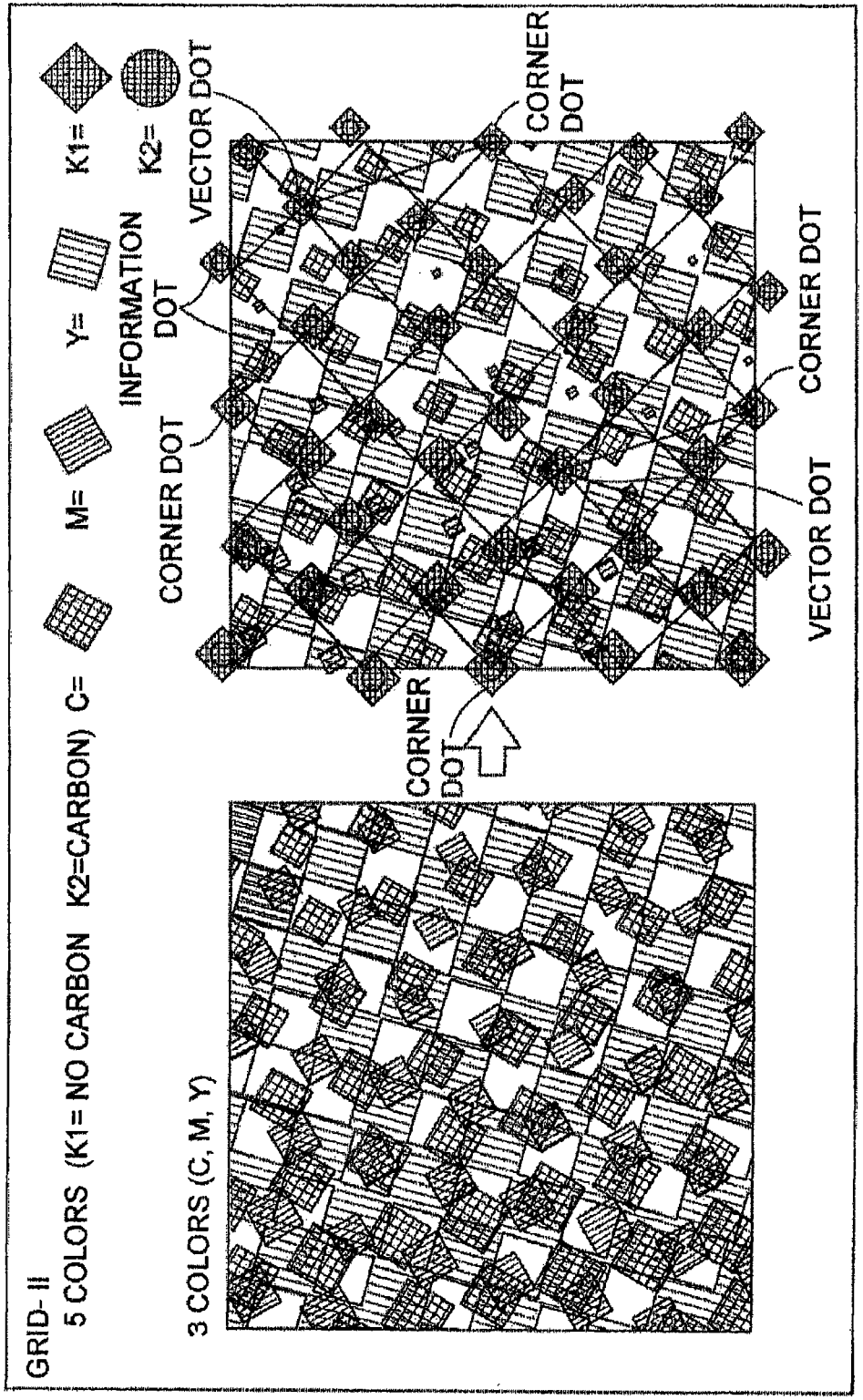
FIG. 13 is a diagram #1 showing an example of GRID-2 dot pattern layout according to the specific embodiment (5).
Figure 14:
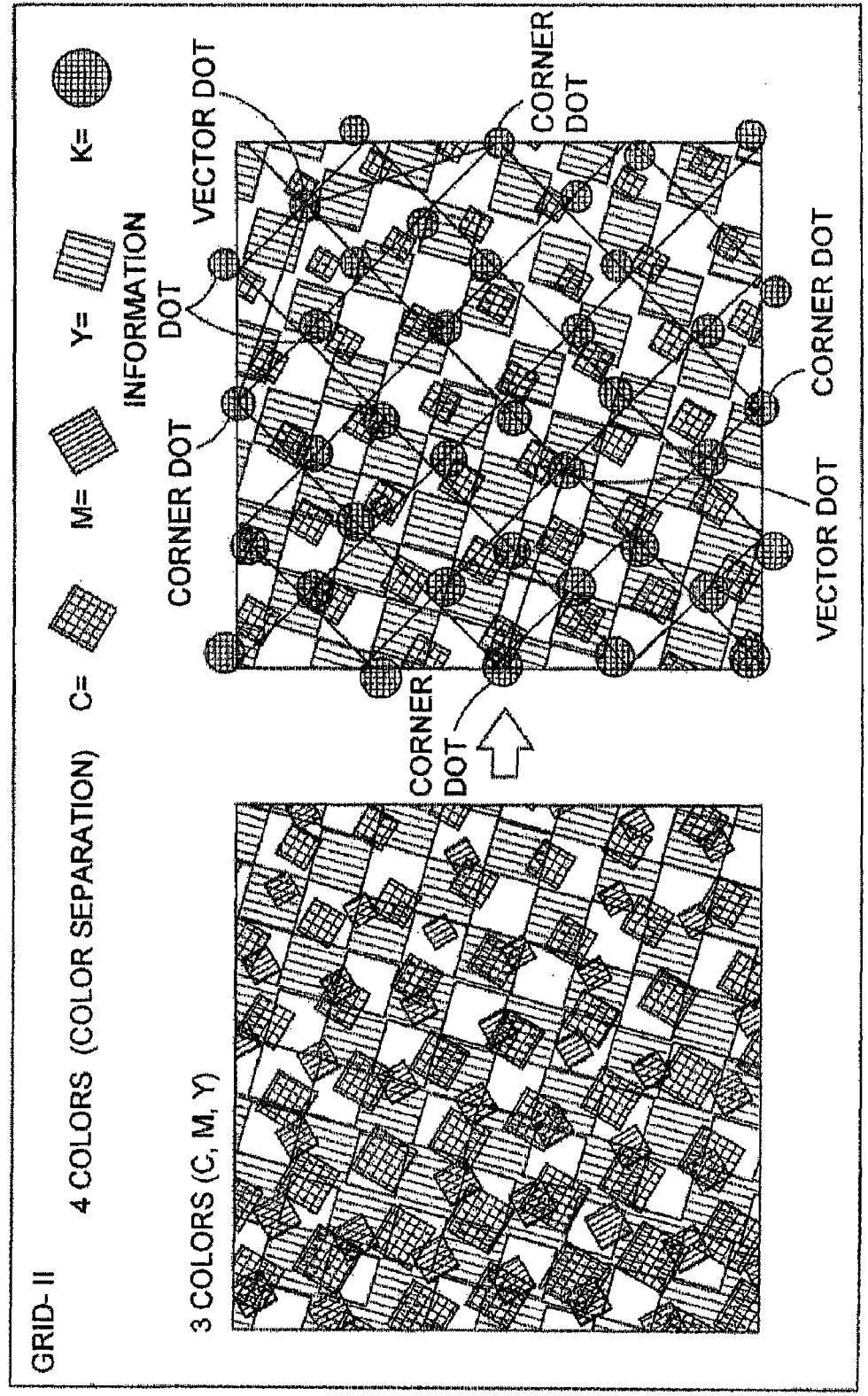
FIG. 14 is a diagram #2 showing an example of GRID-2 dot pattern layout according to the specific embodiment (5).
Figure 15:
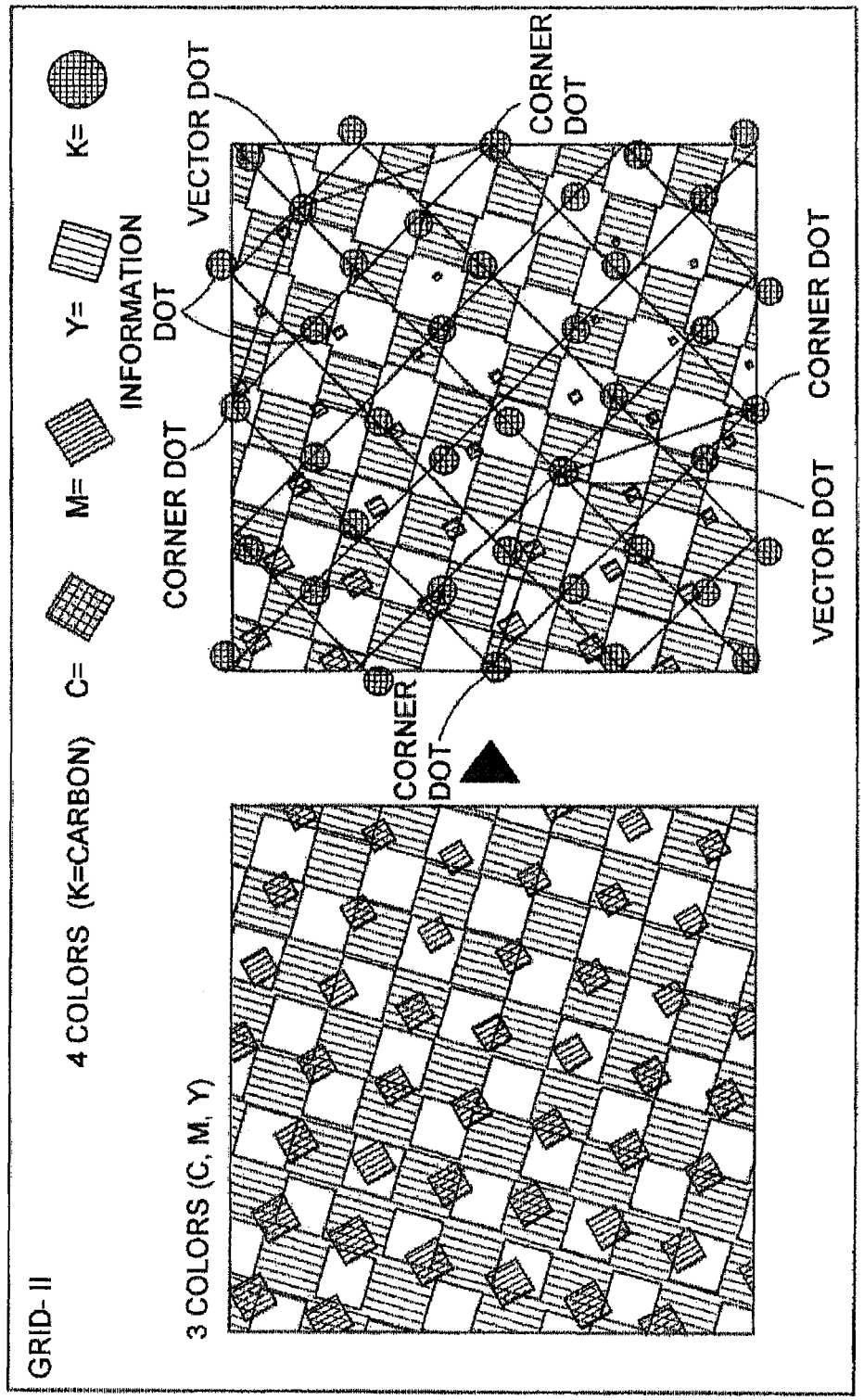
FIG. 15 is a diagram #3 showing an example of GRID-2 dot pattern layout according to the specific embodiment (5).
Figure 16:
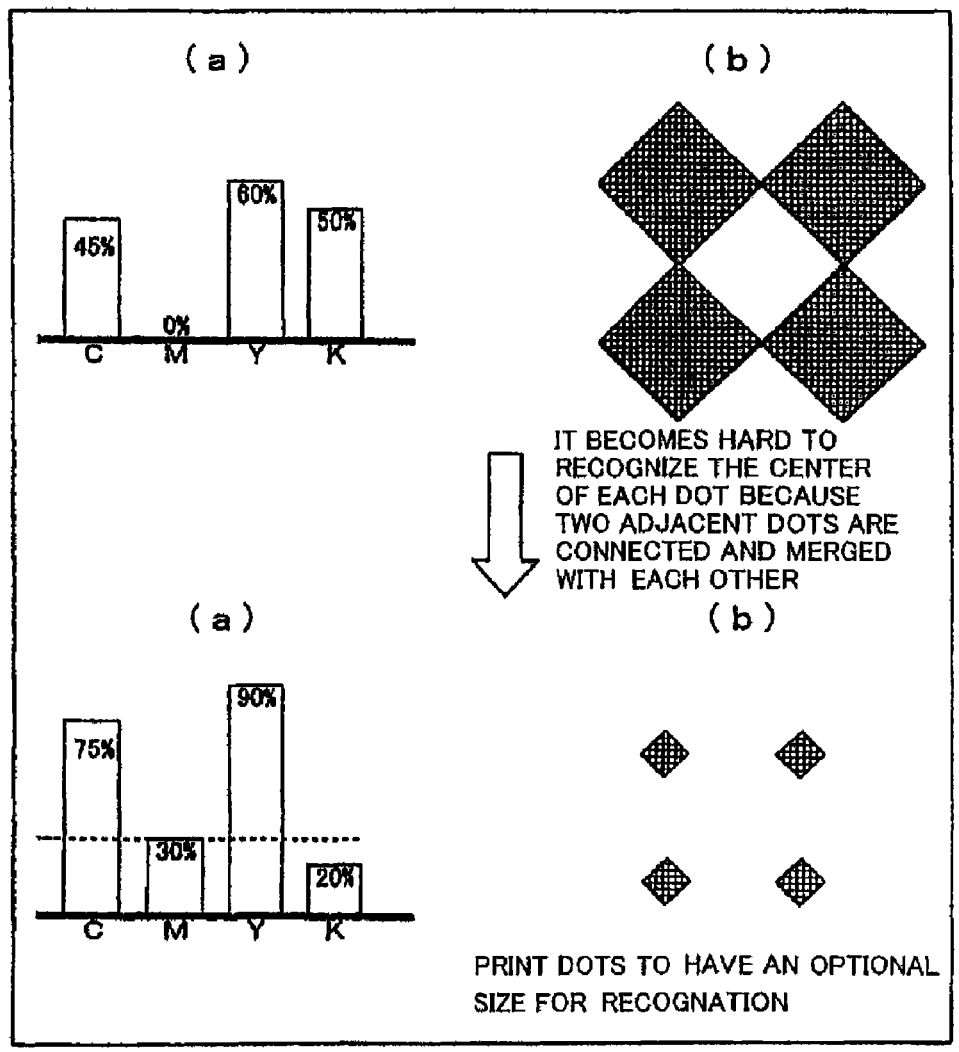
FIG. 16 is an explanatory drawing illustrating how the size of dots is controlled according to the specific embodiment (5).
Figure 17:
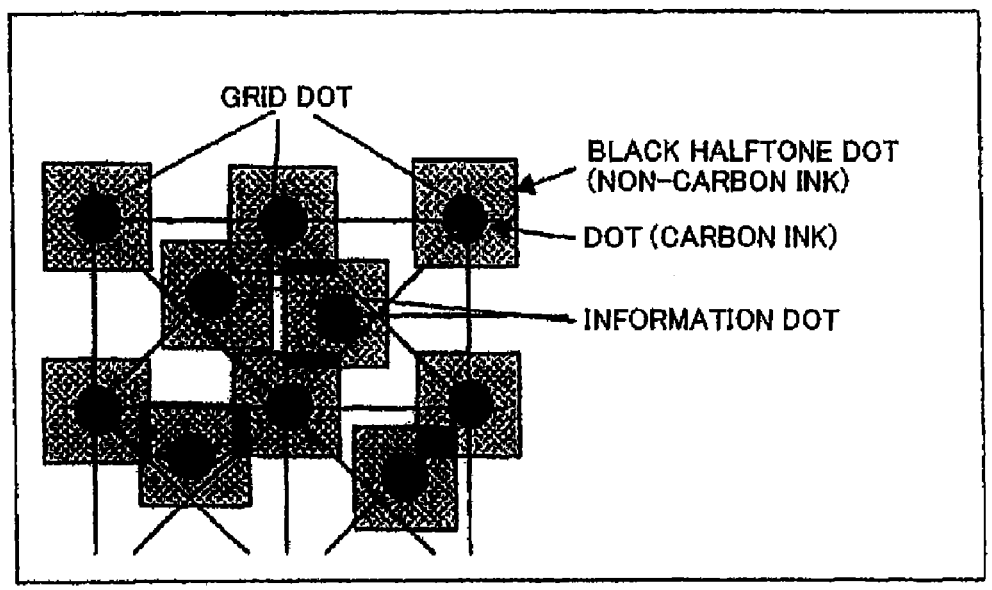
FIG. 17 is an explanatory drawing showing circular information dots disposed at the positions of square halftone dots according to the specific embodiment (5).
Figure 18:
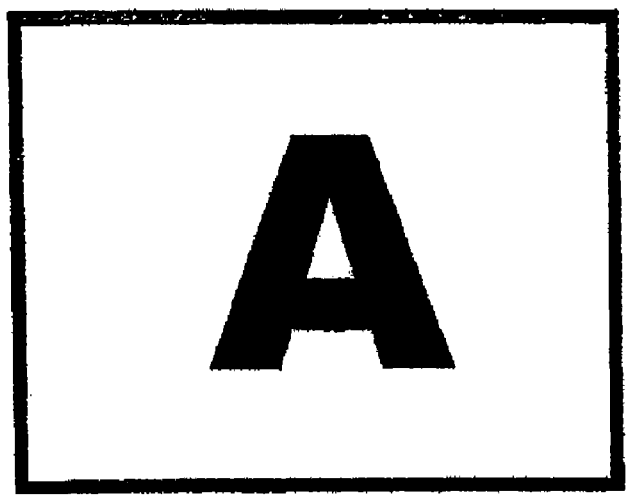
FIG. 18 shows an example #1 of a printed face wherein a masked shape is placed within an image according to the specific embodiment (6).
Figure 19:
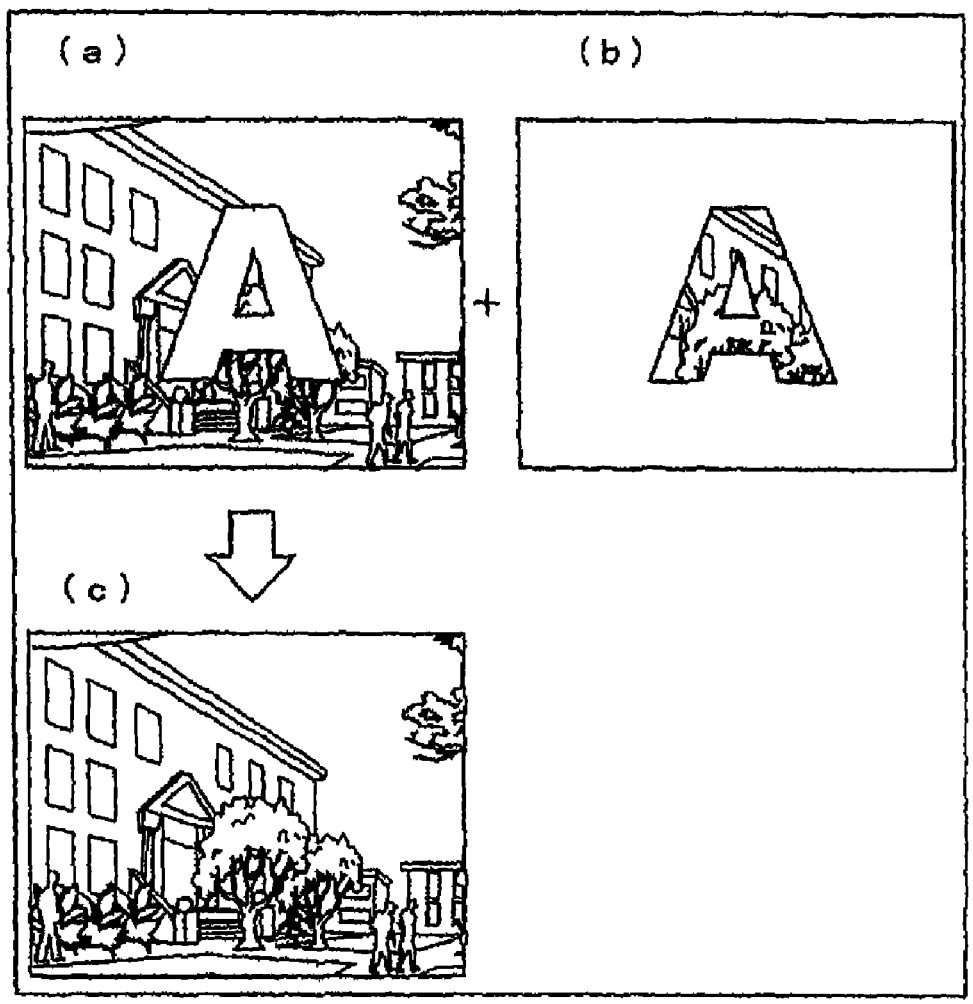
FIG. 19 shows an example #2 of a printed face wherein a masked shape is placed within an image according to the specific embodiment (6).
Figure 20:
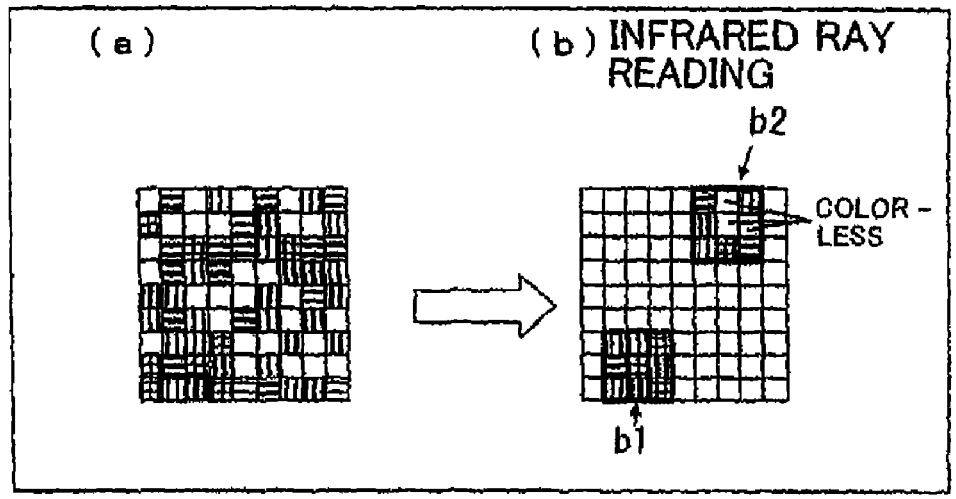
FIG. 20 is an explanatory drawing showing the method of generating a dot pattern using the FM screen printing method according to the specific embodiment (7).
Figure 21:
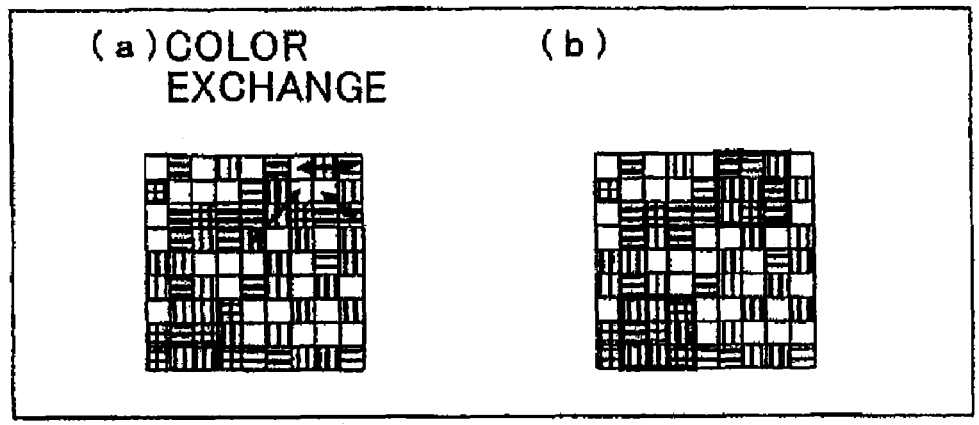
FIG. 21 is an explanatory drawing illustrating exchange of colors performed when forming a dot pattern according to the specific embodiment (7).
Figure 22:
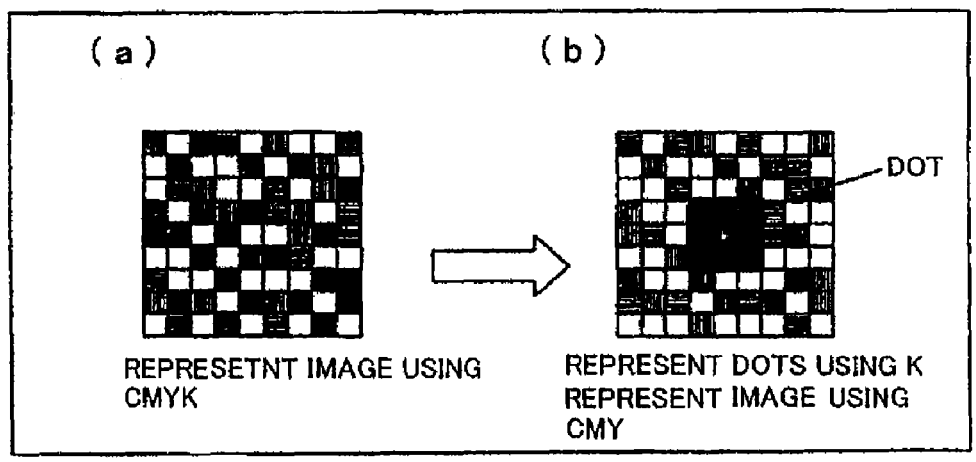
FIG. 22 is an explanatory diagram showing the method of forming a dot pattern according to the specific embodiment (7).
Figure 23:
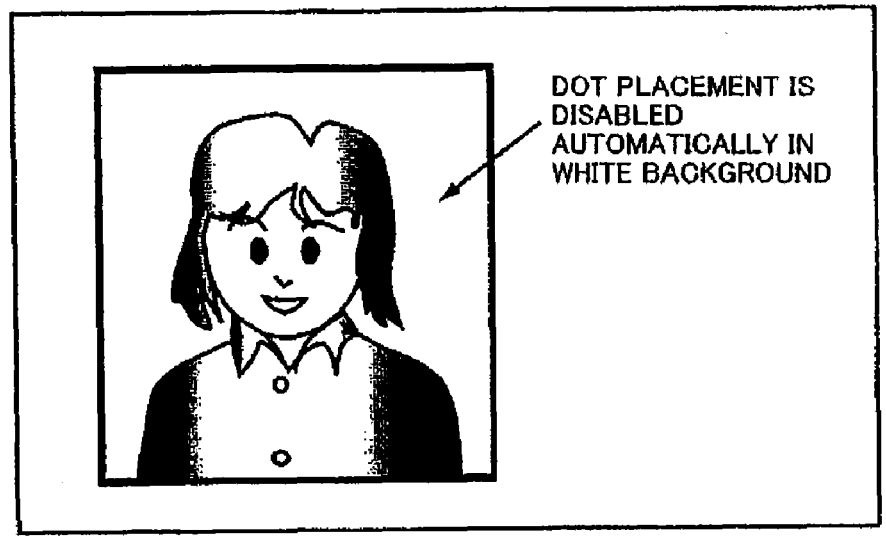
FIG. 23 is a diagram #1 showing the printed face of a photo sticker according to the specific embodiment (8).
Figure 24:
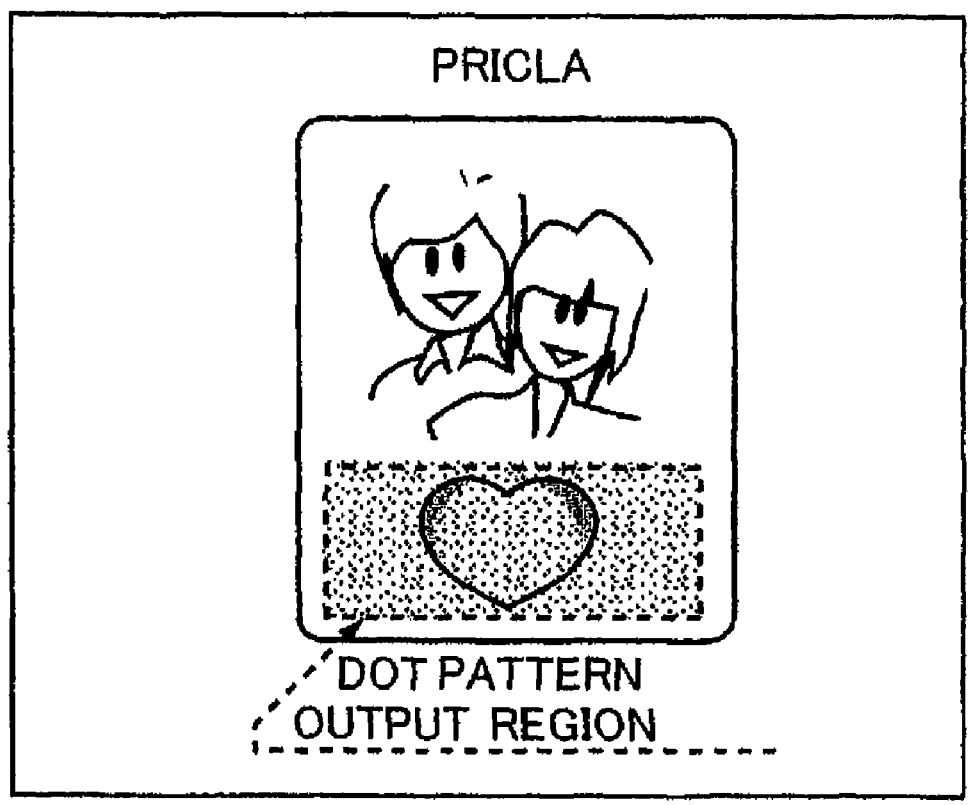
FIG. 24 is a diagram #2 showing the printed face of a photo sticker according to the specific embodiment (8).
Figure 25:
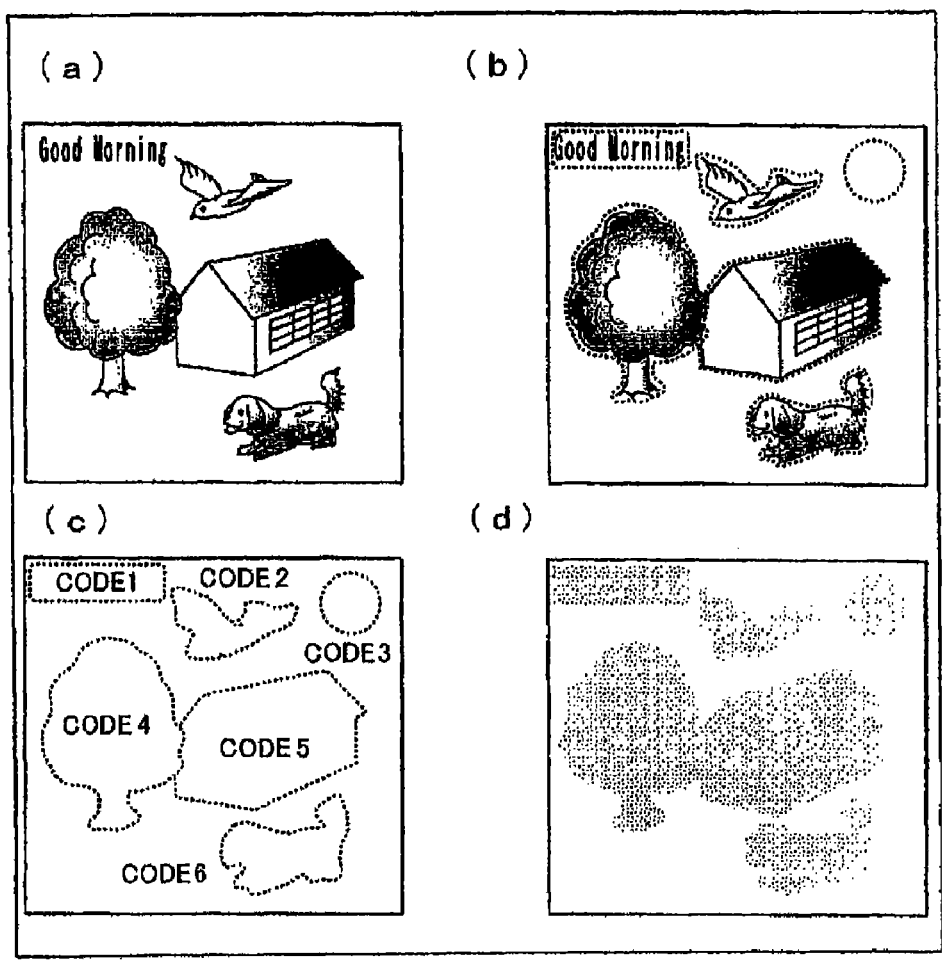
FIG. 25 is a diagram #3 showing the printed face of a photo sticker according to the specific embodiment (8).
Figure 26:
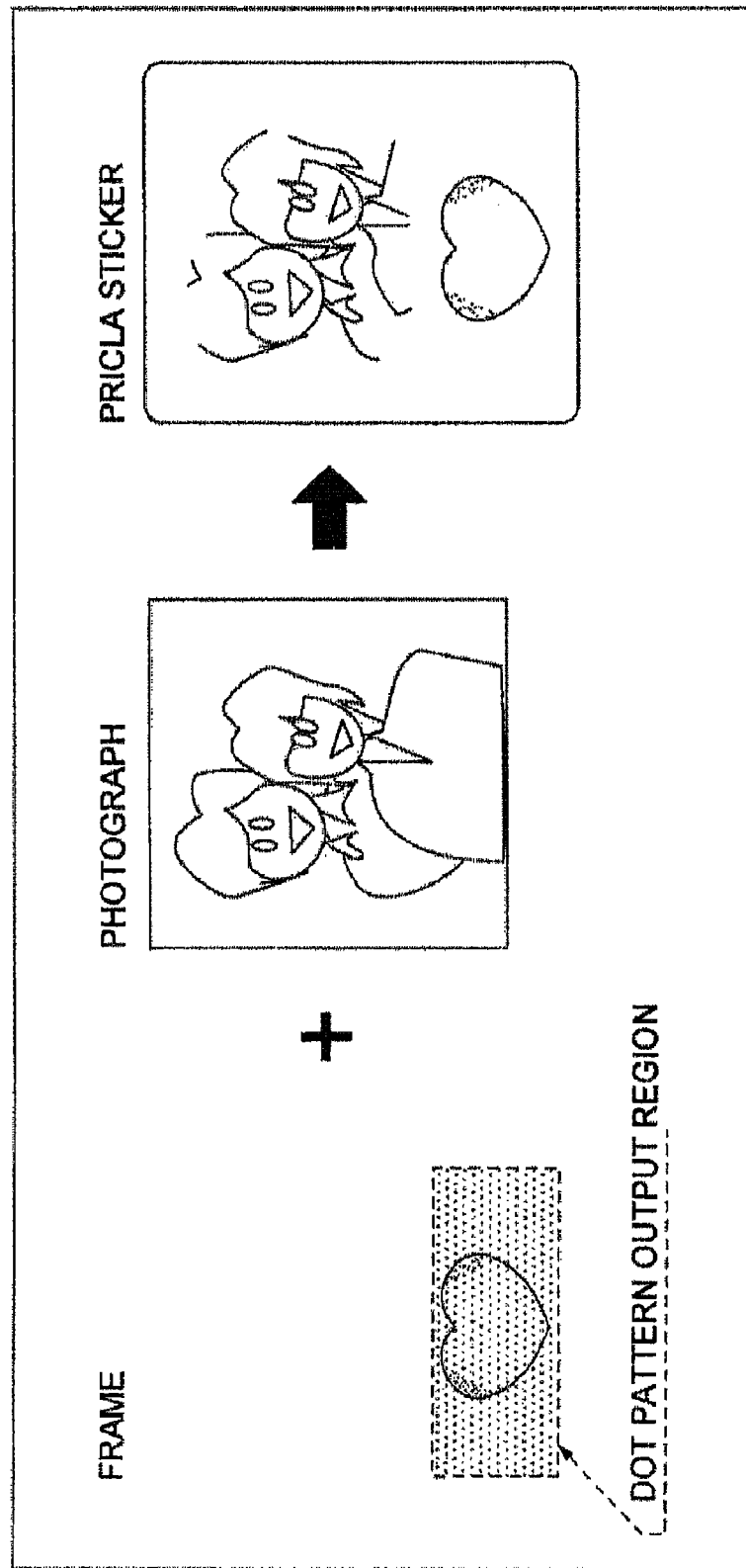
FIG. 26 is a diagram #4 showing the printed face of a photo sticker according to the specific embodiment (8).
Figure 27:
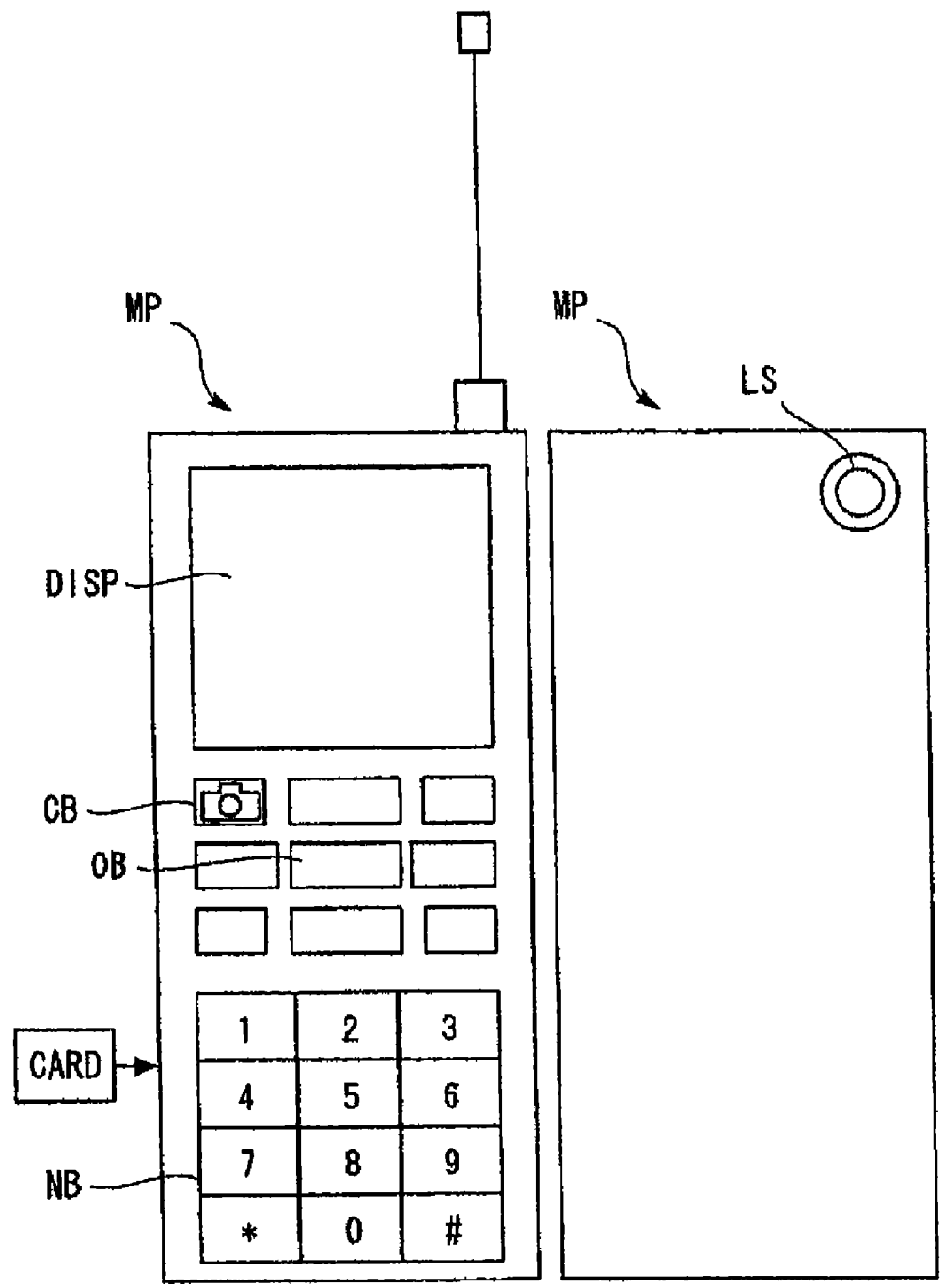
FIG. 27 is a diagram #1 showing a cellular phone terminal according to the specific embodiment (8).
Figure 28:
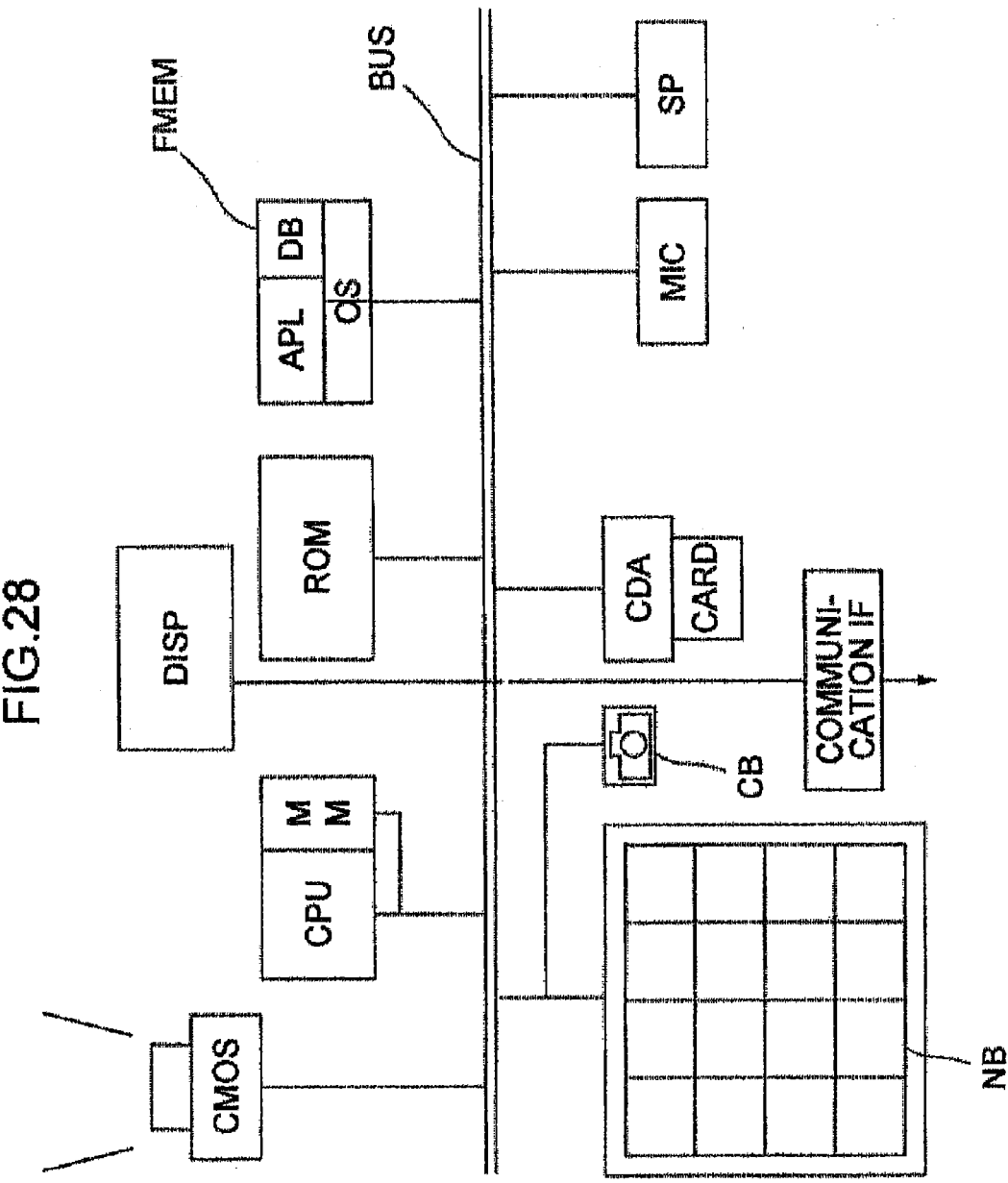
FIG. 28 is a diagram #2 showing a cellular phone terminal according to the specific embodiment (8).
Figure 29:
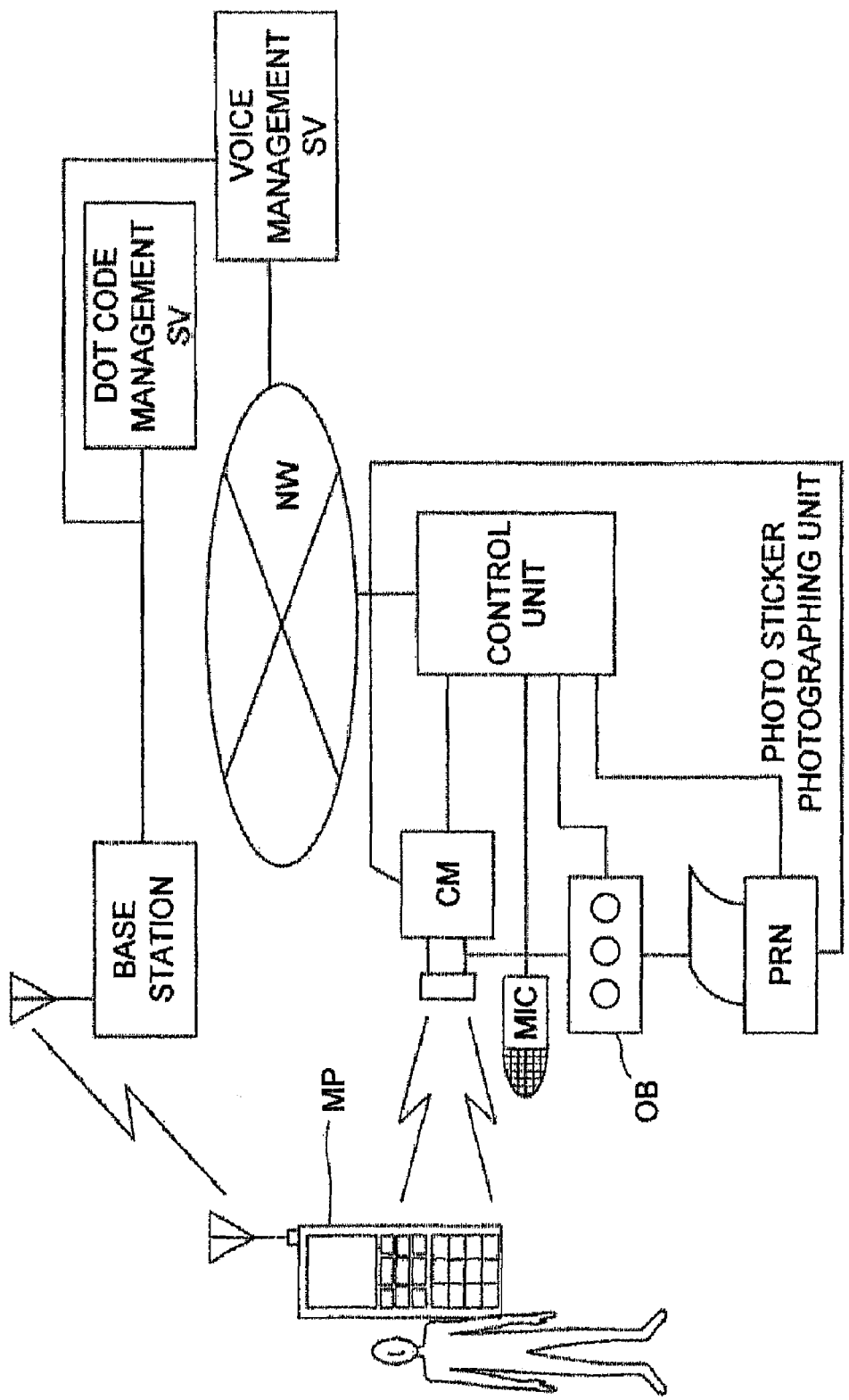
FIG. 29 is a diagram showing the system configuration for a photo sticker unit according to the specific embodiment (9).
Figure 30:
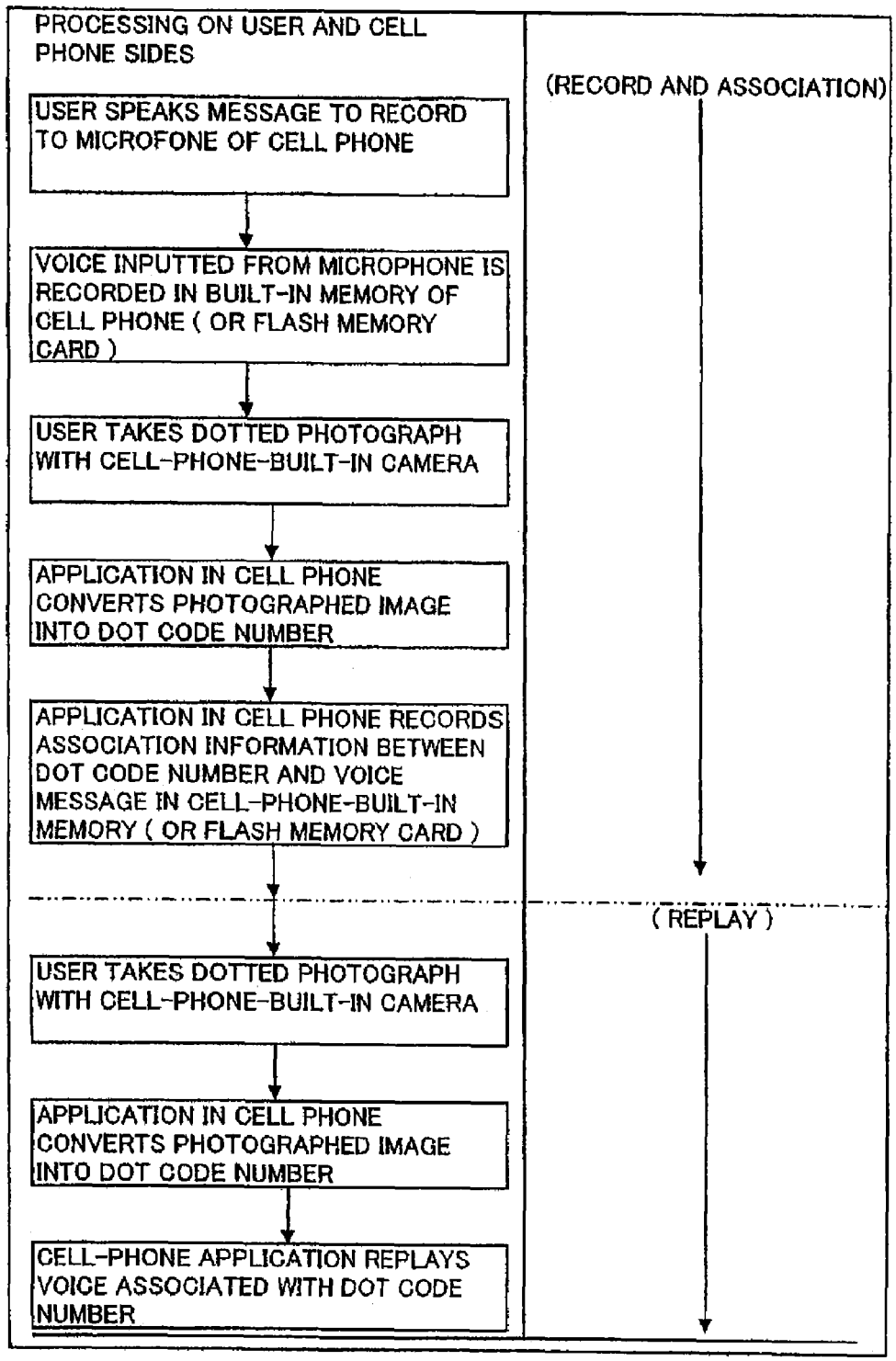
FIG. 30 is a flow diagram #1 showing the processing procedure according to the specific embodiment (8).
Figure 31:
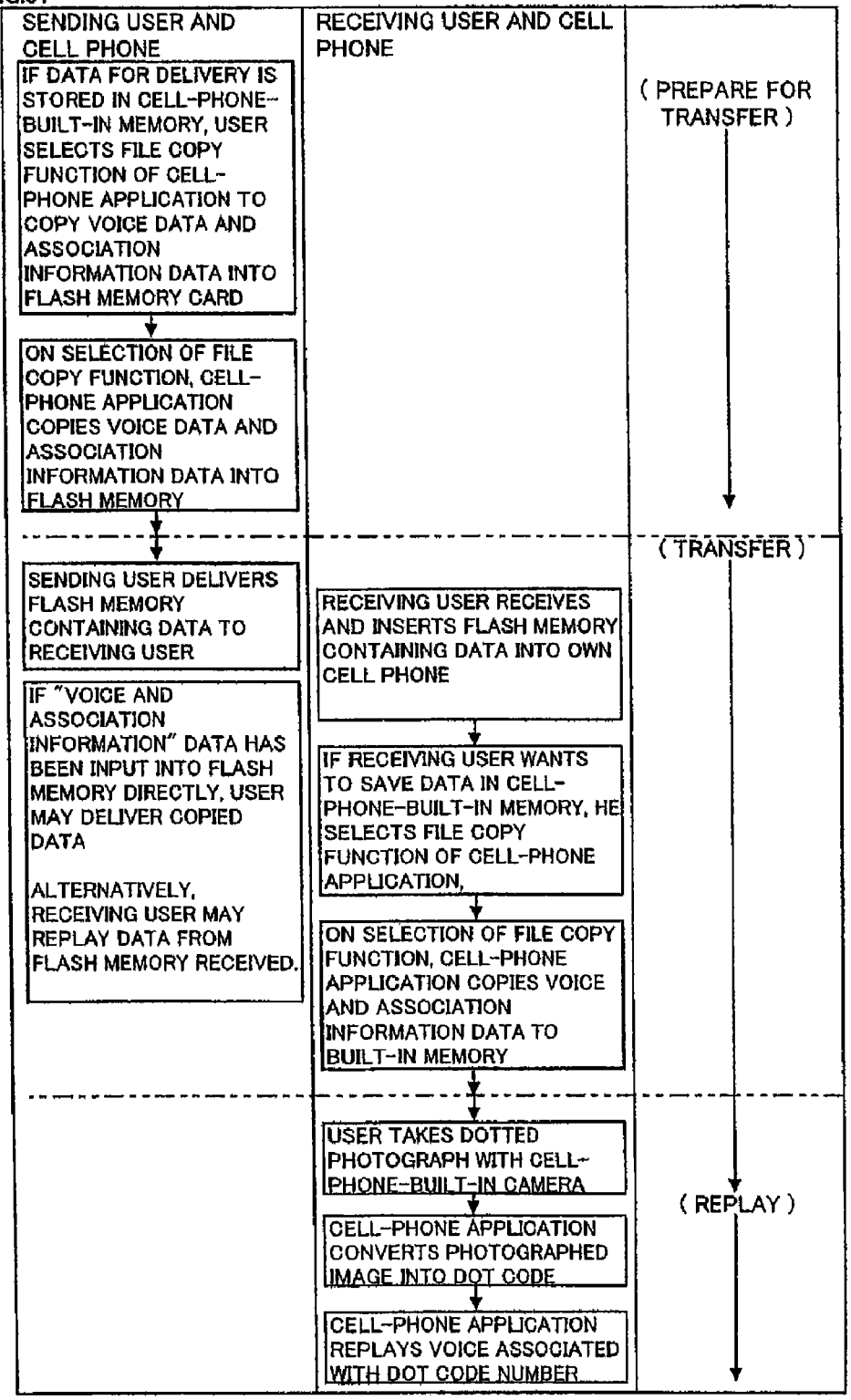
FIG. 31 is a flow diagram #2 showing the processing procedure according to the specific embodiment (8).
Figure 32:
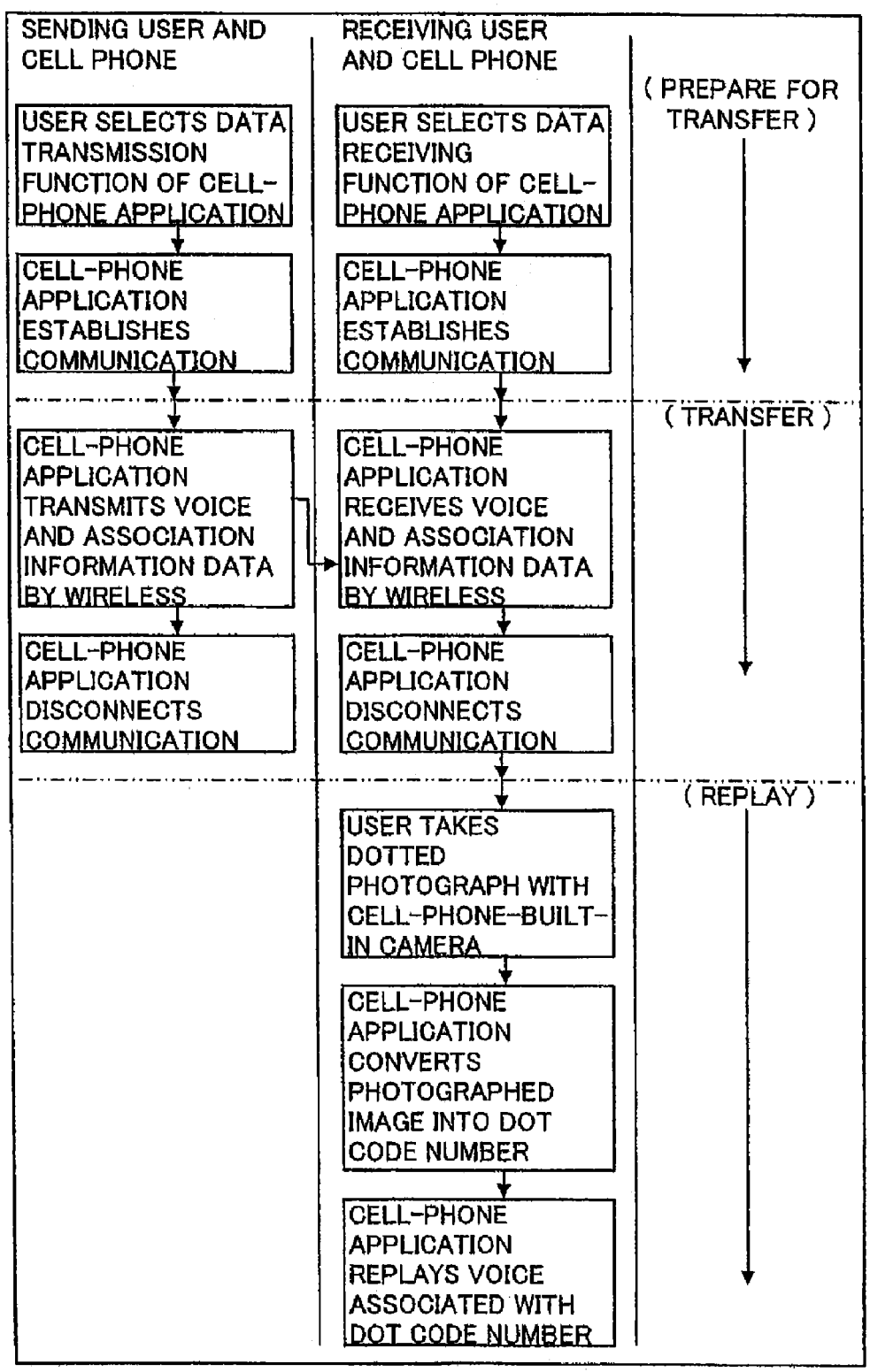
FIG. 32 is a flow diagram #3 showing the processing procedure according to the specific embodiment (8).
Figure 33:
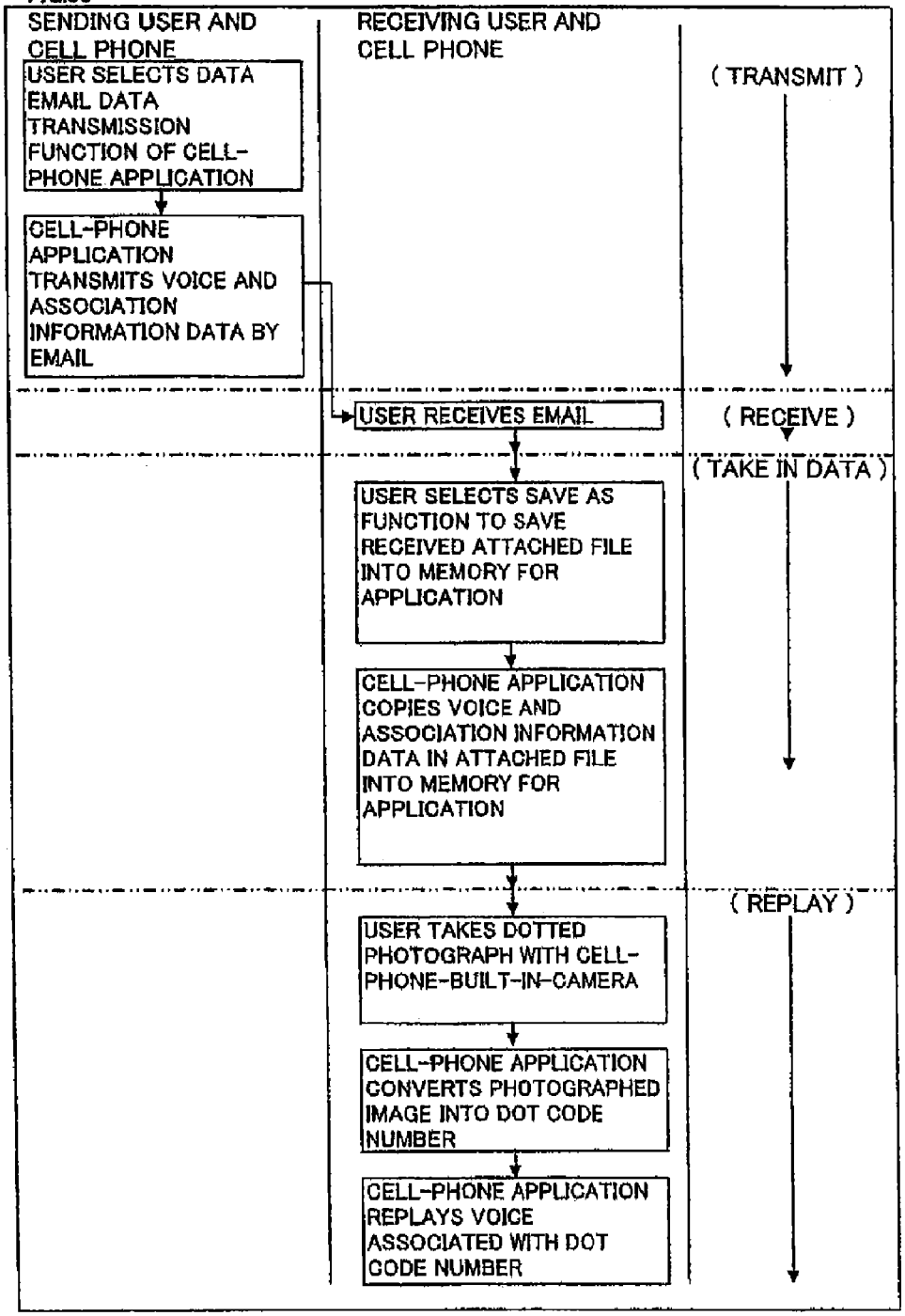
FIG. 33 is a flow diagram #4 showing the processing procedure according to the specific embodiment (8).
Figure 34:
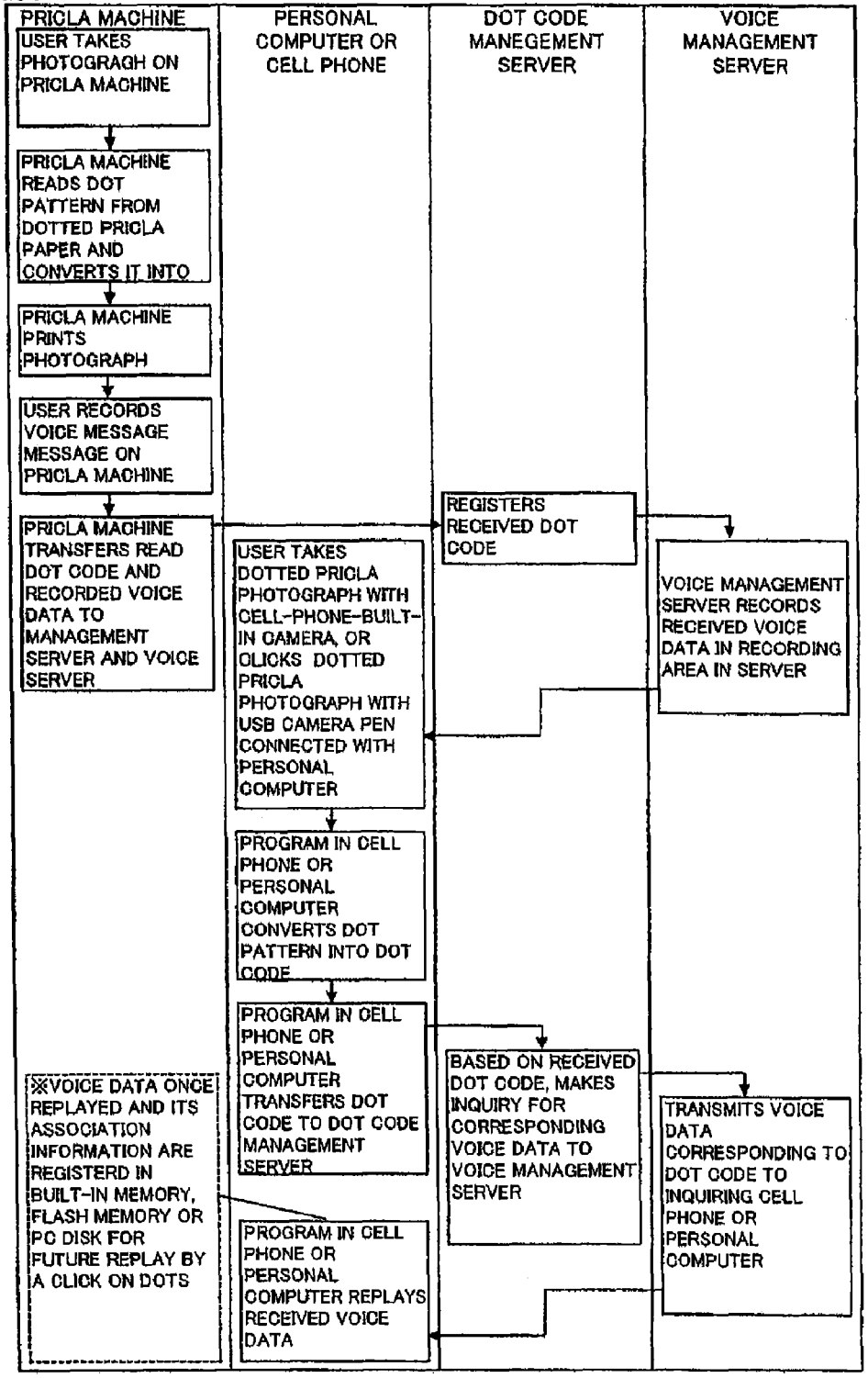
FIG. 34 is a flow diagram #1 showing the processing procedure according to the specific embodiment (9).
Figure 35:
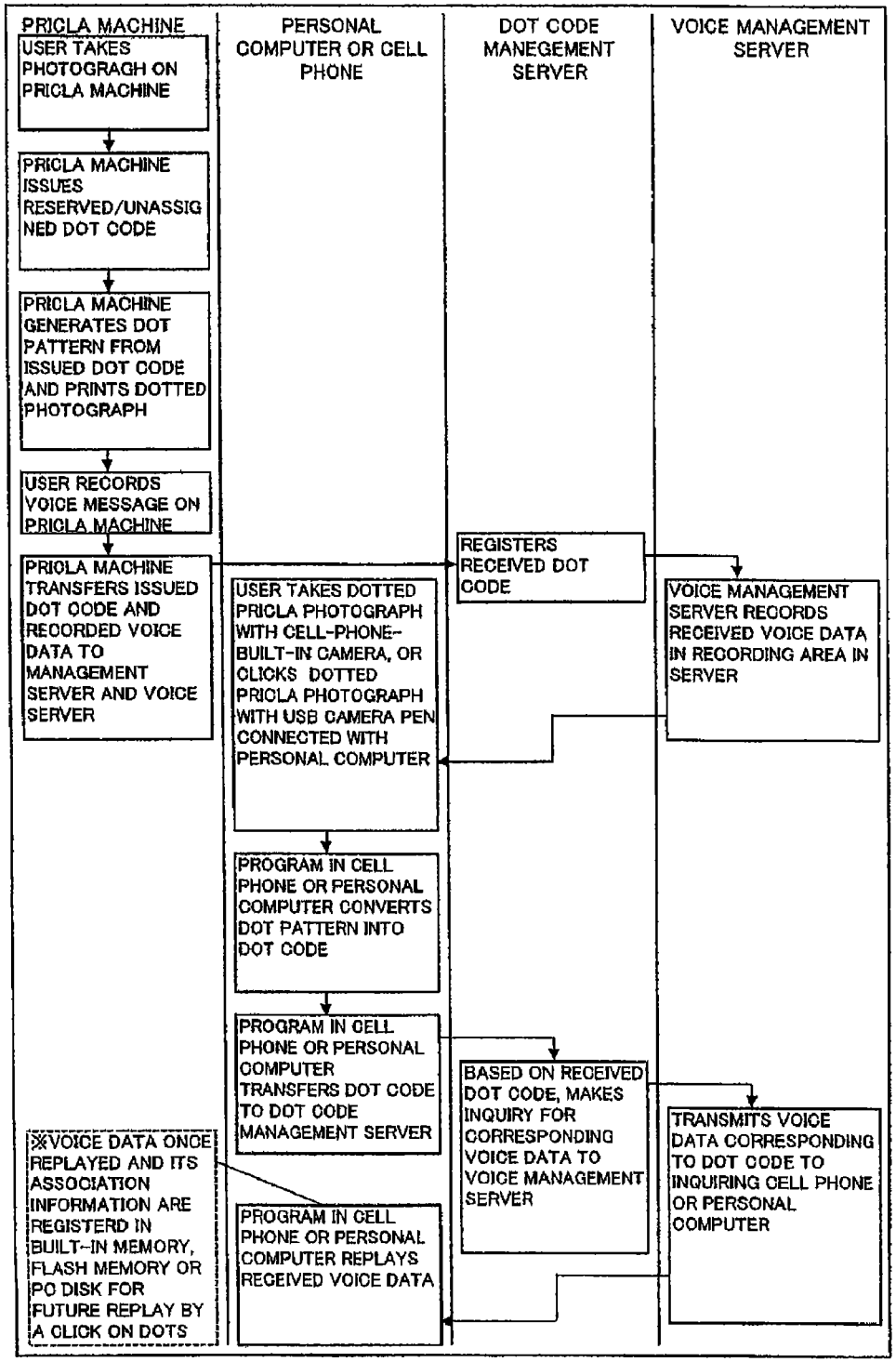
FIG. 35 is a flow diagram #2 showing the processing procedure according to the specific embodiment (9).
Figure 36:
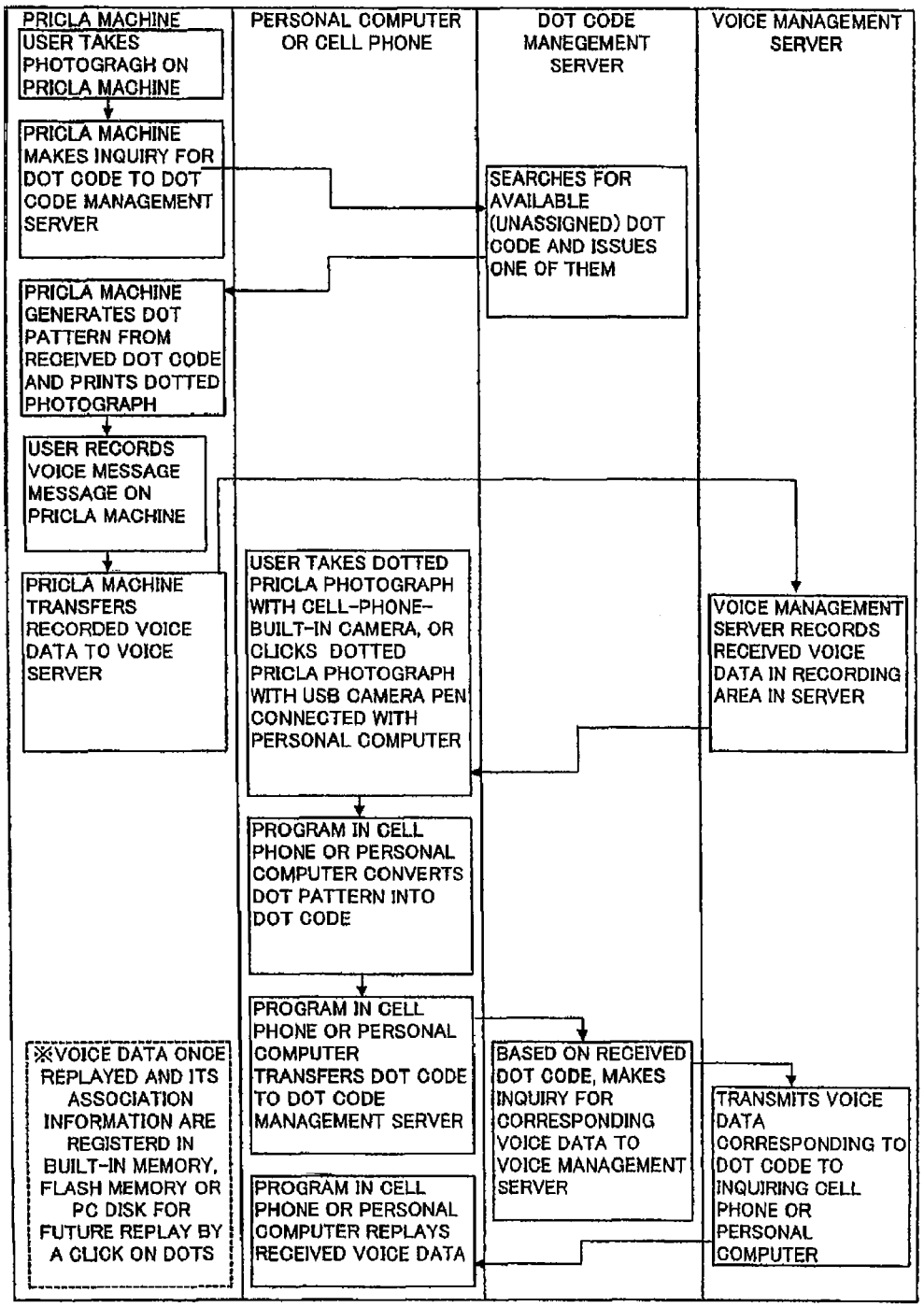
FIG. 36 is a flow diagram #3 showing the processing procedure according to the specific embodiment (9).
Figure 37:
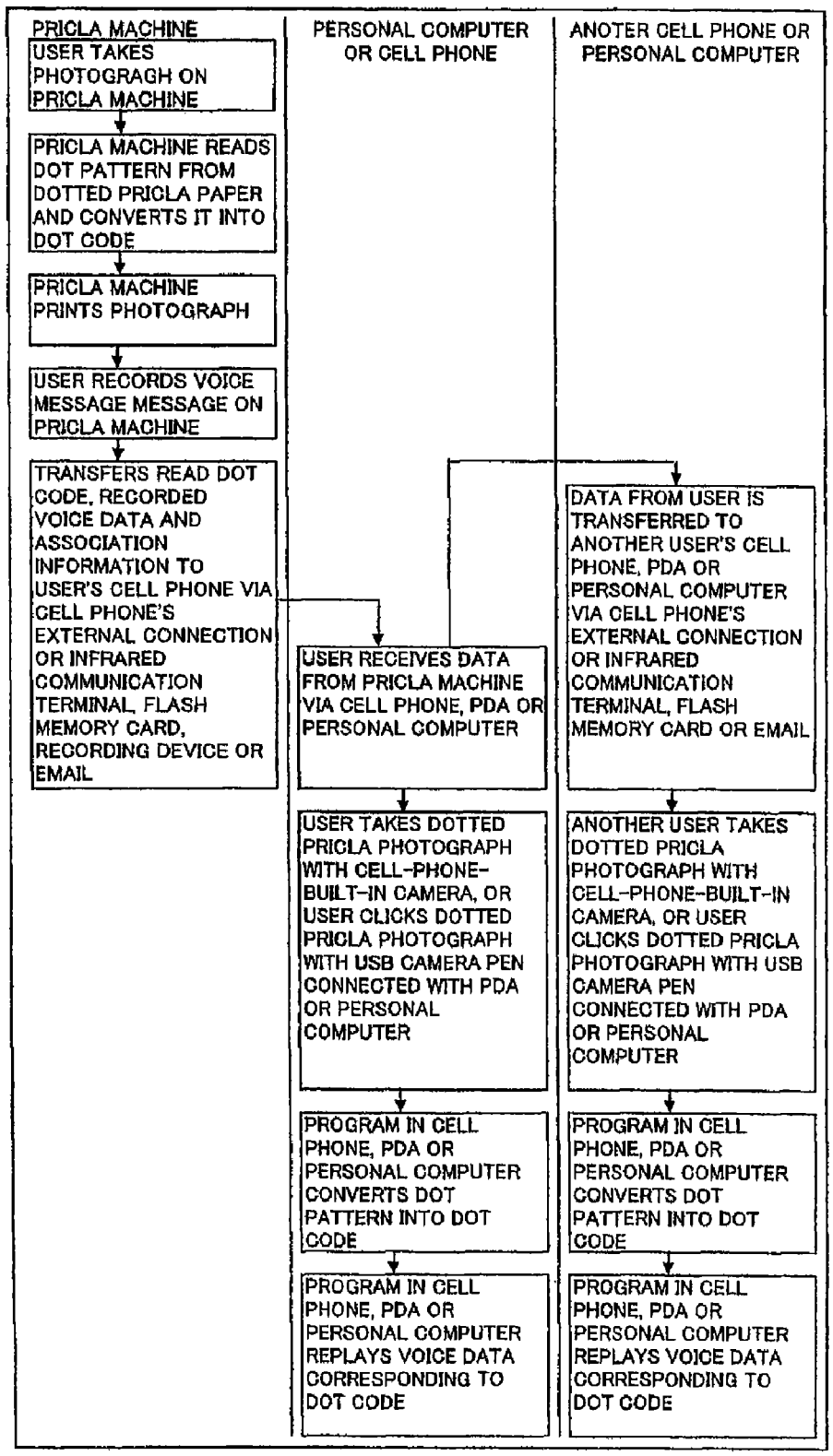
FIG. 37 is a flow diagram #4 showing the processing procedure according to the specific embodiment (9).
Figure 38:
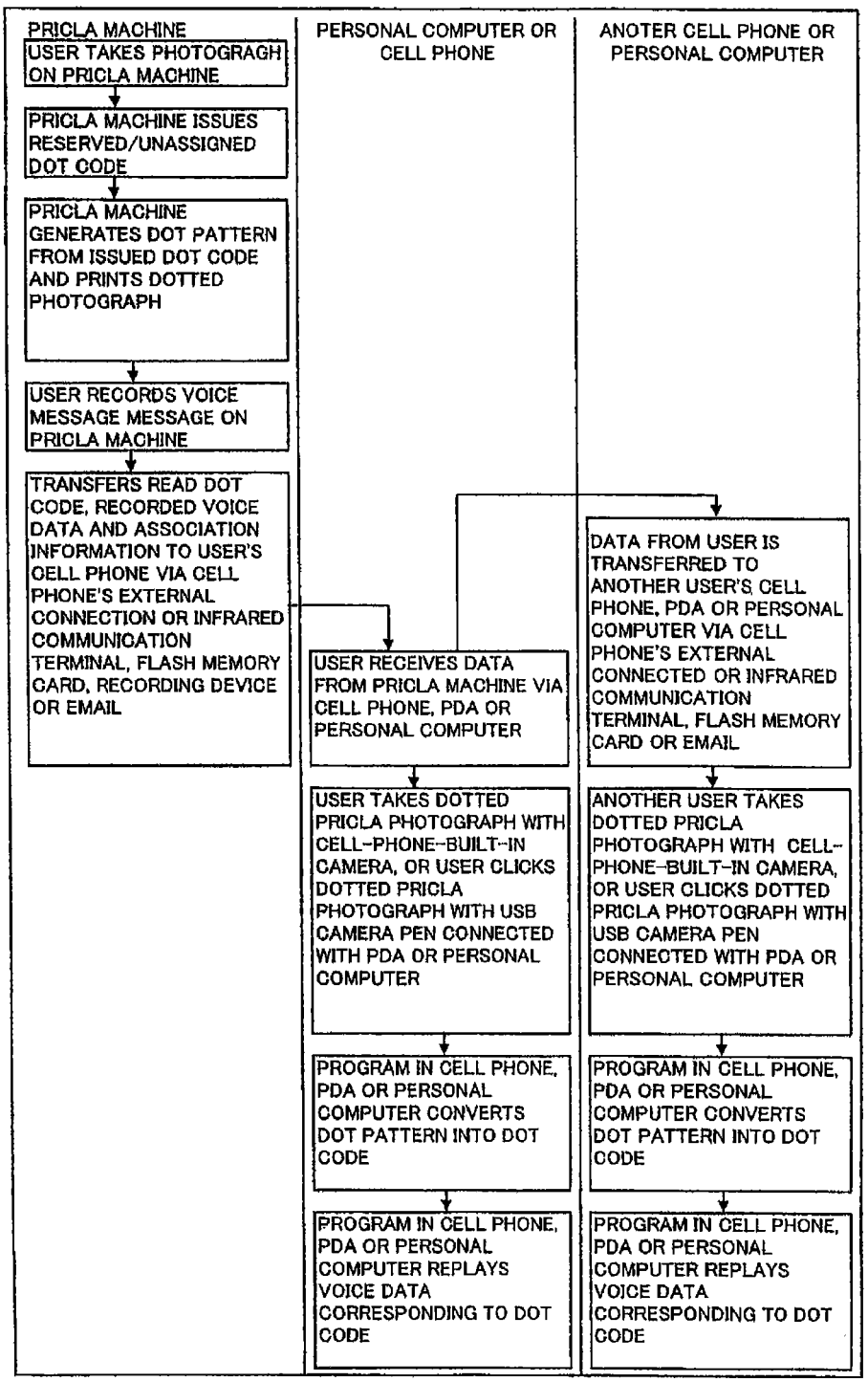
FIG. 38 is a flow diagram #5 showing the processing procedure according to the specific embodiment (9).
Figure 39:
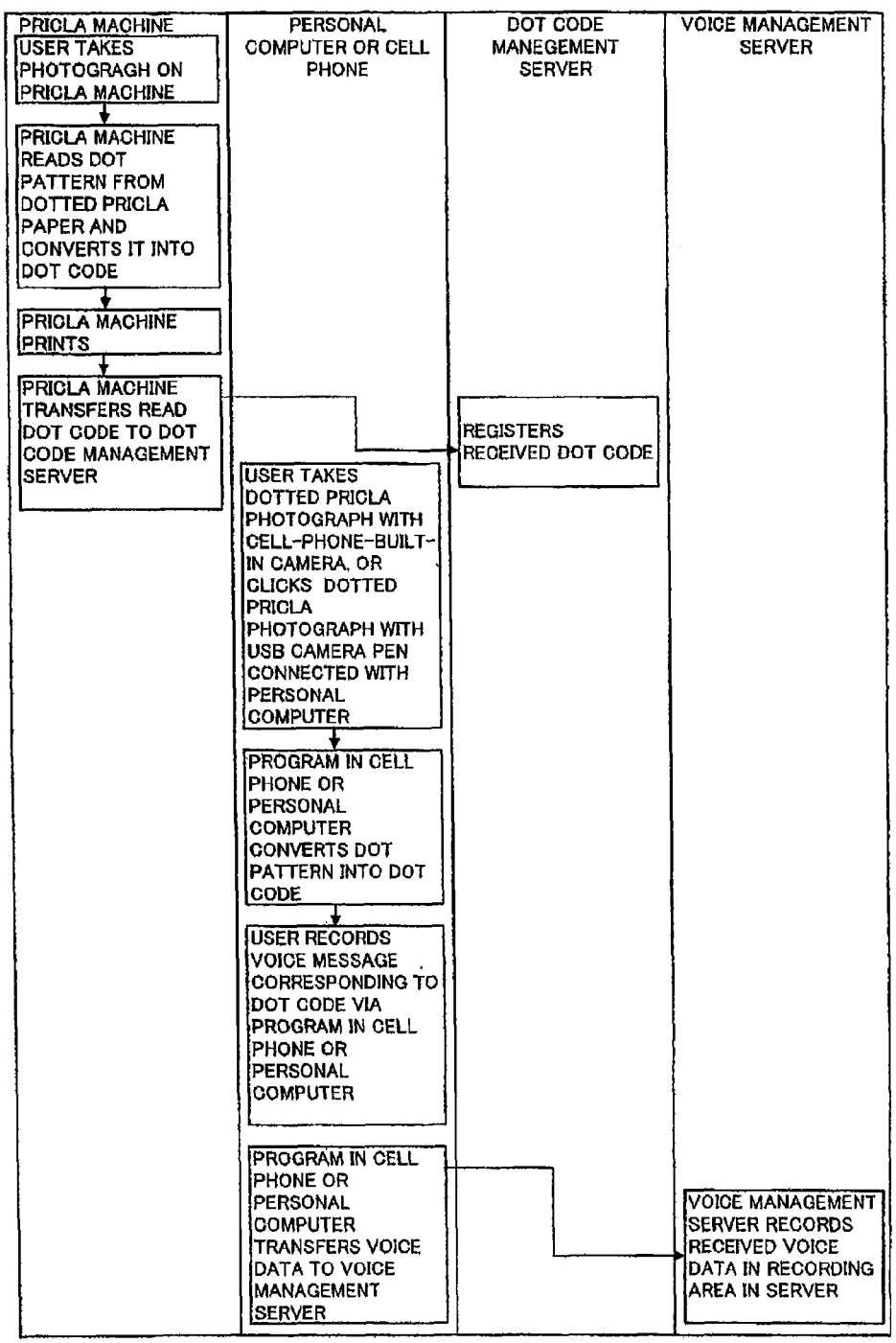
FIG. 39 is a flow diagram #6 showing the processing procedure according to the specific embodiment (9).
Figure 40:
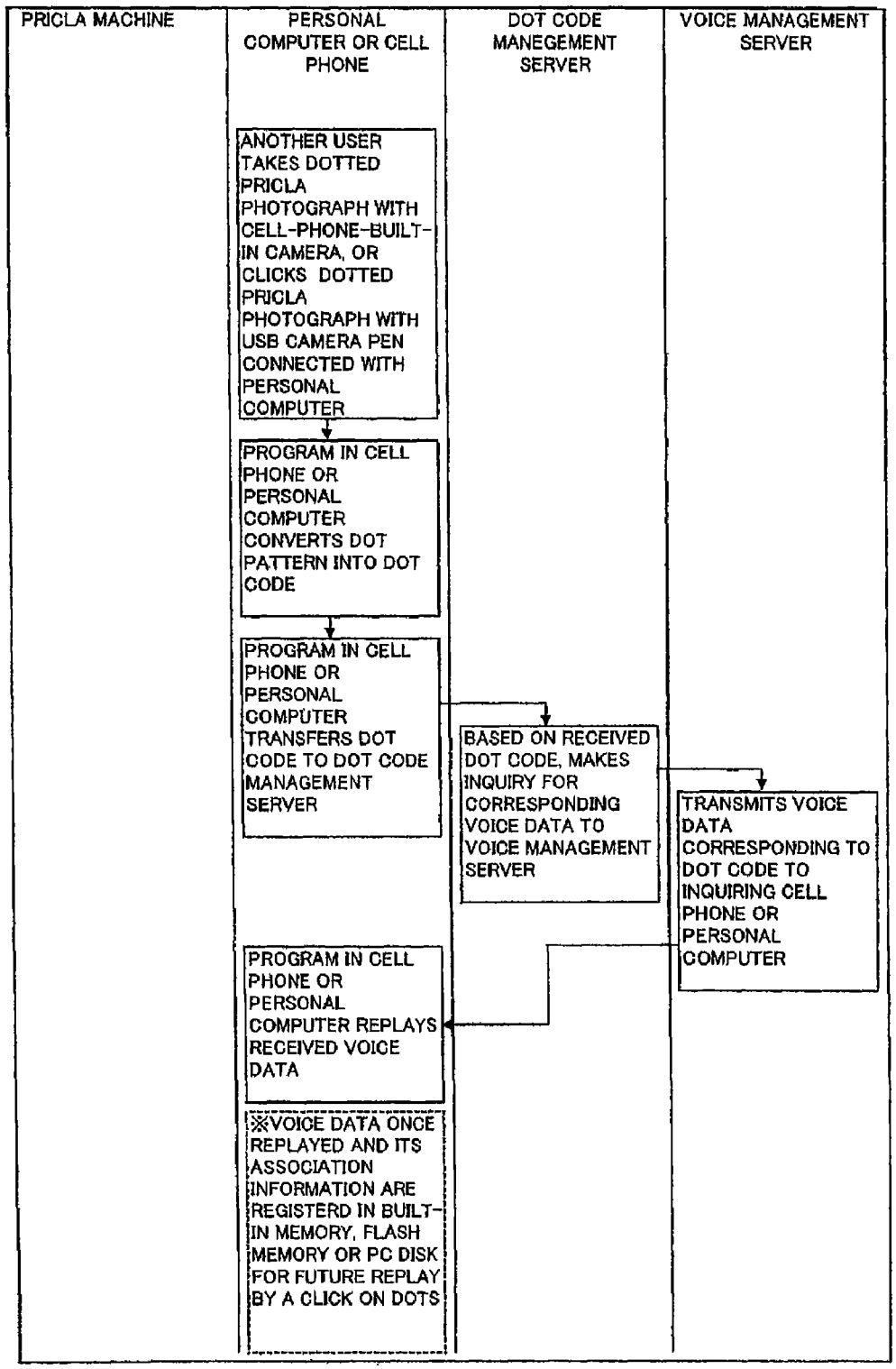
FIG. 40 is a flow diagram #7 showing the processing procedure according to the specific embodiment (9).
Figure 41:
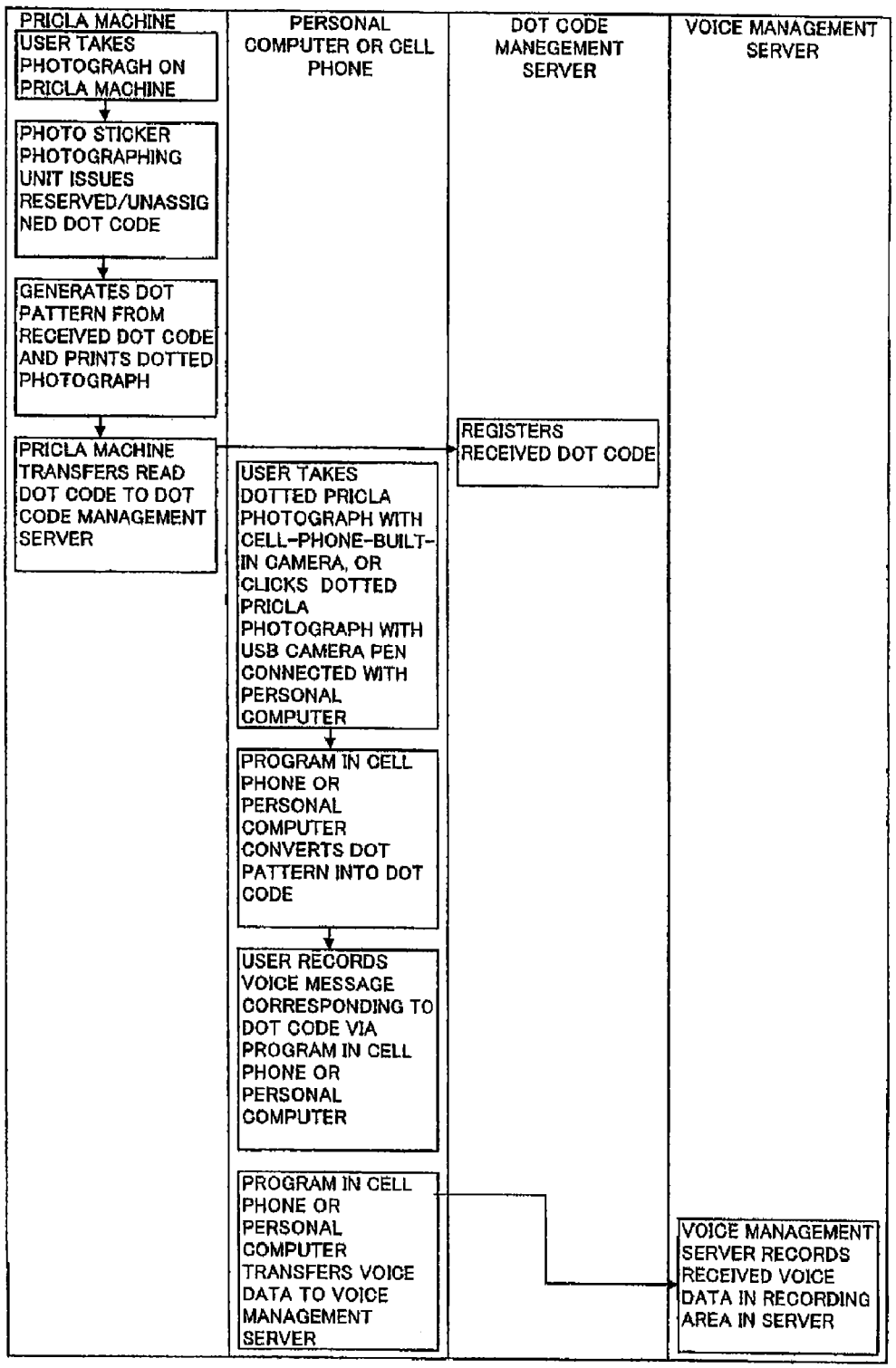
FIG. 41 is a flow diagram #8 showing the processing procedure according to the specific embodiment (9).
Figure 42:
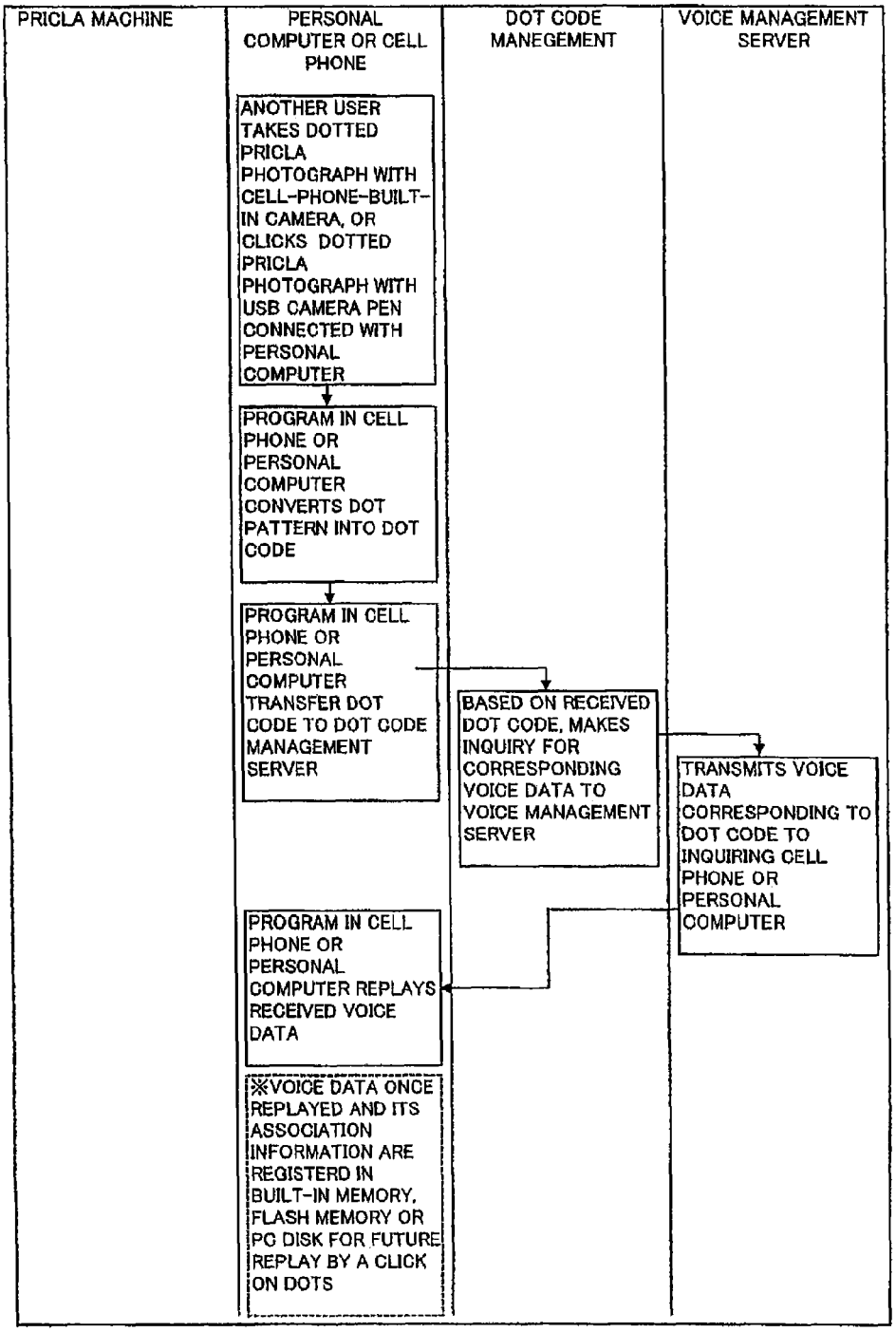
FIG. 42 is a flow diagram #9 showing the processing procedure according to the specific embodiment (9).
Figure 43:
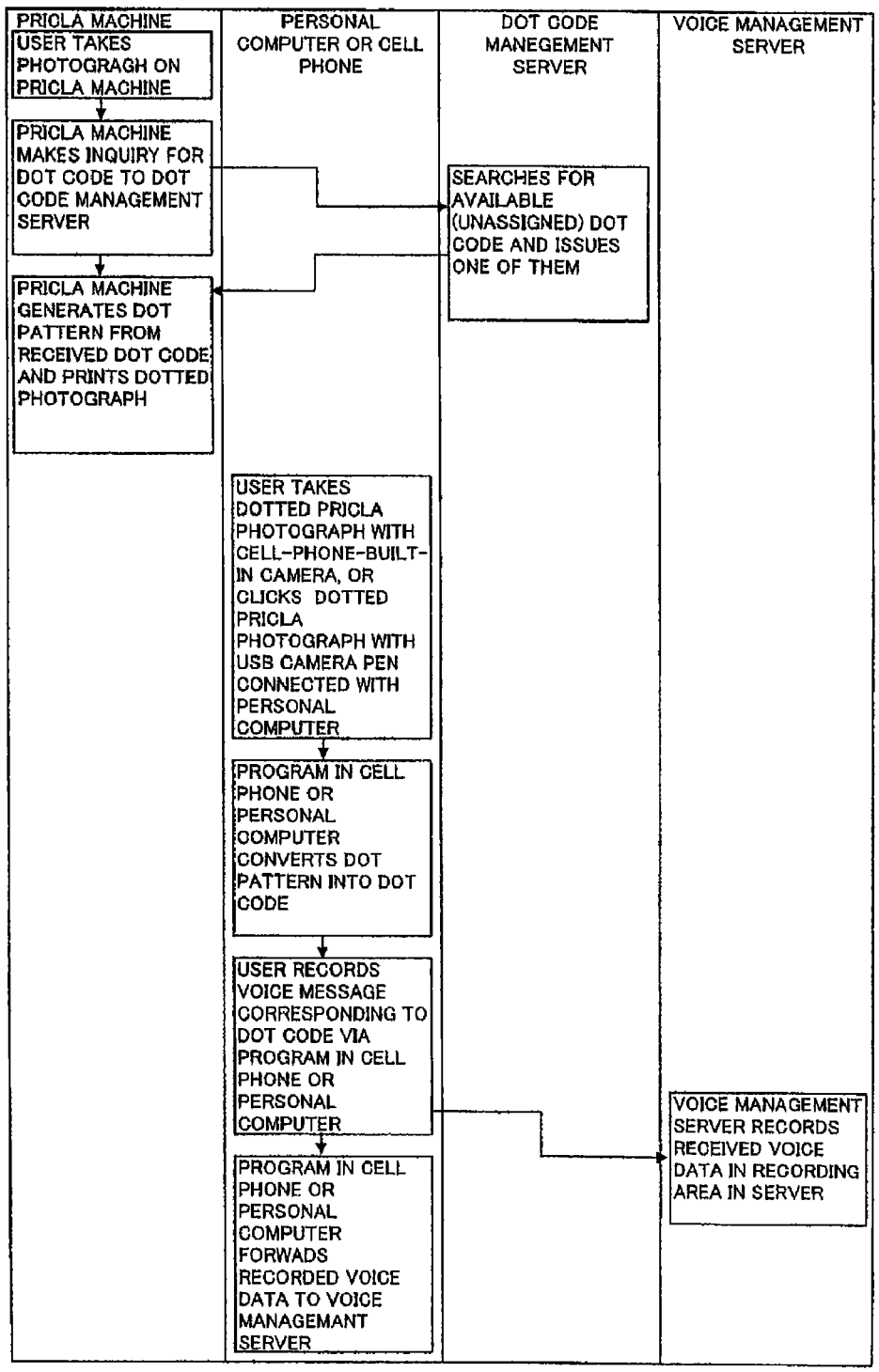
FIG. 43 is a flow diagram #10 showing the processing procedure according to the specific embodiment (9).
Figure 44:
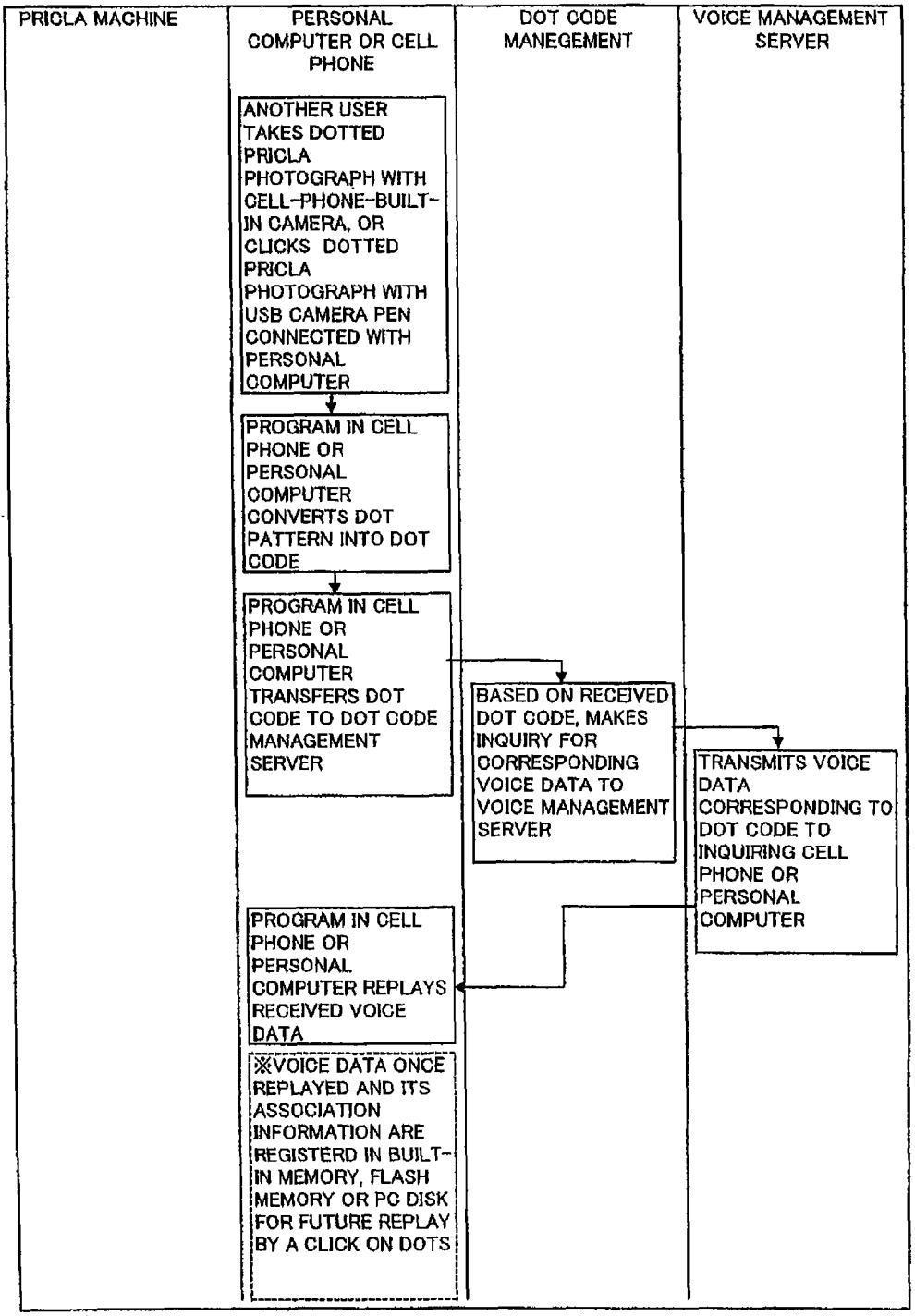
FIG. 44 is a flow diagram #11 showing the processing procedure according to the specific embodiment (9).
Figure 45:
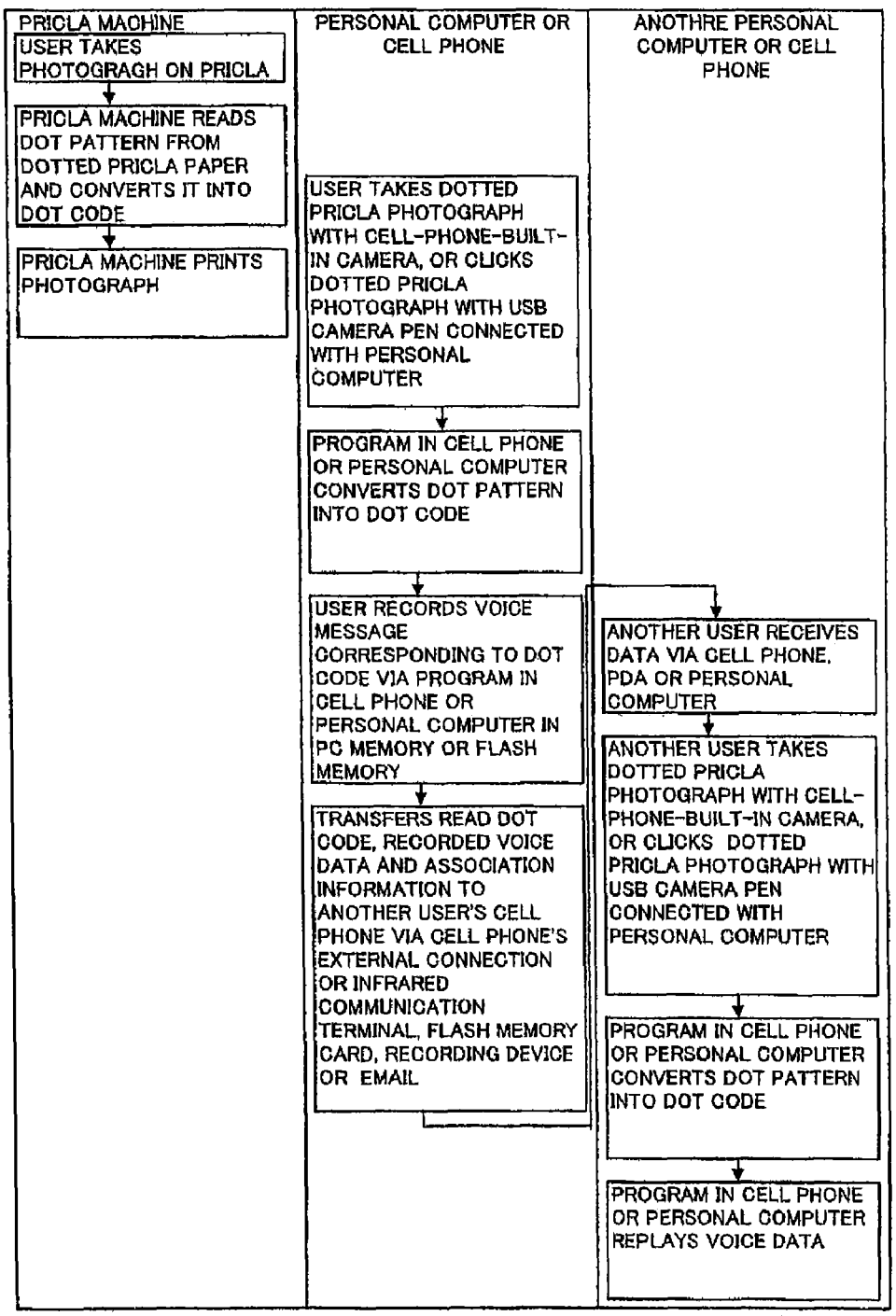
FIG. 45 is a flow diagram #12 showing the processing procedure according to the specific embodiment (9).
Figure 46:
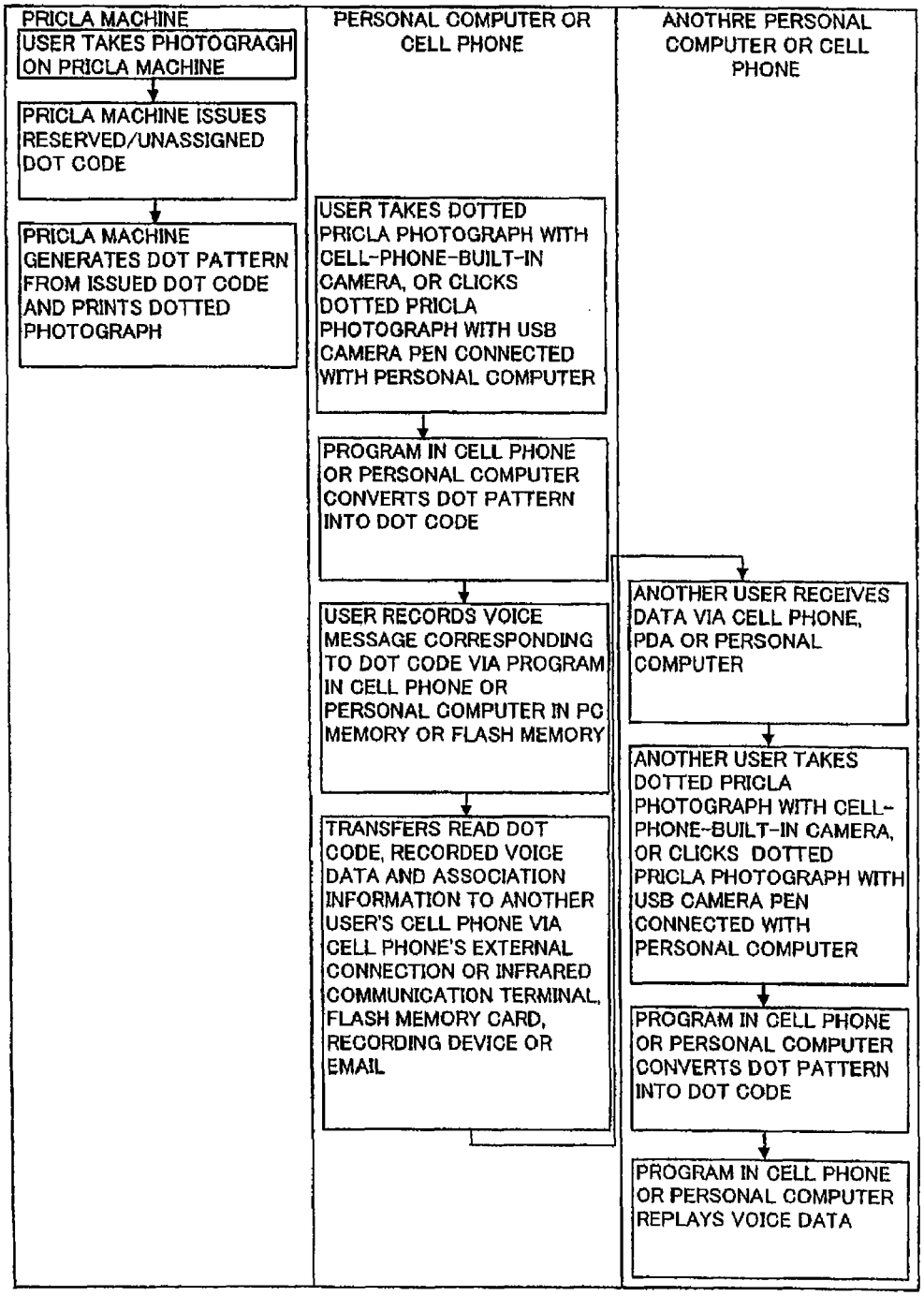
FIG. 46 is a flow diagram #13 showing the processing procedure according to the specific embodiment (9).
Figure 47:
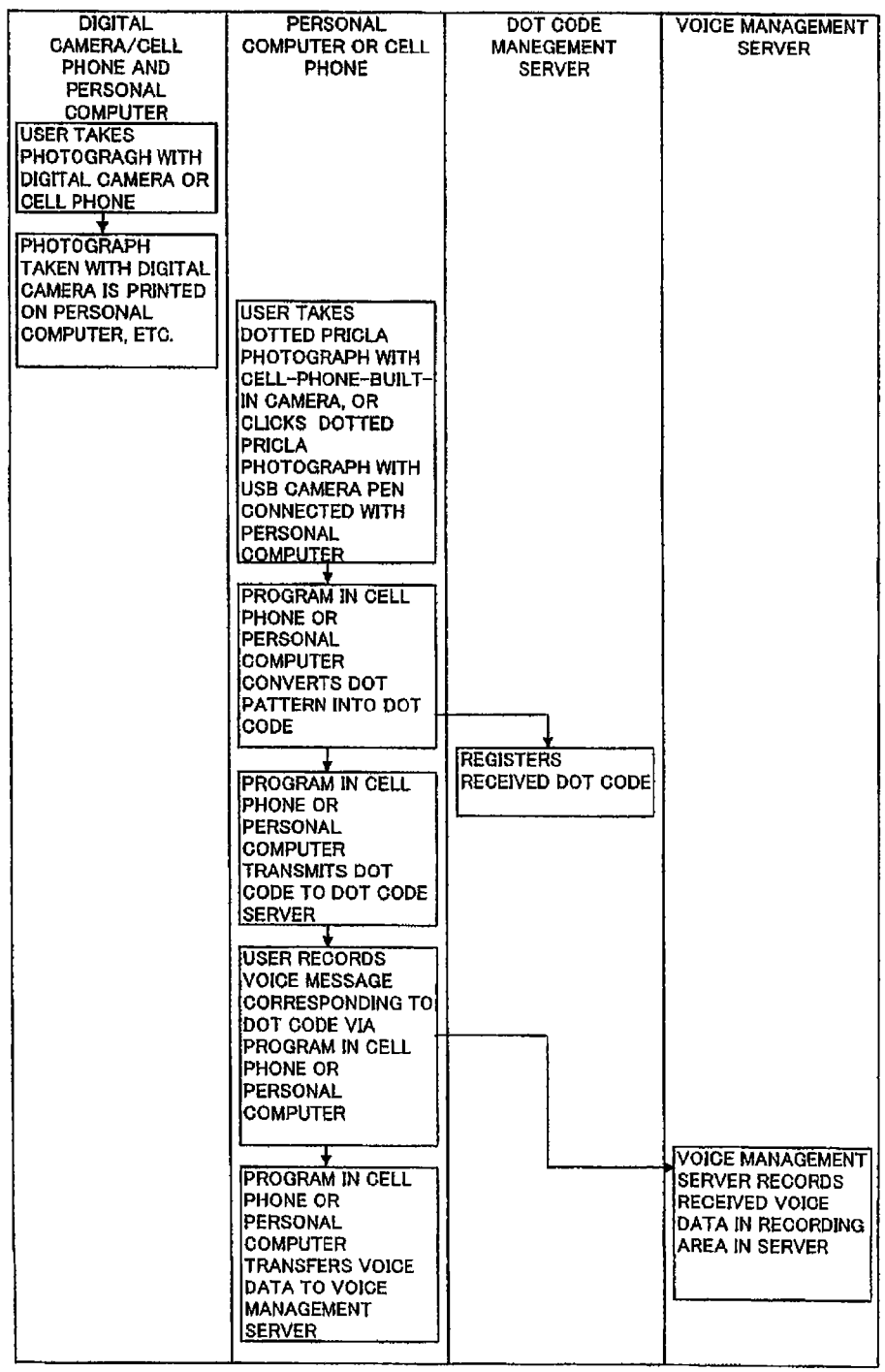
FIG. 47 is a flow diagram #14 showing the processing procedure according to the specific embodiment (9).
Figure 48:
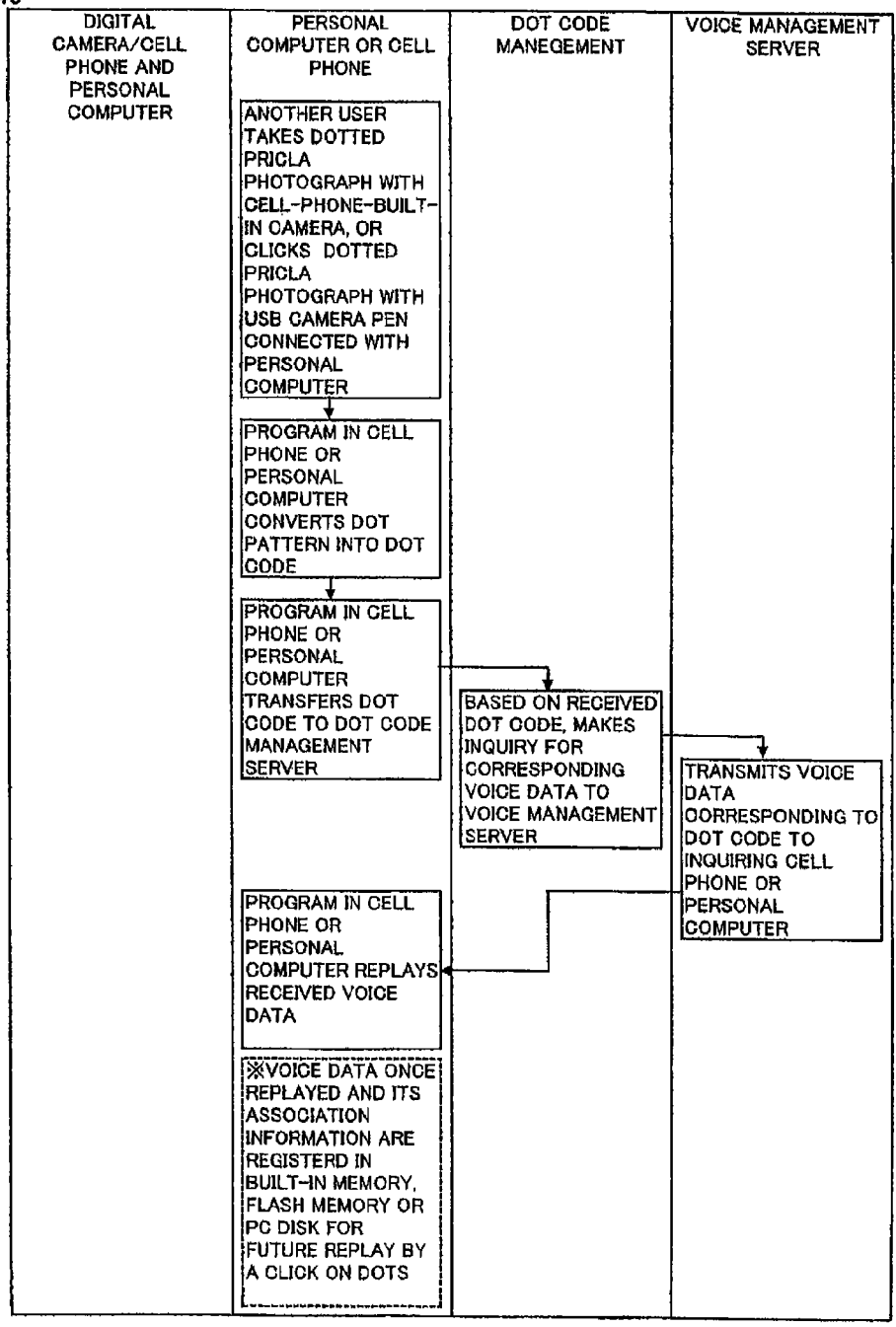
FIG. 48 is a flow diagram #15 showing the processing procedure according to the specific embodiment (9).
Figure 49:
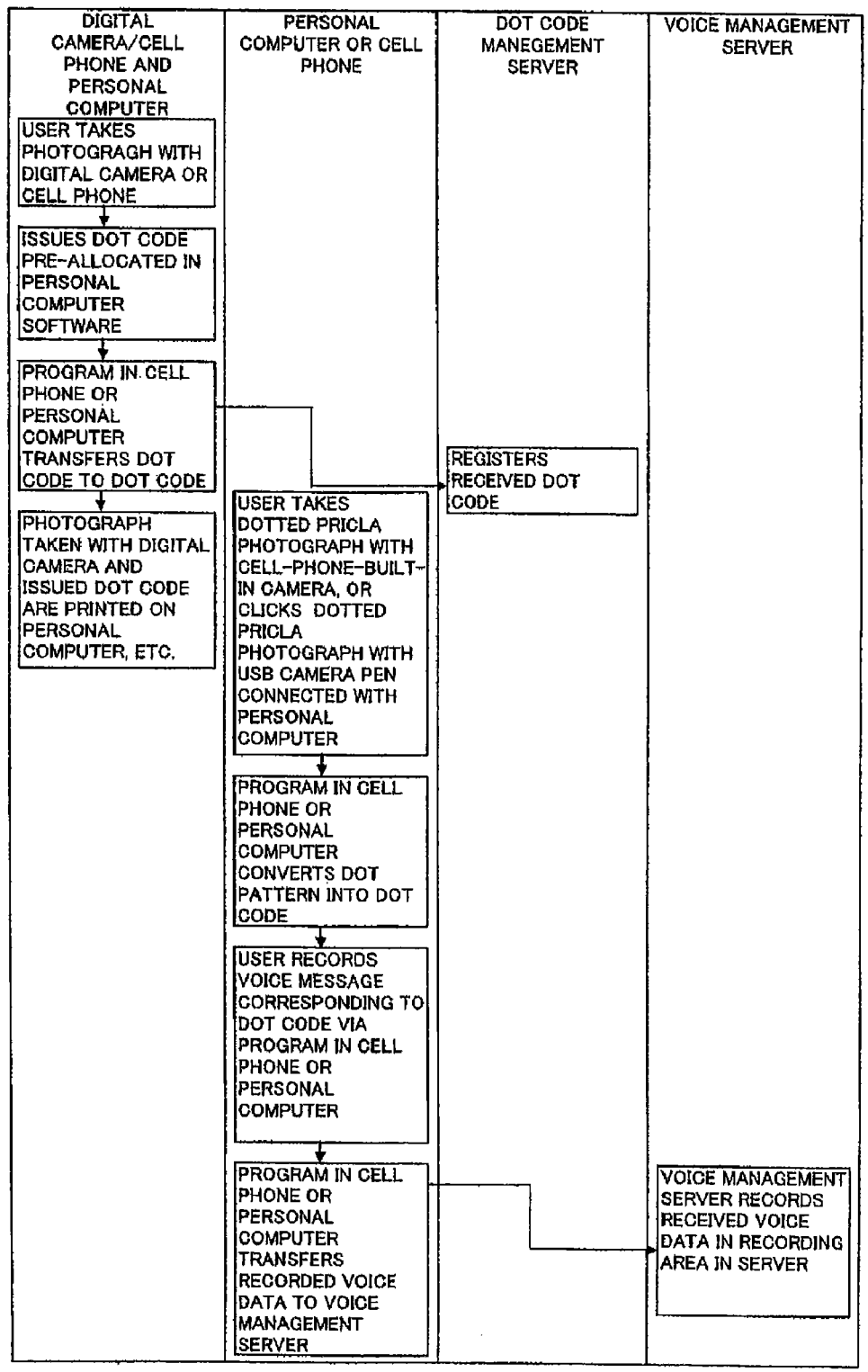
FIG. 49 is a flow diagram #16 showing the processing procedure according to the specific embodiment (9).
Figure 50:
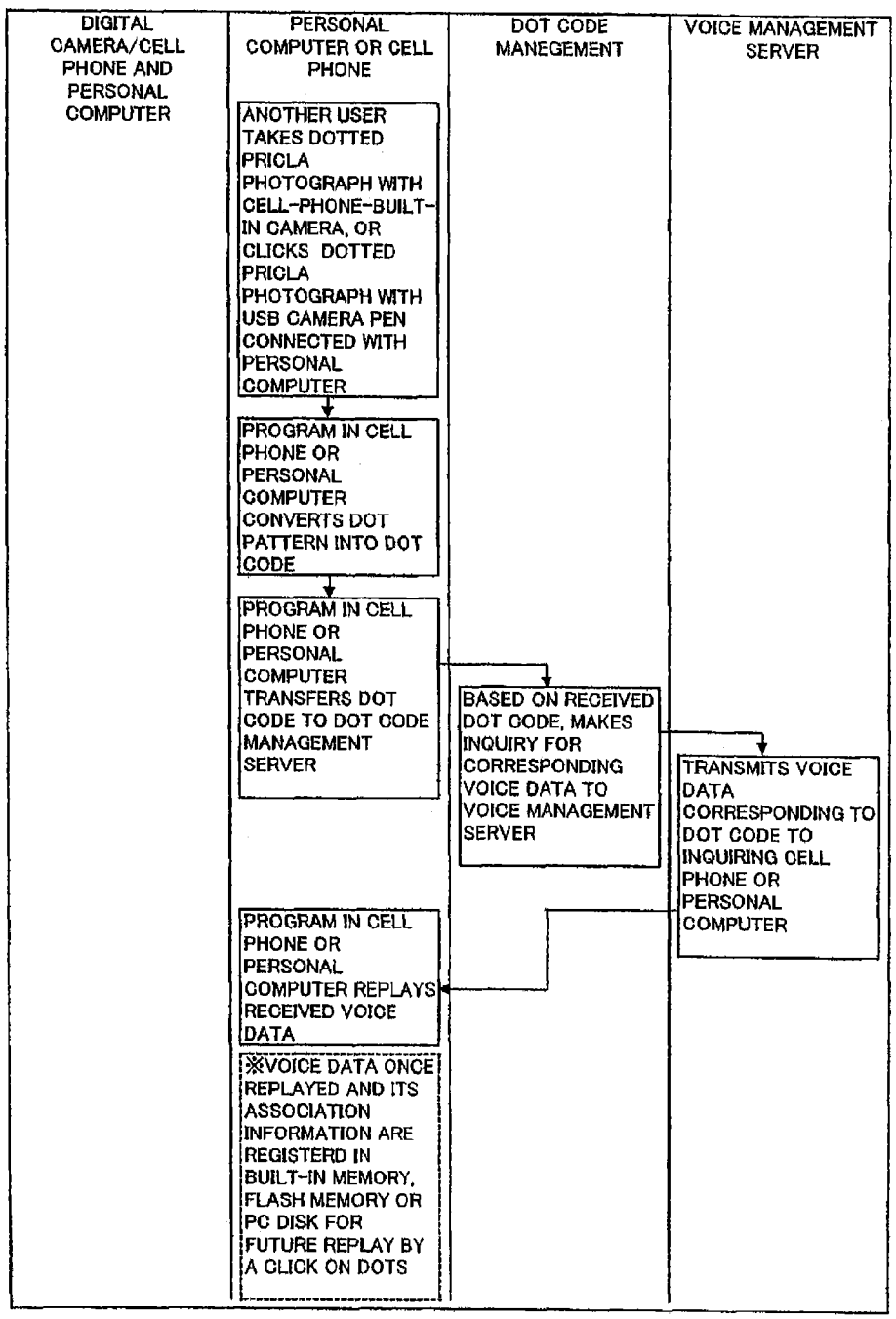
FIG. 50 is a flow diagram #17 showing the processing procedure according to the specific embodiment (9).
Figure 51:
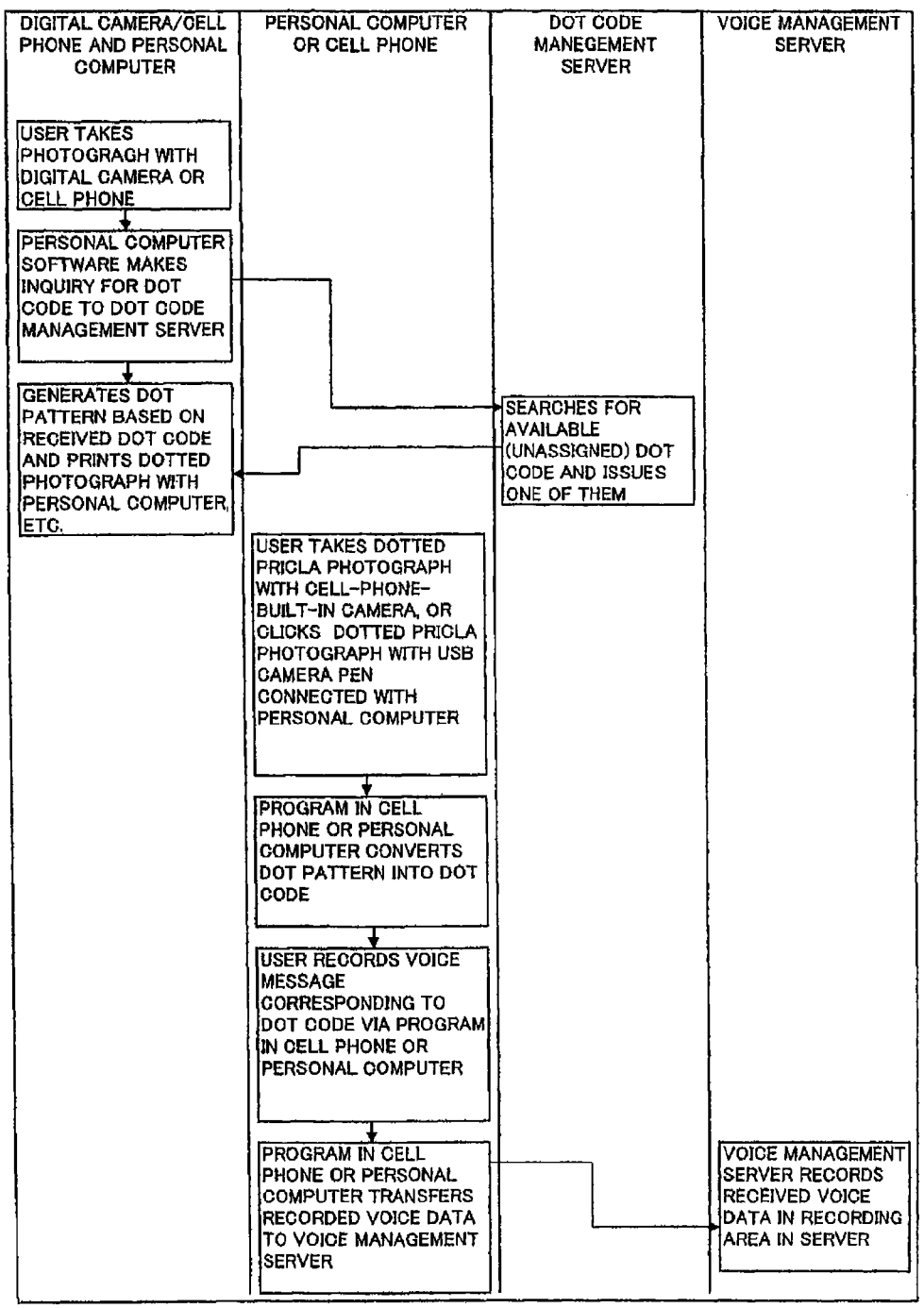
FIG. 51 is a flow diagram #18 showing the processing procedure according to the specific embodiment (9).
Figure 52:
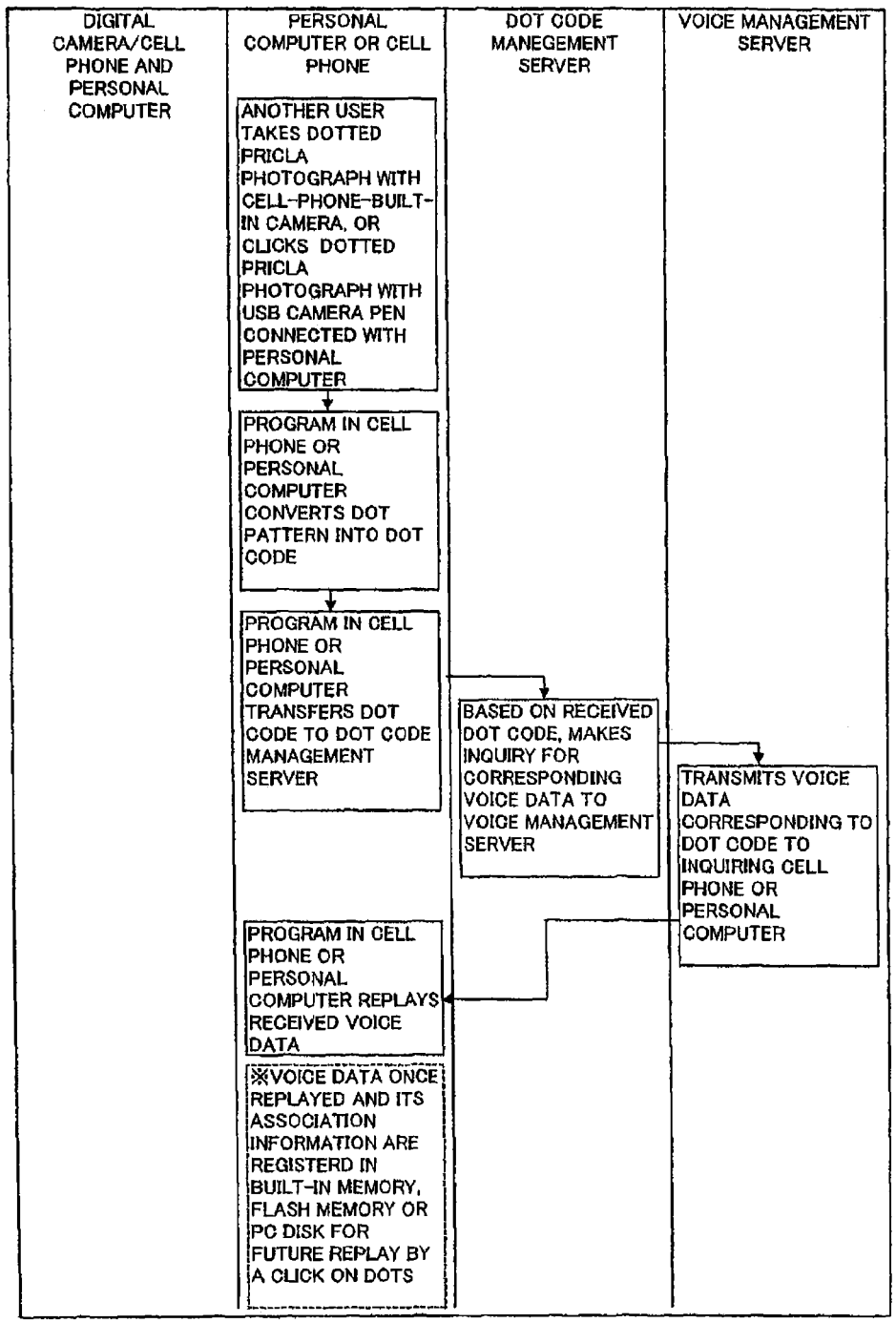
FIG. 52 is a flow diagram #19 showing the processing procedure according to the specific embodiment (9).
Figure 53:
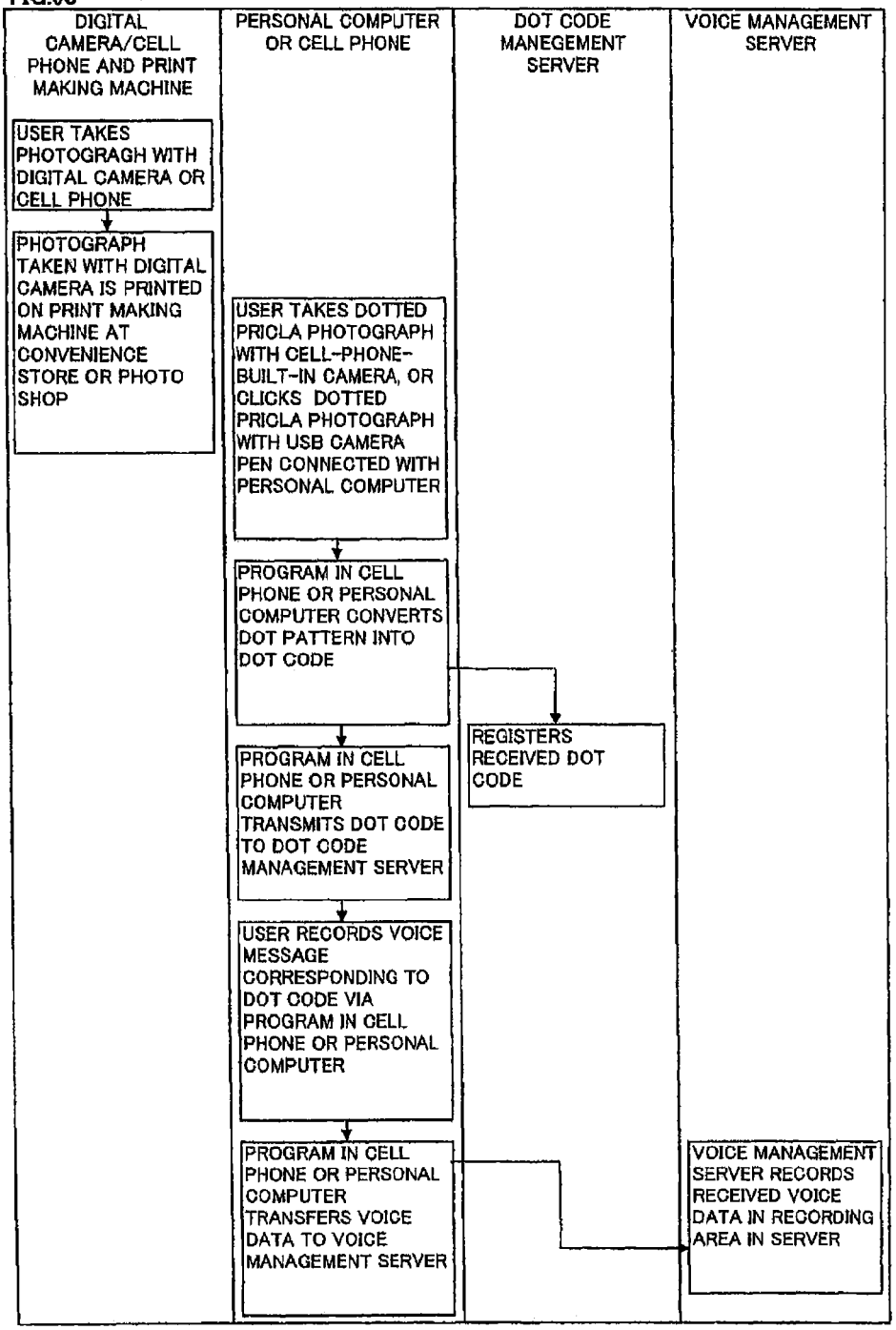
FIG. 53 is a flow diagram #20 showing the processing procedure according to the specific embodiment (9).
Figure 54:
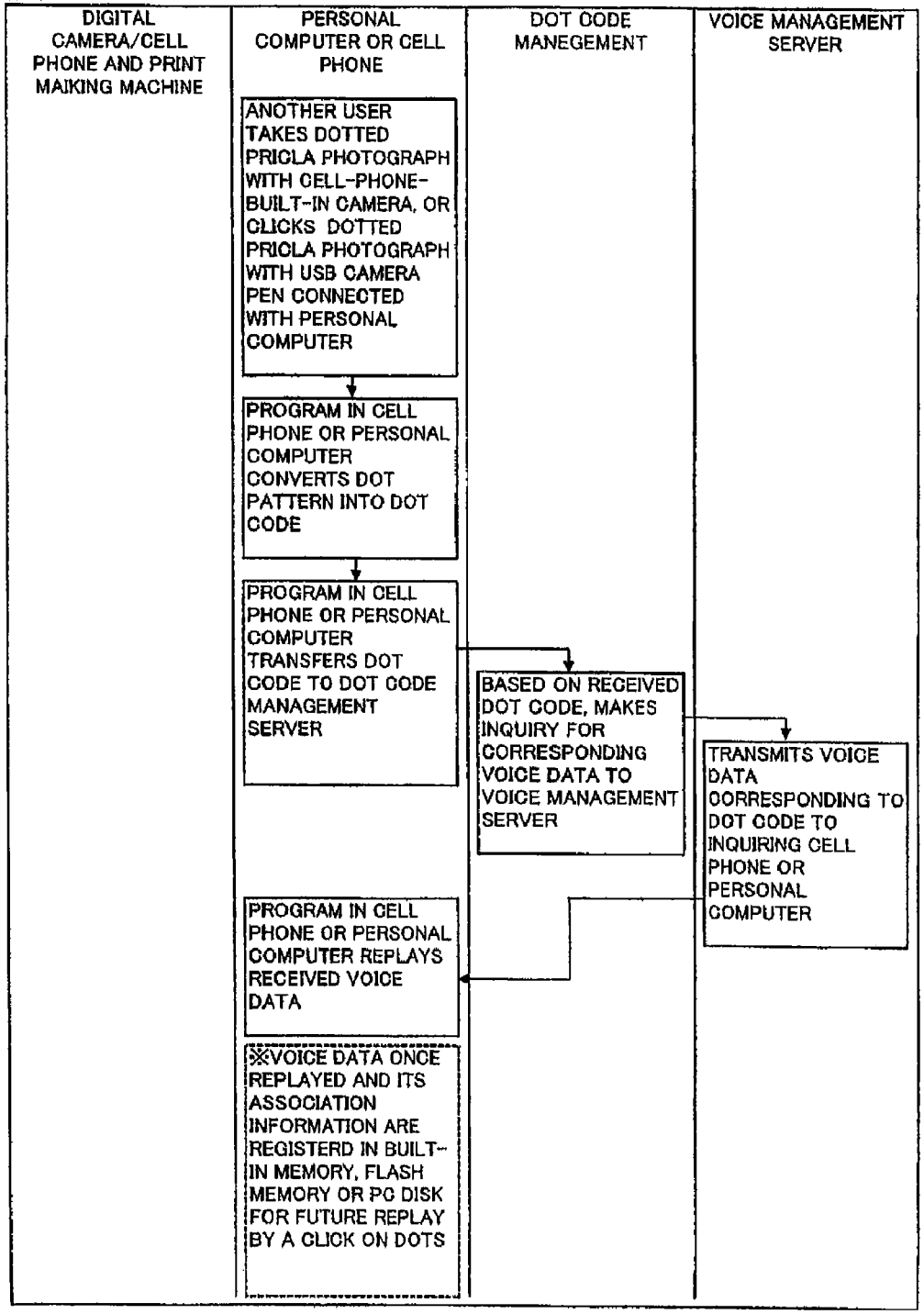
FIG. 54 is a flow diagram #21 showing the processing procedure according to the specific embodiment (9).
Figure 55:
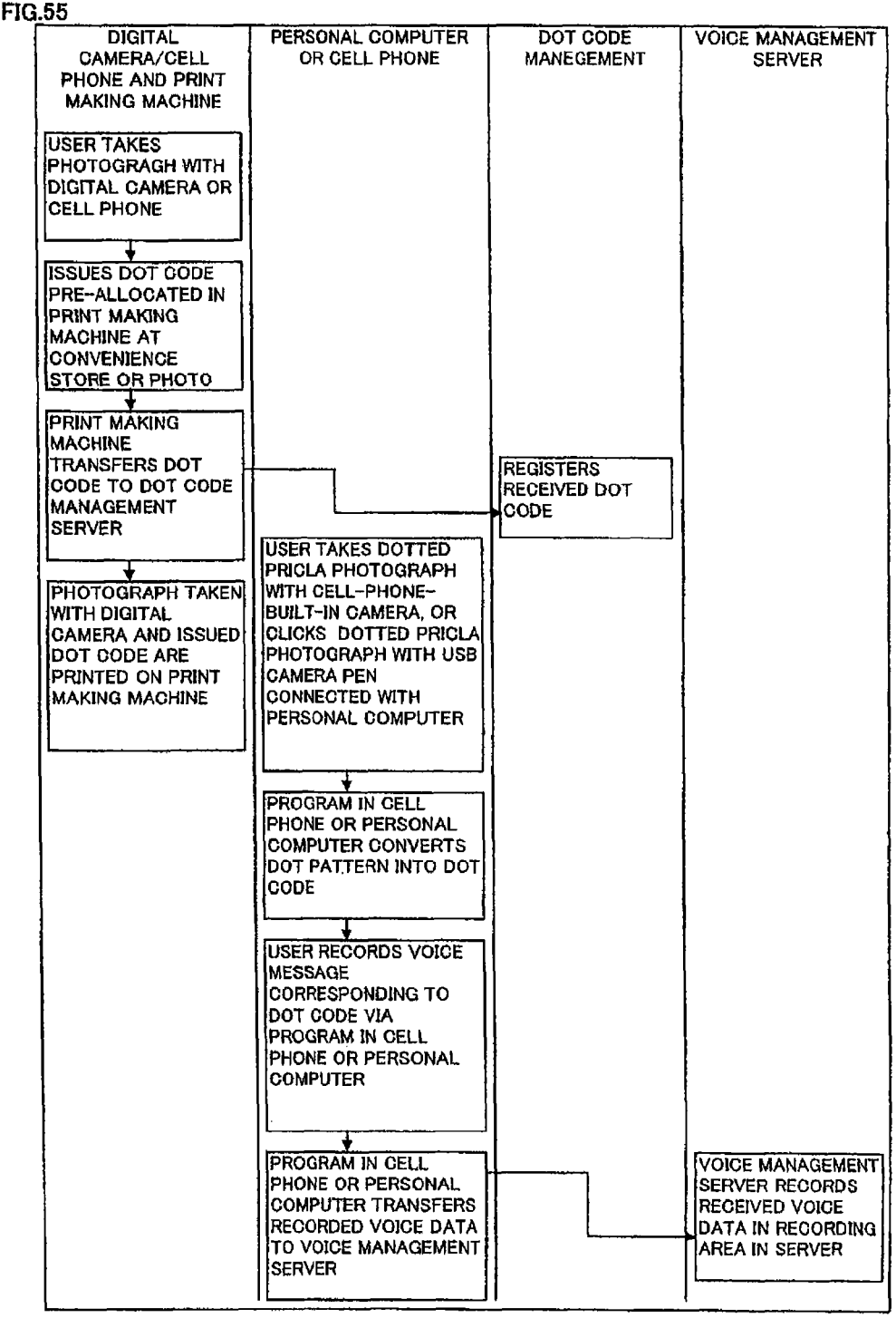
FIG. 55 is a flow diagram #22 showing the processing procedure according to the specific embodiment (9).
Figure 56:
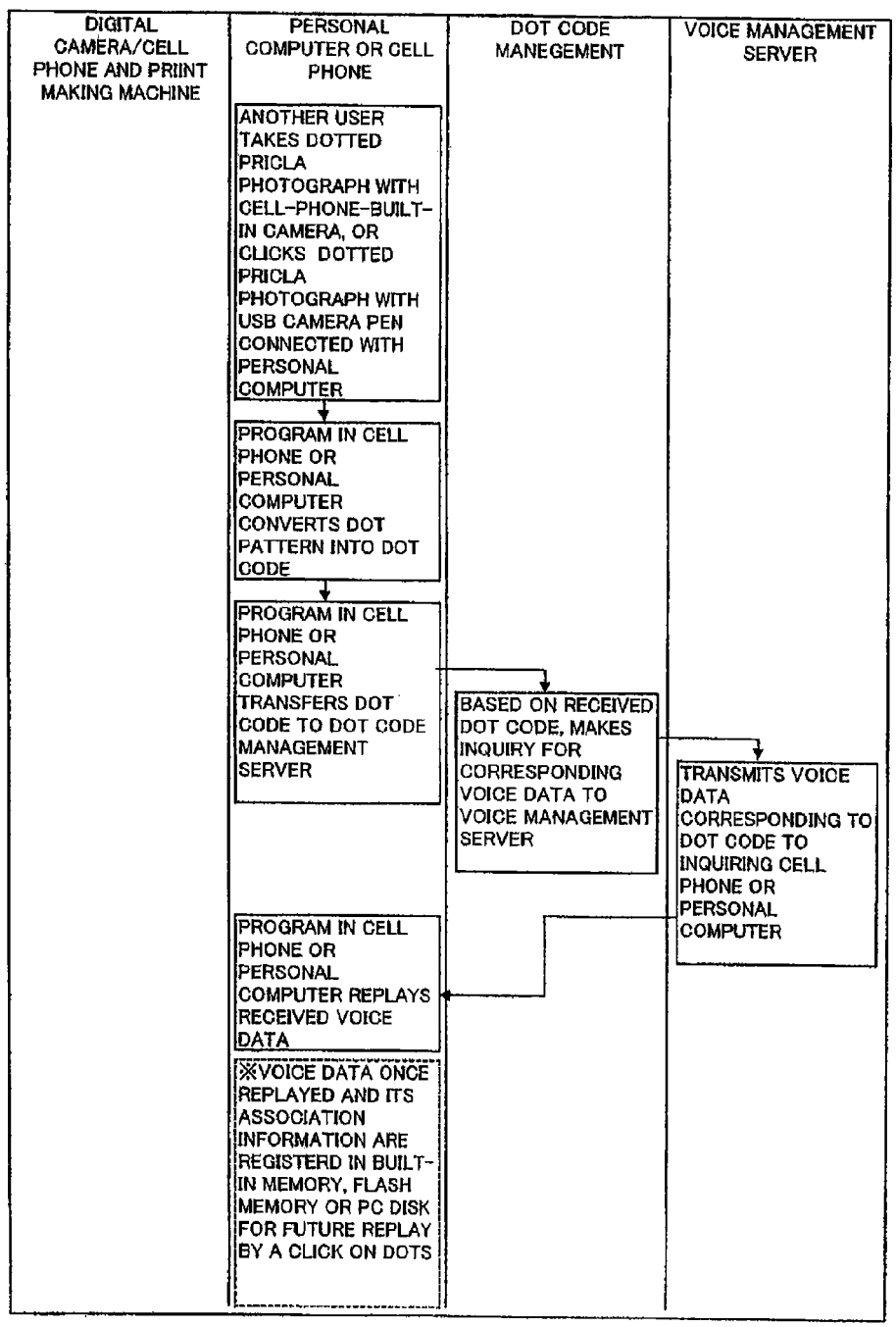
FIG. 56 is a flow diagram #23 showing the processing procedure according to the specific embodiment (9).
Figure 57:
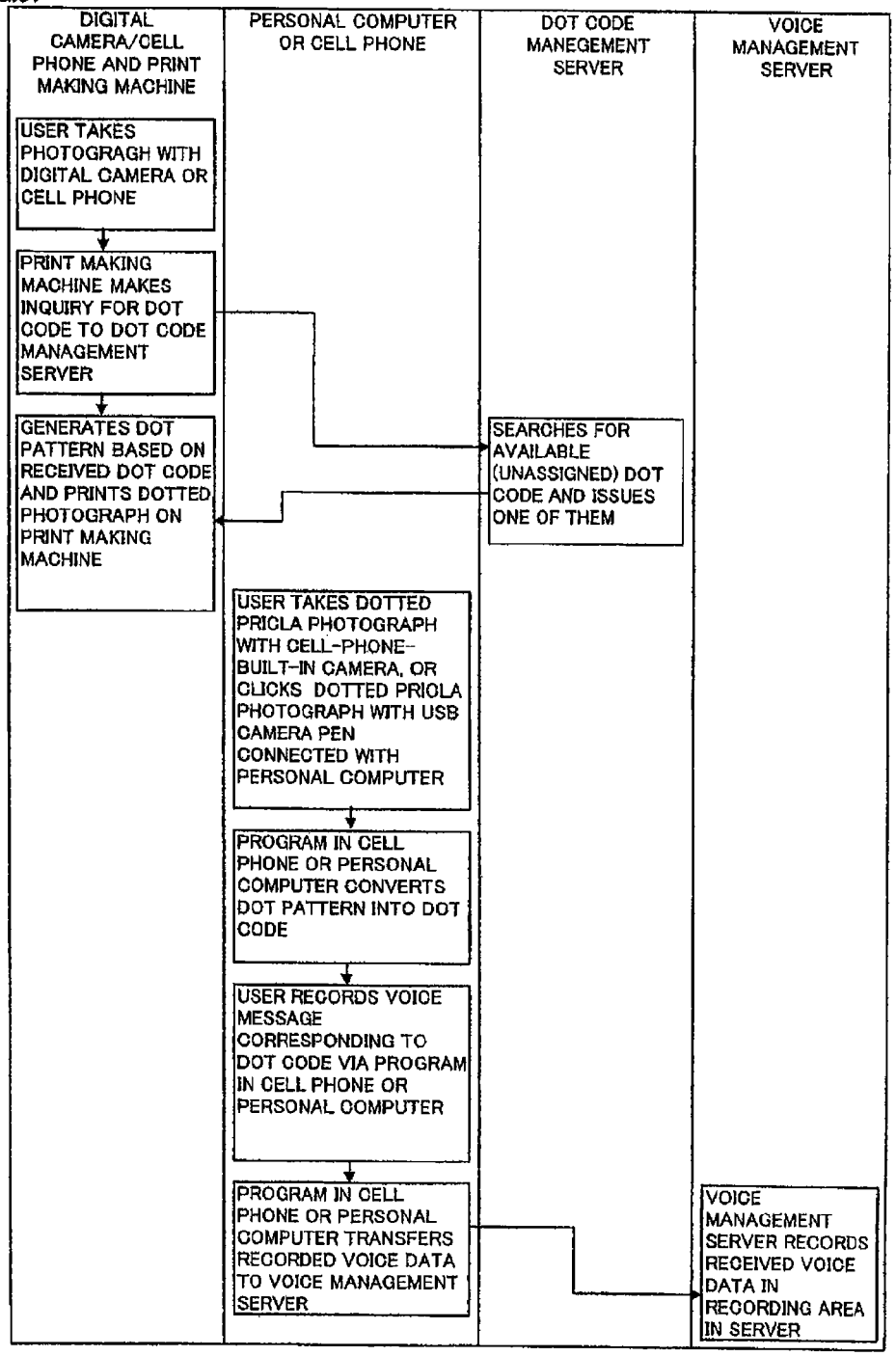
FIG. 57 is a flow diagram #24 showing the processing procedure according to the specific embodiment (9).
Figure 58:
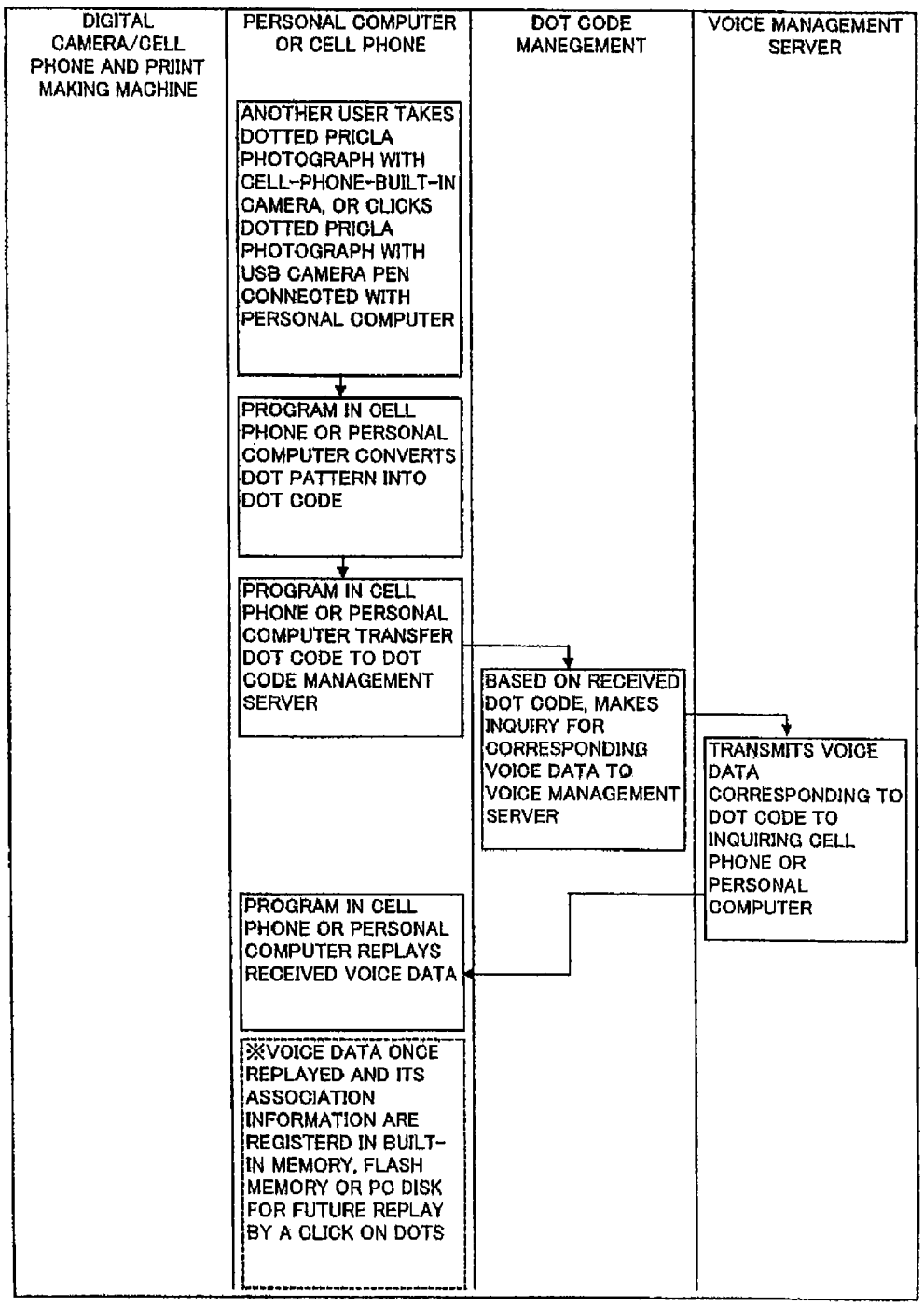
FIG. 58 is a flow diagram #25 showing the processing procedure according to the specific embodiment (9).
Figure 59:
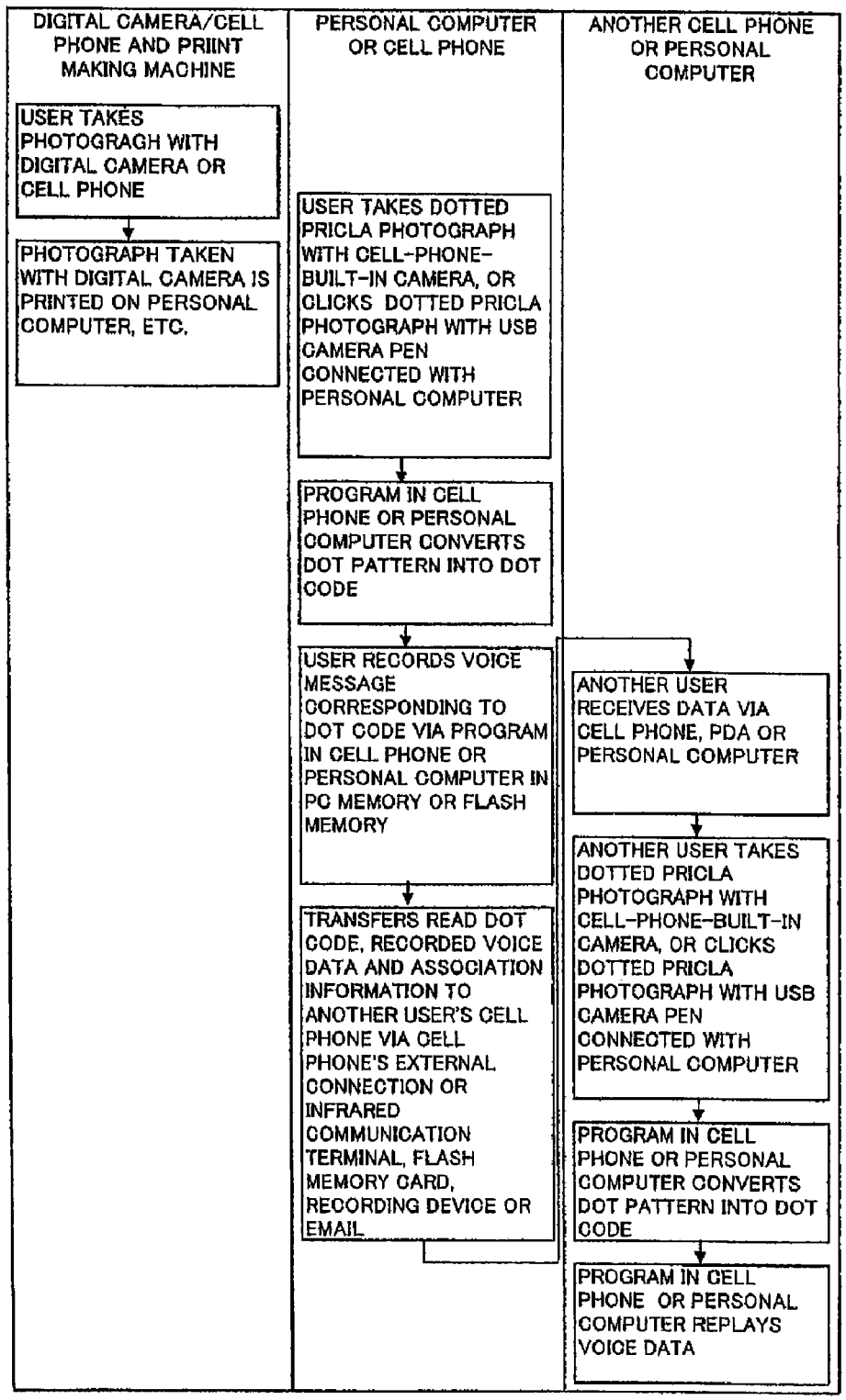
FIG. 59 is a flow diagram #26 showing the processing procedure according to the specific embodiment (9).
Figure 60:
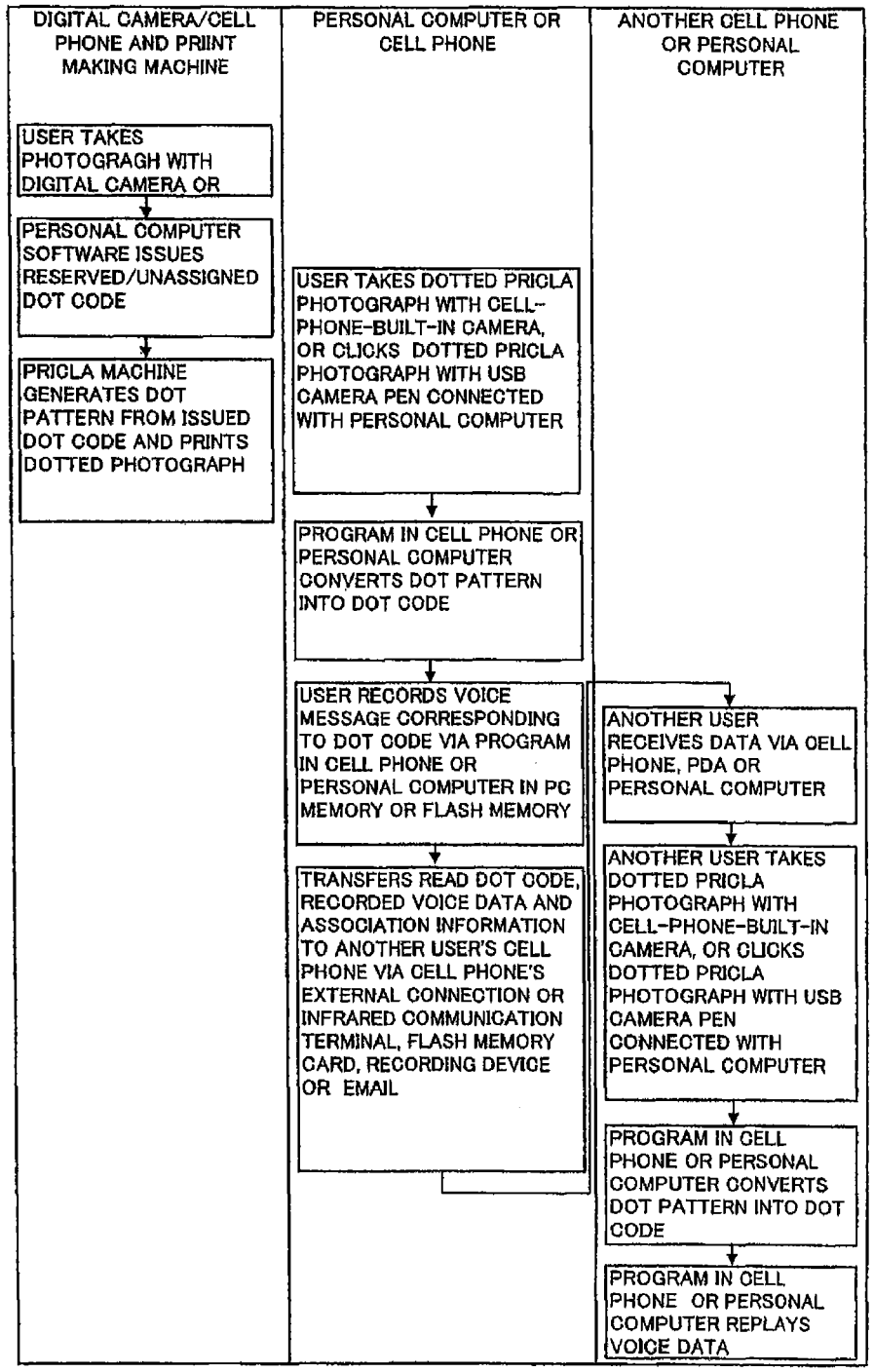
FIG. 60 is a flow diagram #27 showing the processing procedure according to the specific embodiment (9).
Figure 61:
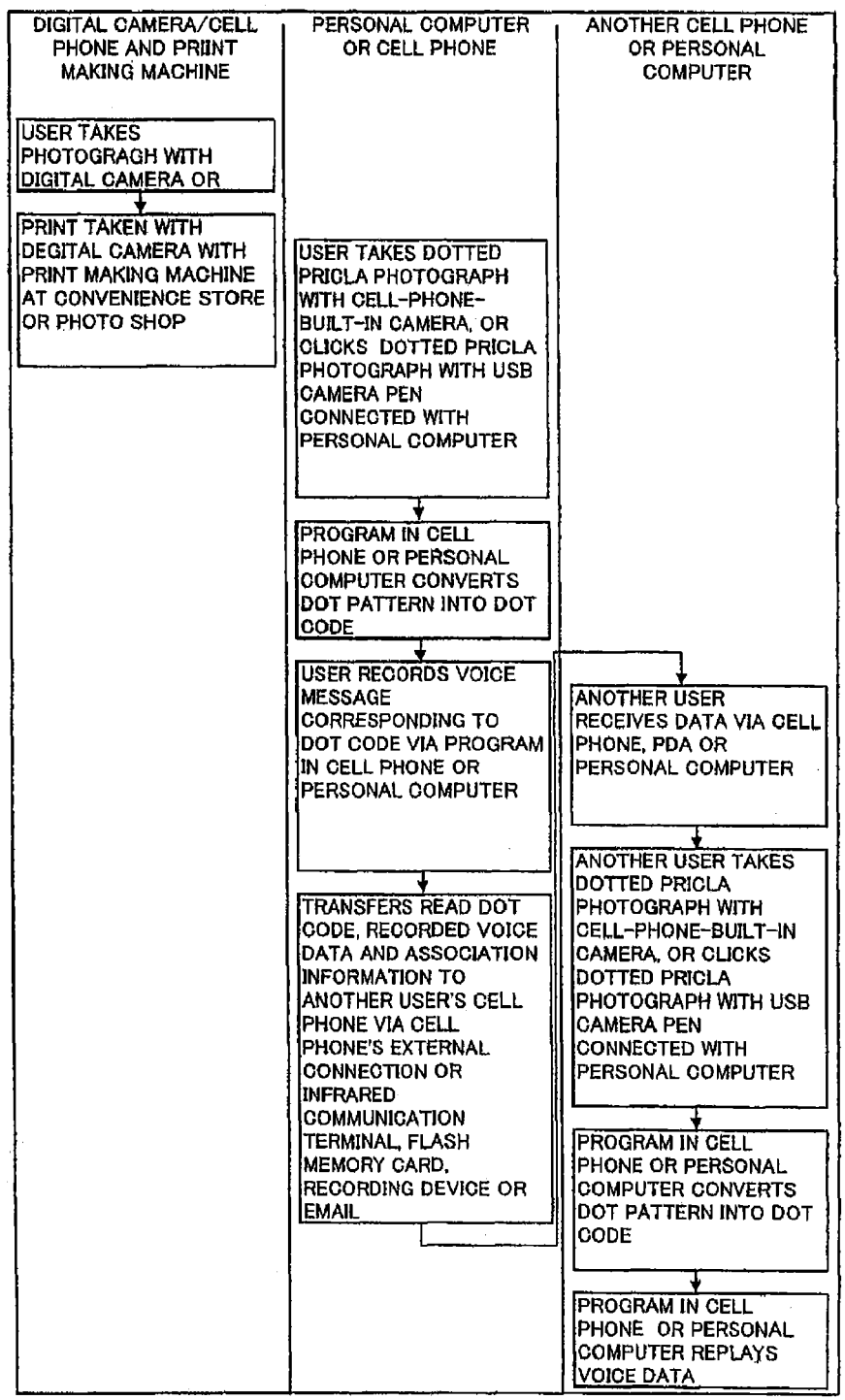
FIG. 61 is a flow diagram #28 showing the processing procedure according to the specific embodiment (9).
Figure 62:
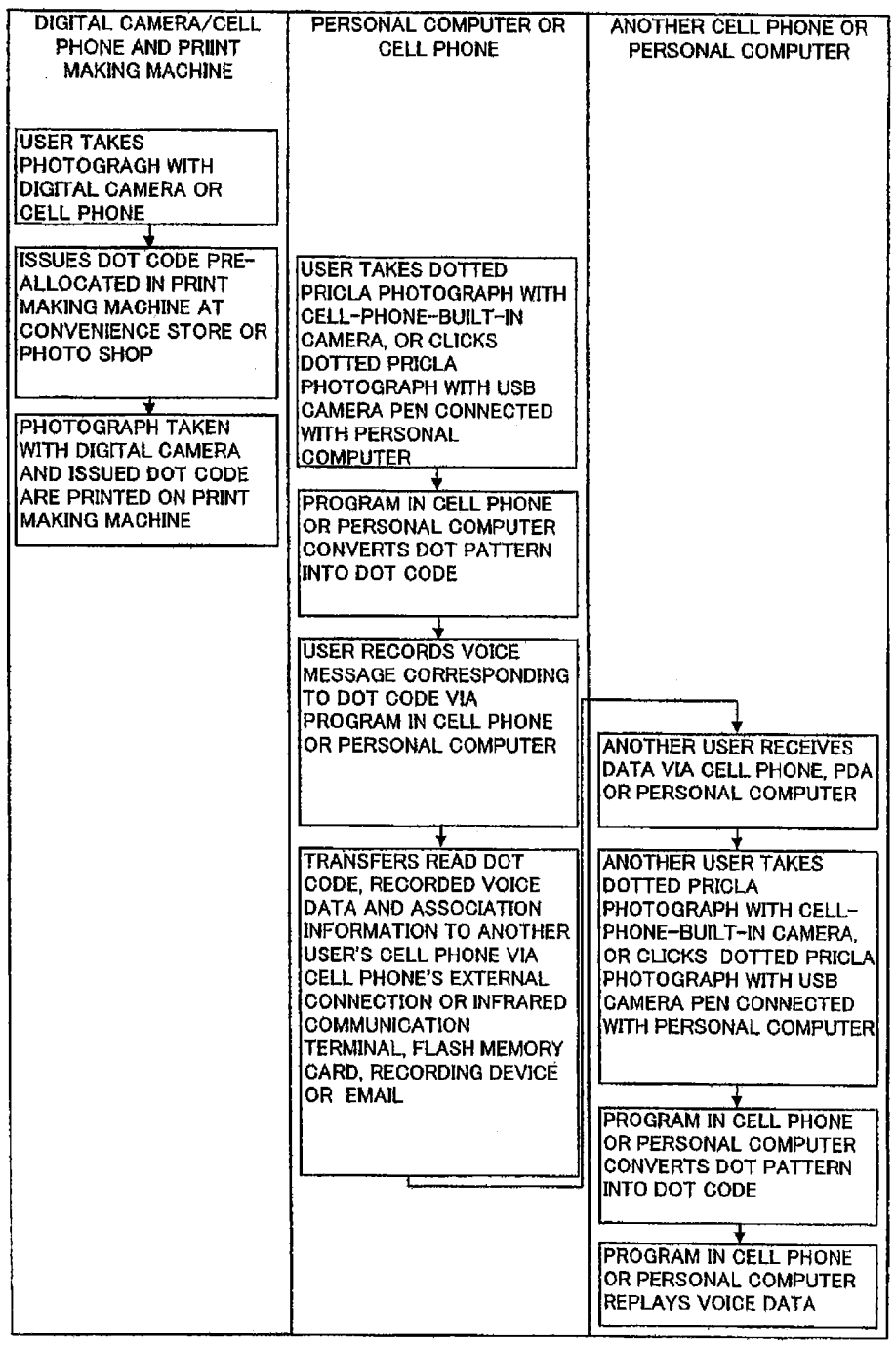
FIG. 62 is a flow diagram showing the processing procedure according to the specific embodiment (9).
Figure 67:
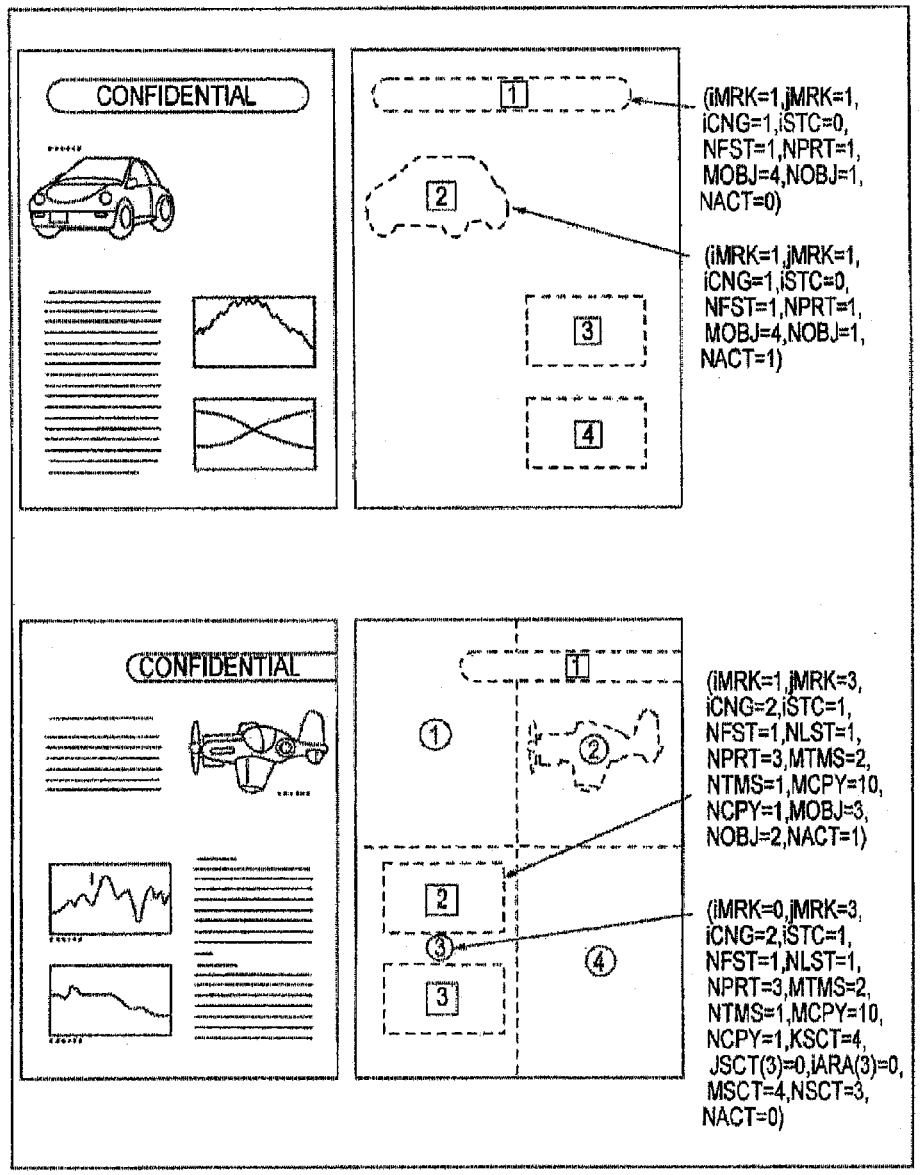
FIG. 67 is a diagram #1 showing how dot patterns are disposed on a printed face according to the specific embodiment (10).
Figure 68:
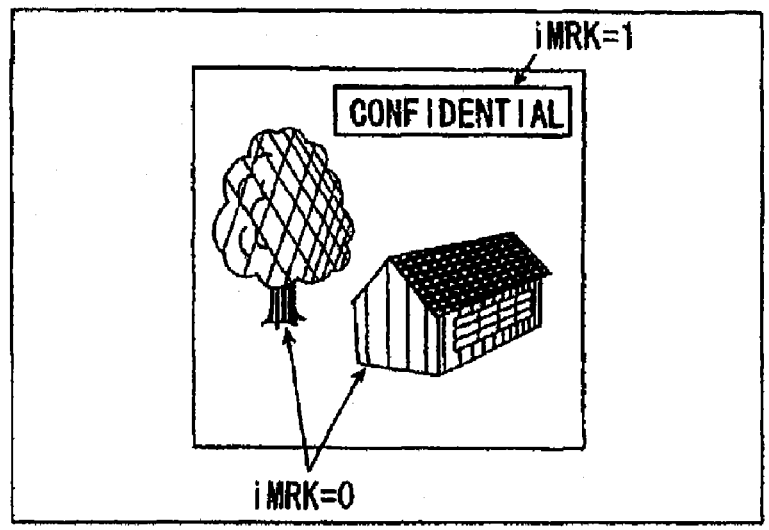
FIG. 68 is a diagram #2 showing how dot patterns are disposed on a printed face according to the specific embodiment (10).
Figure 69:
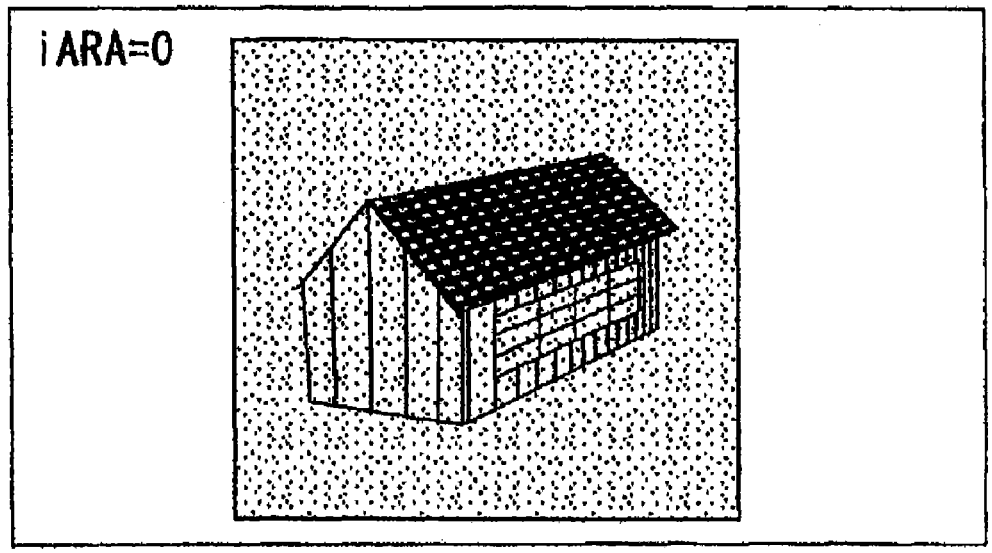
FIG. 69 is a diagram #3 showing how dot patterns are disposed on a printed face according to the specific embodiment (10).
Figure 70:
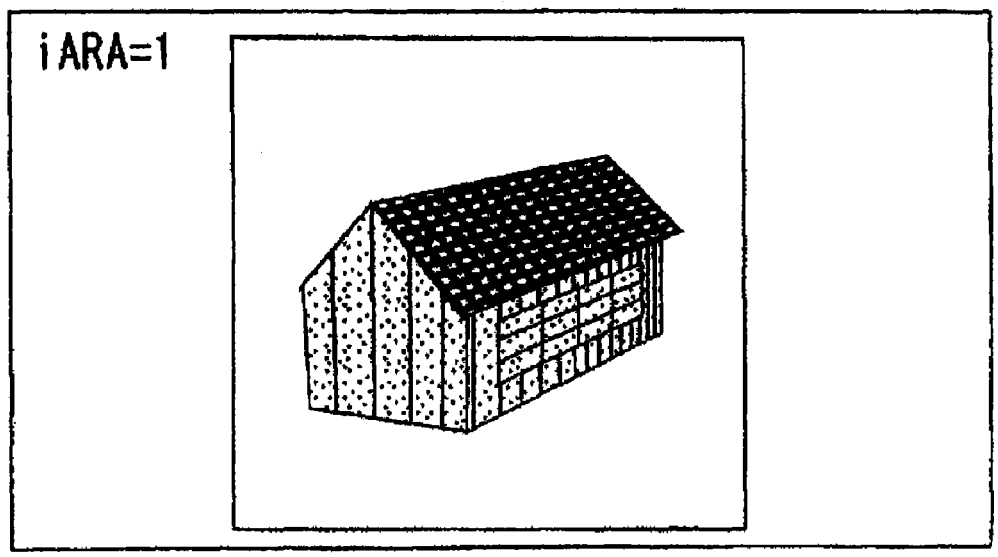
FIG. 70 is a diagram #4 showing how dot patterns are disposed on a printed face according to the specific embodiment (10).
Figure 71:
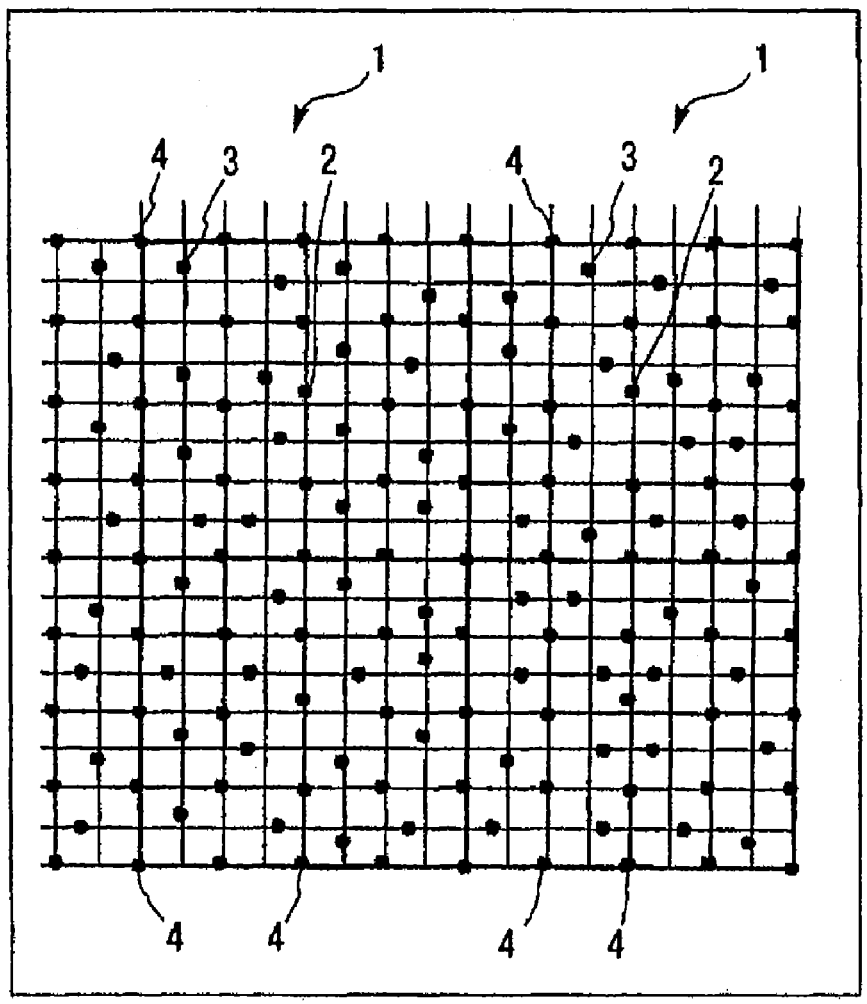
FIG. 71 is a drawing showing an example dot pattern (GRID-1) used in the present embodiment.
Figure 72:
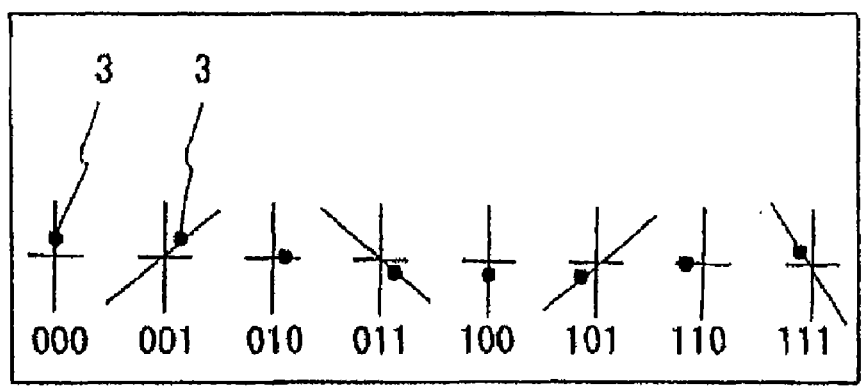
FIG. 72 is a diagram #1 showing the principle of the dot pattern (GRID-1).
Figure 73:
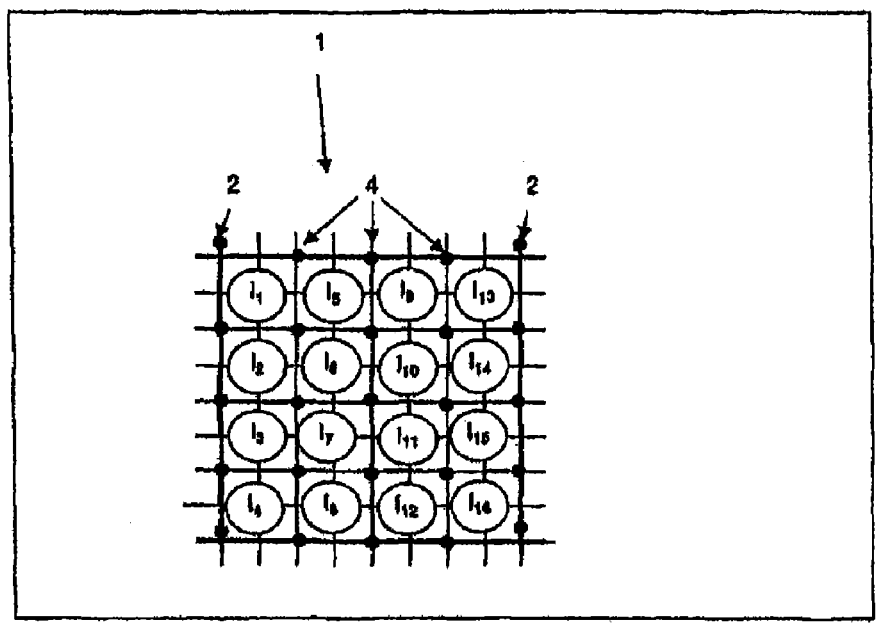
FIG. 73 is a diagram #2 showing the principle of the dot pattern (GRID-1).
Figure 74:
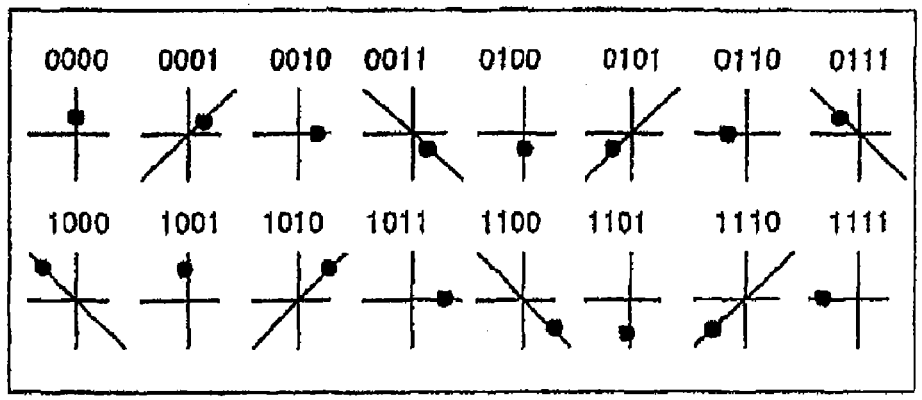
FIG. 74 is a diagram #3 showing the principle of the dot pattern (GRID-1).
Figure 75:
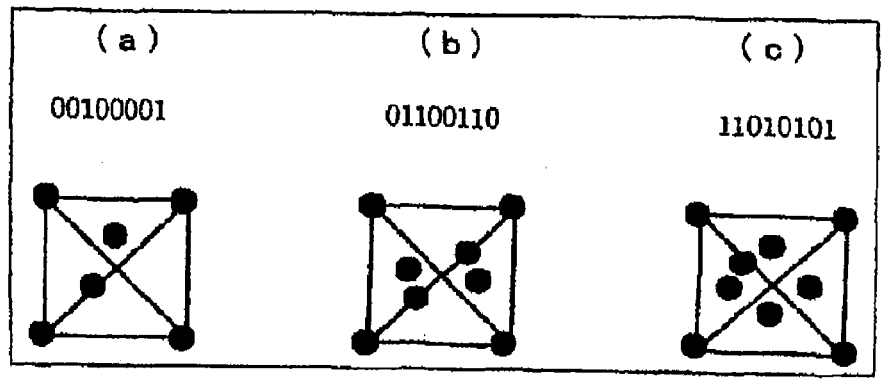
FIG. 75 is a diagram #4 showing the principle of the dot pattern (GRID-1).
Figure 77:
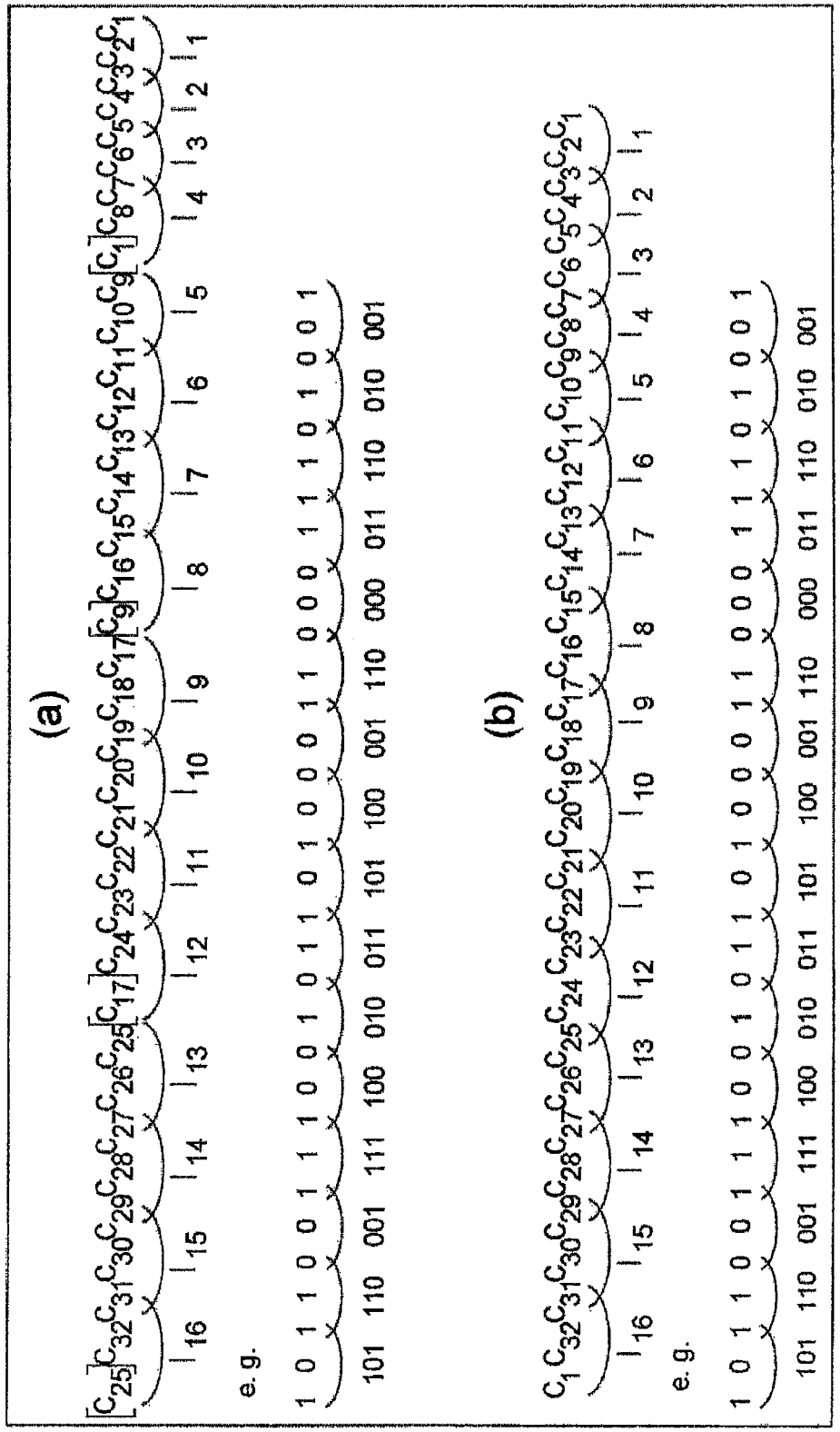
FIG. 77 is a diagram #6 showing the principle of the dot pattern (GRID-1).
Figure 78:
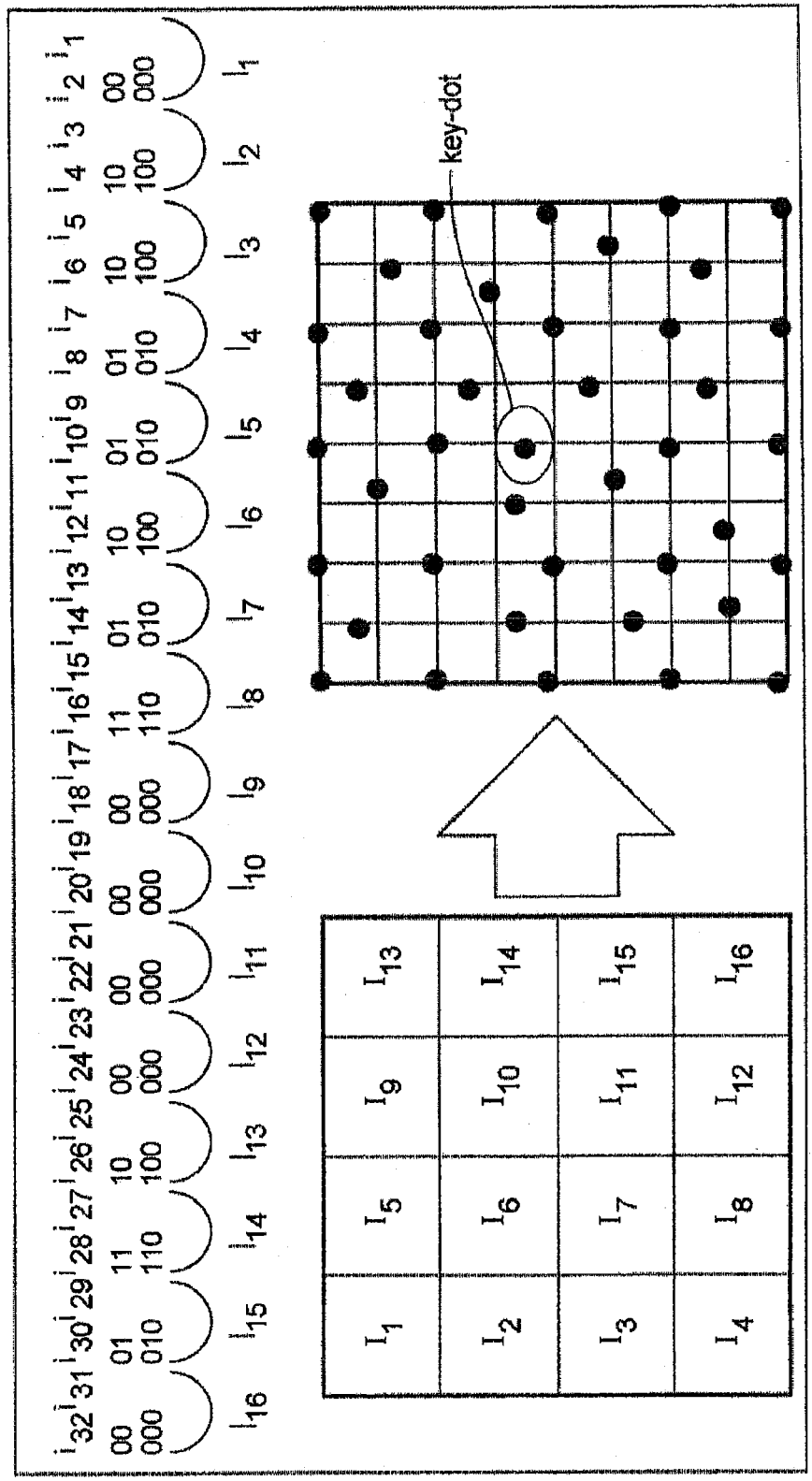
FIG. 78 is a diagram #7 showing the principle of the dot pattern (GRID-1).
Figure 79:
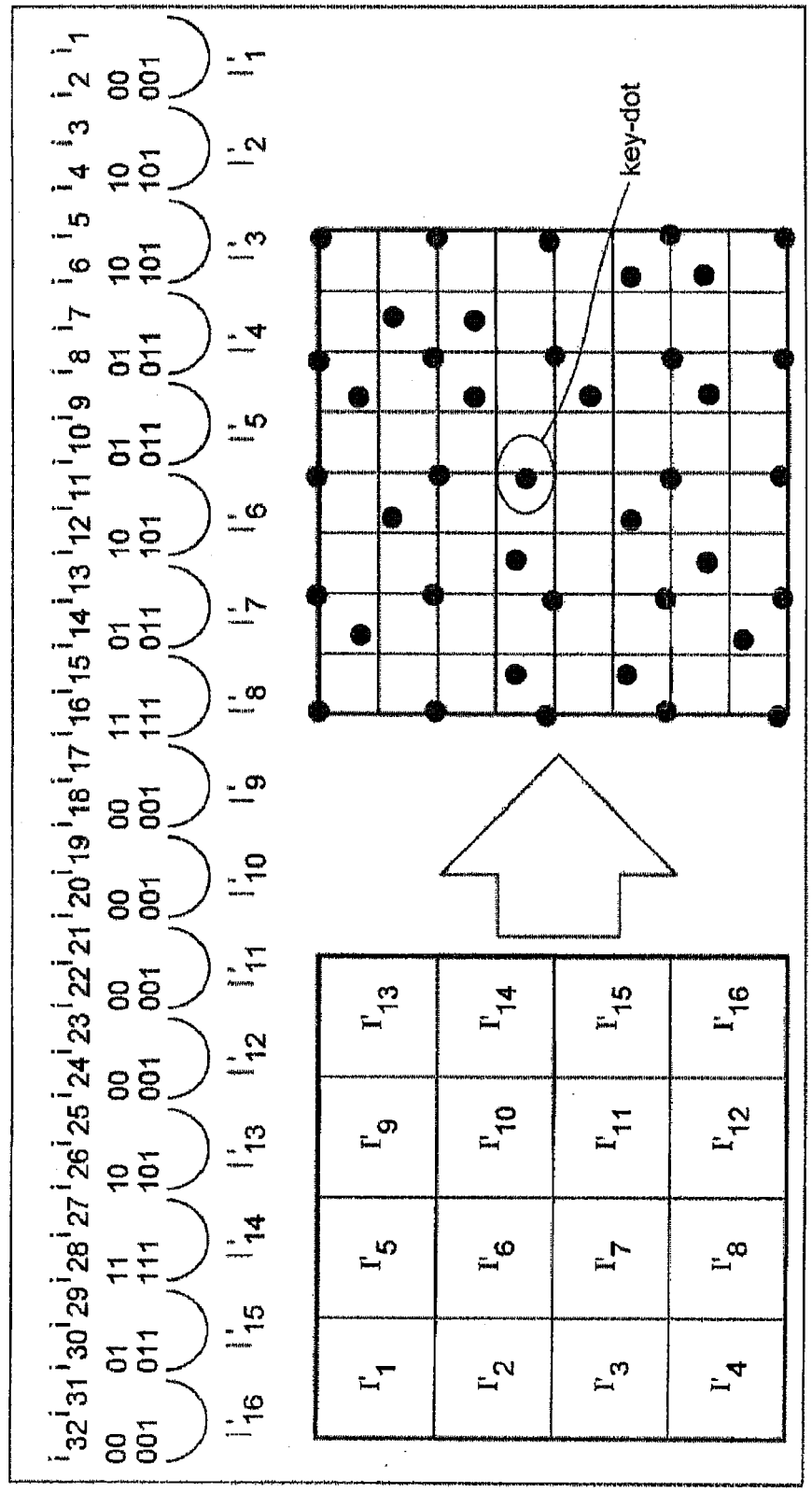
FIG. 79 is a diagram #8 showing the principle of the dot pattern (GRID-1).
Figure 80:
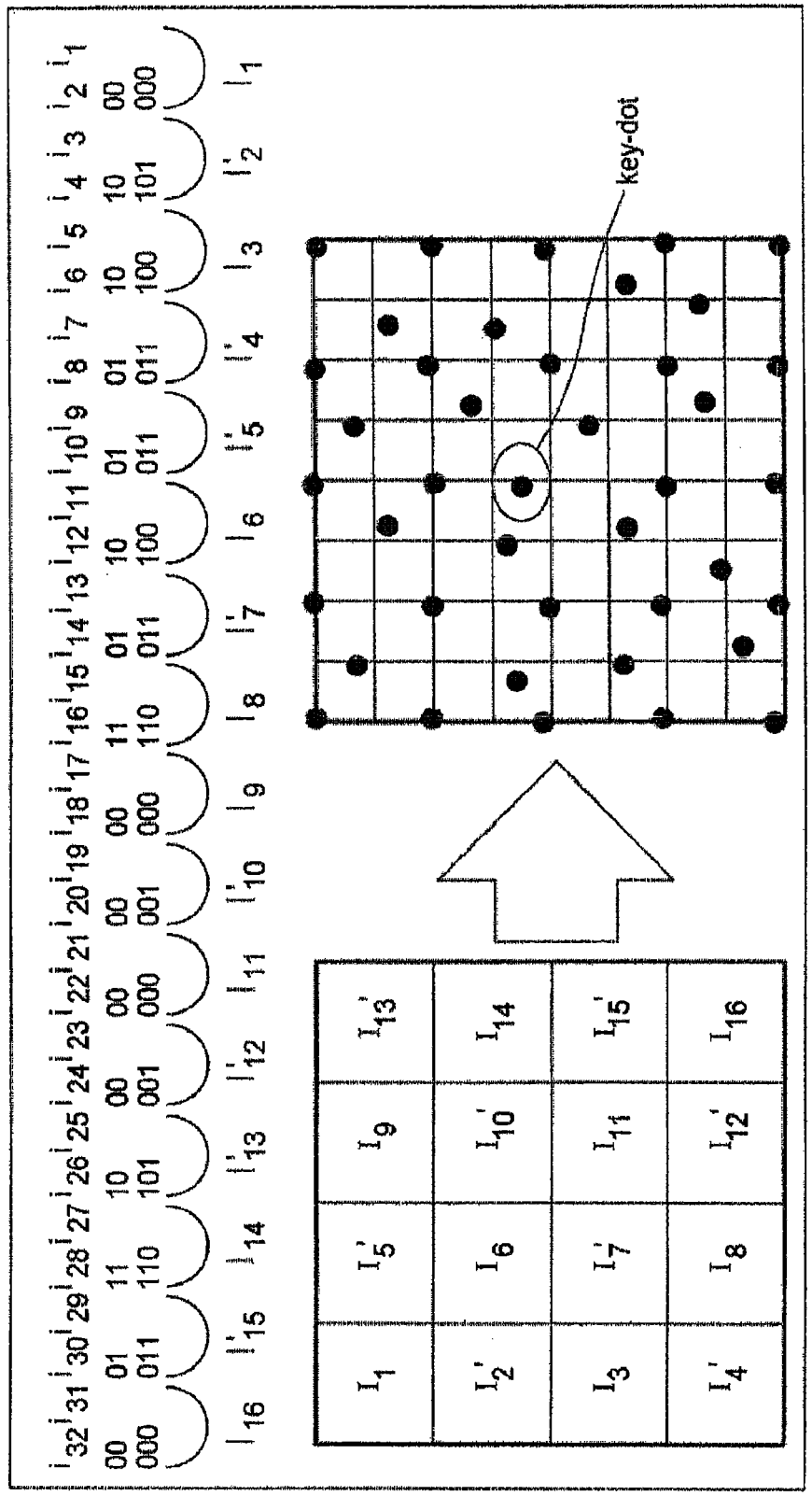
FIG. 80 is a diagram #9 showing the principle of the dot pattern (GRID-1).
Figure 82:
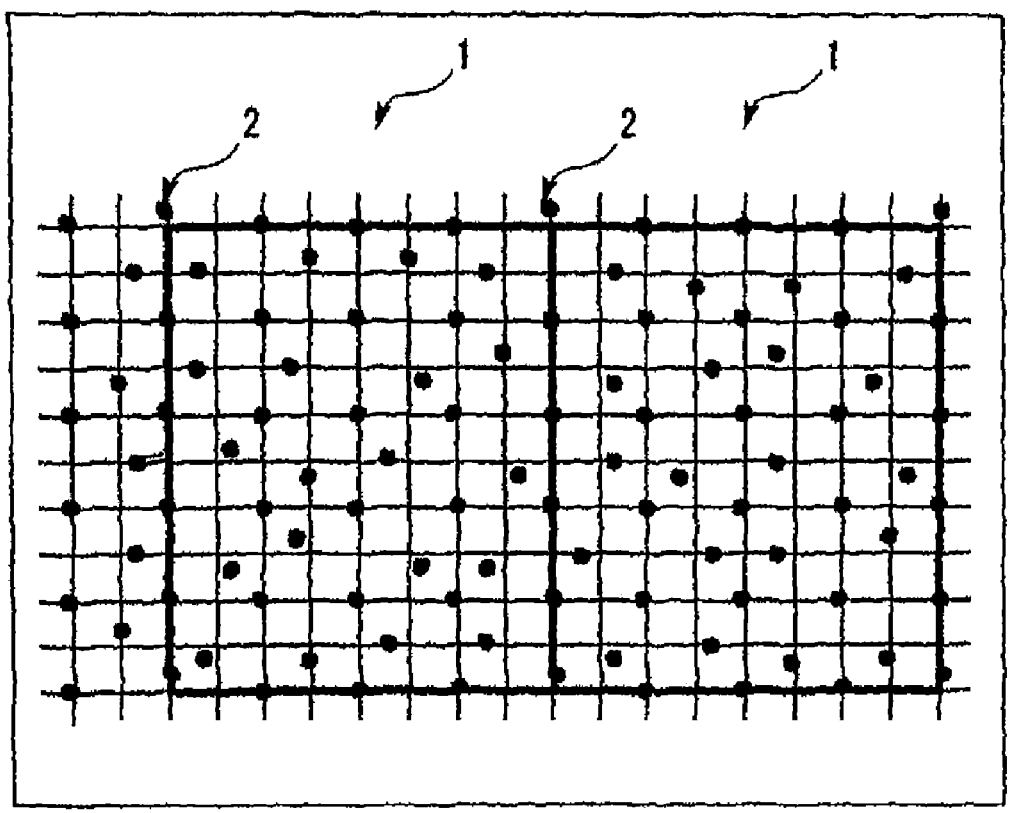
FIG. 82 is a diagram #11 showing the principle of the dot pattern (GRID-1).
Figure 83:
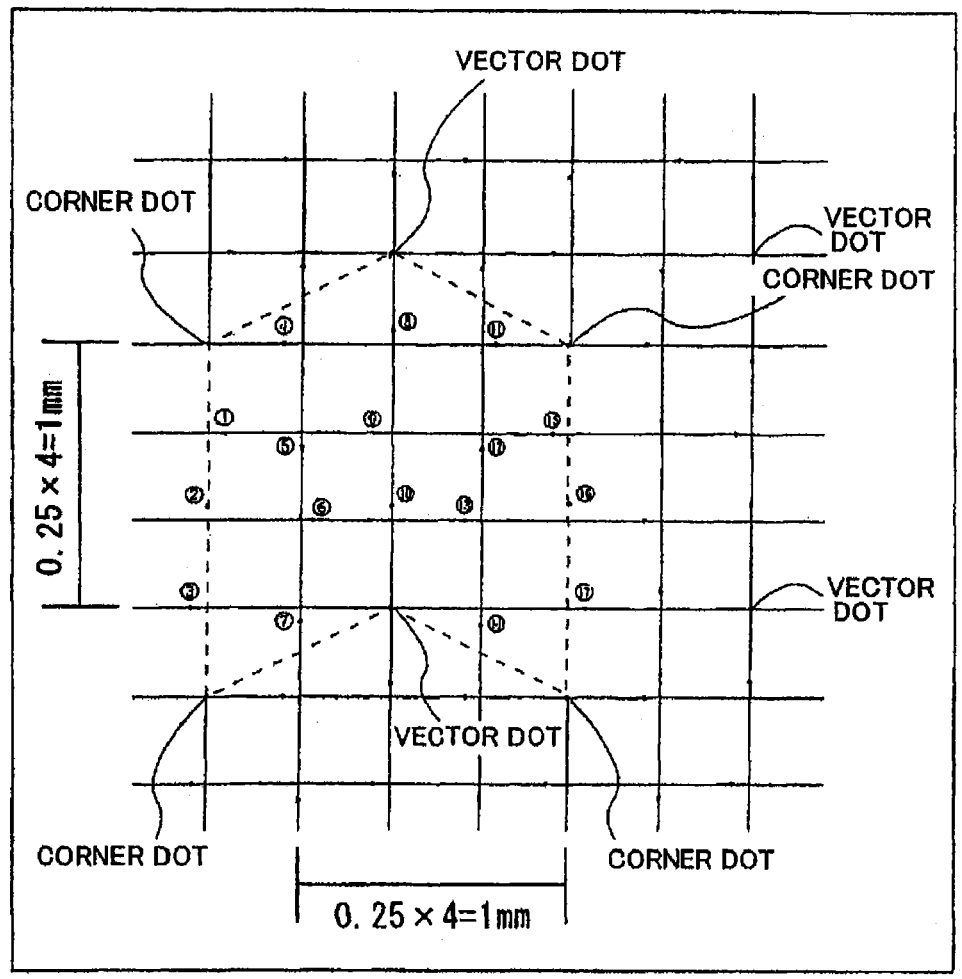
FIG. 83 is a diagram #1 showing the principle of the dot pattern (GRID-2).
Figure 84:
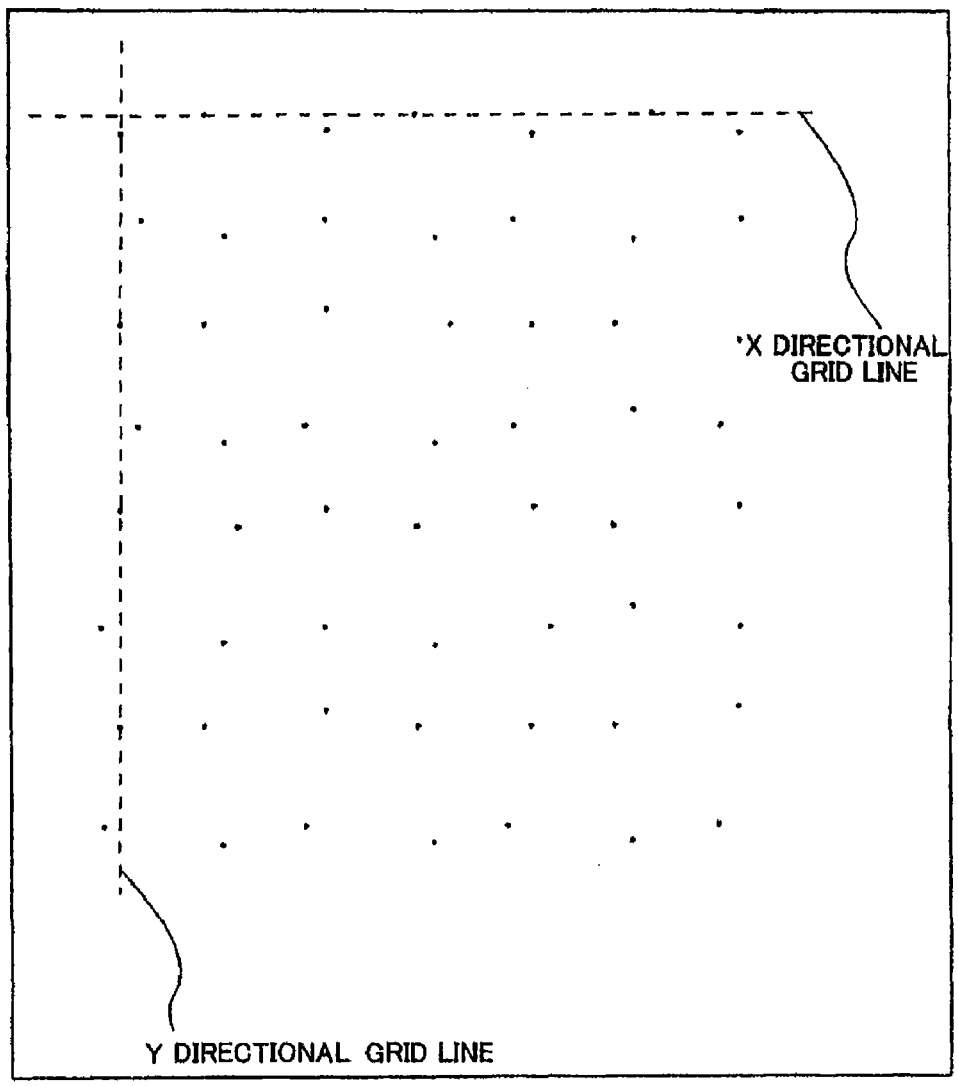
FIG. 84 is a diagram #2 showing the principle of the dot pattern (GRID-2).
Figure 85:
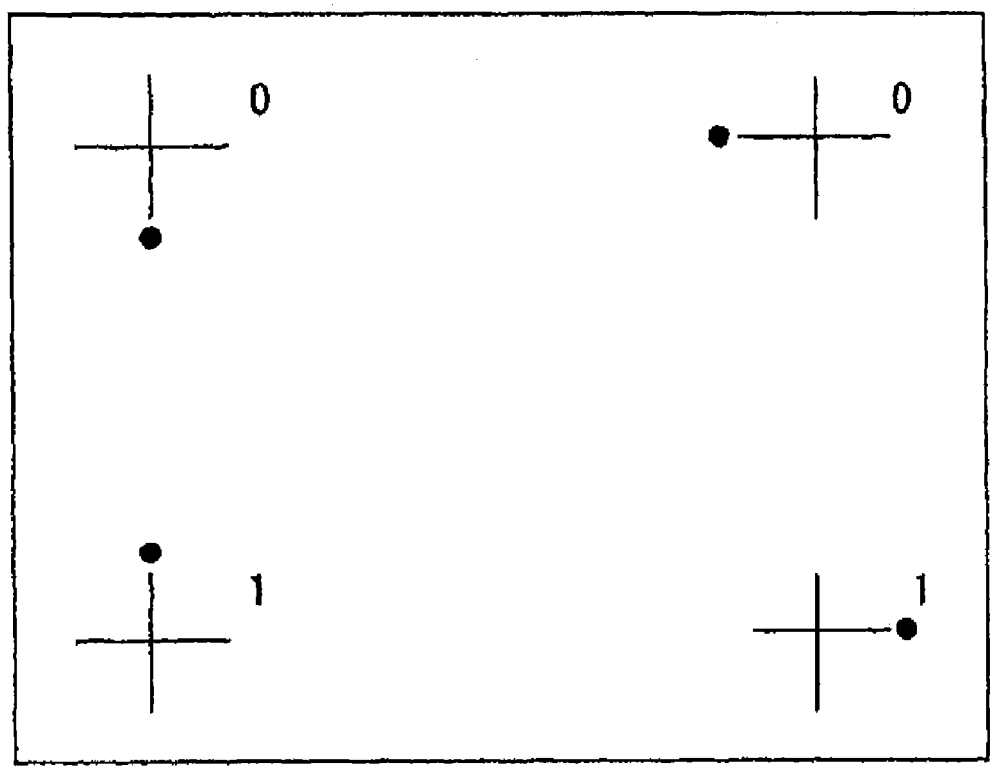
FIG. 85 is a diagram #3 showing the principle of the dot pattern (GRID-2).
Figure 86:
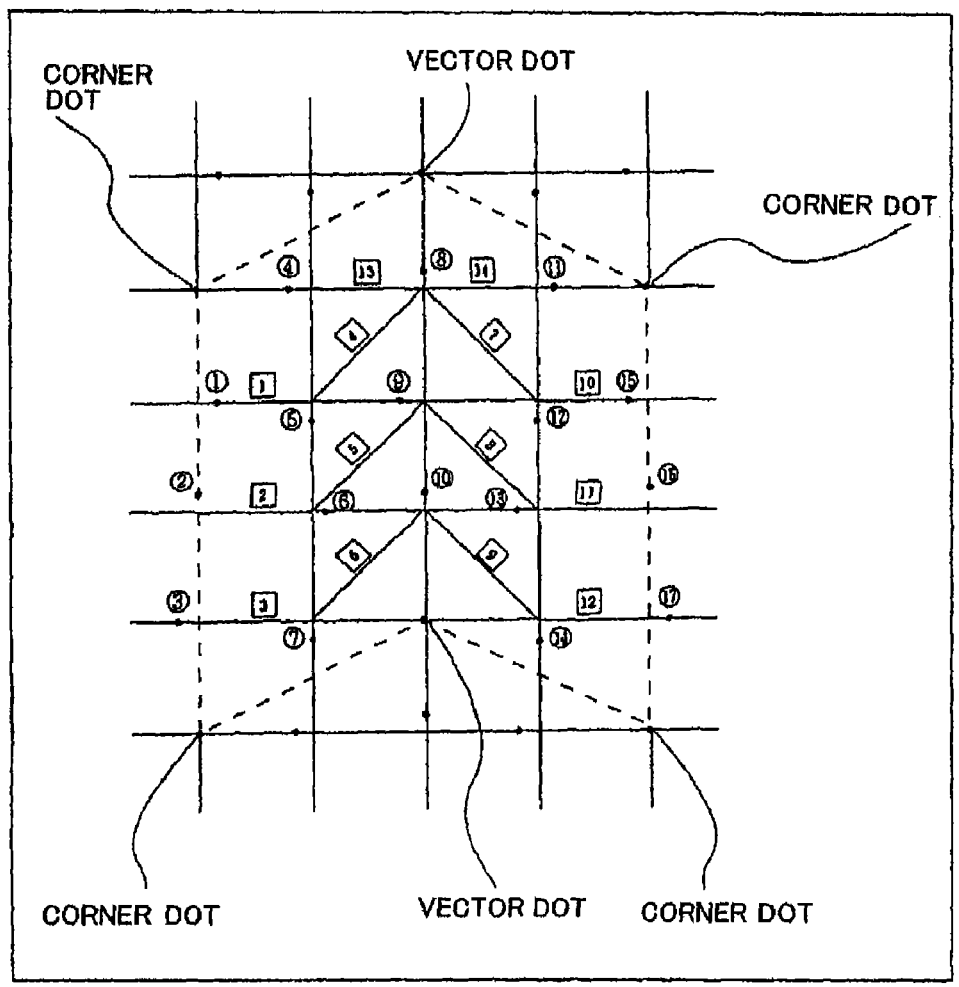
FIG. 86 is a diagram #4 showing the principle of the dot pattern (GRID-2).

1 dot pattern
2 key dot
3 computer dot
4 grid dot

The invention claimed is:

1. A printing unit that reads via an optical reading means a medium having print parameters provided thereon as a dot pattern and controls the printing process through such print parameters, comprising:
 an optical reading means for reading a medium surface;
 a dot pattern reading means for reading out a dot pattern from an image of the medium surface read by the optical reading means;
 a conversion means for converting the read dot pattern into print parameters; and
 a print control means for controlling the printing process based on the resultant print parameters.

2. A printing unit that optically reads an original document, generates a print data corresponding to the read image, and prints the generated print data onto a medium surface, comprising:
 a means for designating a specific region within an image which has been optically read from said original document;
 a means for assigning a specific dot pattern to the designated specific region; and
 a print control means for printing a dot pattern at said specific region when printing the print data onto said medium surface.

3. A printing unit according to claim 2, wherein a dot pattern assigned to said specific region is a content of voices, still images, moving images or other signals, a code associated therewith, or confidential information in such document.

* * * * *